(12) United States Patent  (10) Patent No.: US 7,464,137 B2
Zhu et al.  (45) Date of Patent: Dec. 9, 2008

(54) ON-LINE CONFERENCE RECORDING SYSTEM

(75) Inventors: Min Zhu, Los Altos, CA (US);
Songxiang Wei, San Jose, CA (US);
Altred Lian Fui Pong, Millbrae, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/450,939

(22) Filed: Jun. 8, 2006

(65) Prior Publication Data

US 2007/0022159 A1    Jan. 25, 2007

Related U.S. Application Data

(63) Continuation of application No. 10/112,697, filed on Mar. 28, 2002, now Pat. No. 7,213,051.

(51) Int. Cl.
*G06F 15/16* (2006.01)
*G06F 13/00* (2006.01)
*G06F 17/30* (2006.01)

(52) U.S. Cl. .................. 709/204; 709/205; 709/248; 715/751

(58) Field of Classification Search ......... 709/203–205, 709/227–228, 248; 707/9–10; 715/740–741, 715/751
See application file for complete search history.

(56) References Cited

U.S. PATENT DOCUMENTS

| 5,617,539 | A | * | 4/1997 | Ludwig et al. ............... 709/205 |
| 5,675,511 | A | * | 10/1997 | Prasad et al. ................ 709/204 |
| 5,938,723 | A | | 8/1999 | Hales et al. |
| 5,996,002 | A | | 11/1999 | Katsurabayashi et al. ... 709/204 |
| 6,119,147 | A | | 9/2000 | Toomey et al. |
| 6,615,239 | B1 | * | 9/2003 | Berstis ........................ 709/204 |
| 6,629,129 | B1 | | 9/2003 | Bookspan et al. ........... 709/204 |
| 6,816,904 | B1 | * | 11/2004 | Ludwig et al. ............... 709/204 |
| 6,952,717 | B1 | * | 10/2005 | Monchilovich et al. ..... 709/205 |
| 7,213,051 | B2 | * | 5/2007 | Zhu et al. .................... 709/205 |

OTHER PUBLICATIONS

Lotus ScreenCam 2.0 for Windows:, downloaded Feb. 14, 2002 from miken.com/winpost/oldart/nov95/rv_scrnc.htm, Review: Lotus ScreenCam 2.0 Windows, 5 pgs.

* cited by examiner

*Primary Examiner*—Bharat N Barot
(74) *Attorney, Agent, or Firm*—Cesari and McKenna LLP

(57) ABSTRACT

The system, method, and article of manufacture of the present invention allow for recording an on-line meeting (also referred to as an "on-line conference") and saving the recording as a meeting recording file. Additionally, the saved meeting recording file may be played back and/or edited. Moreover, a user may open a meeting recording file during an on-line meeting, and all attendees of the on-line meting can see, as well as hear, the recording content.

22 Claims, 26 Drawing Sheets

Window ~900

1. Quarterly Meeting.wrf
2. Sequence Quarterly Meeting.wrf

3. Scott's Presentation.wrf
✓ 4. Sequence Scott's Presentation.wrf

5. Last Meeting.wrf
6. Sequence Last Meeting.wrf

Window ~910

1. Quarterly Meeting.wrf
2. Sequence Quarterly Meeting.wrf

3. Scott's Presentation.wrf
✓ 4. Sequence Scott's Presentation.wrf

5. Last Meeting.wrf
6. Sequence Last Meeting.wrf

7. Feedback Forum.wrf
8. Sequence Feedback Forum.wrf

9. Online Reporting.wrf
Sequence Online Reporting.wrf

Screen Captures.wrf
Sequence Screen Captures.wrf

Group Meeting.wrf
Sequence Group Meeting.wrf

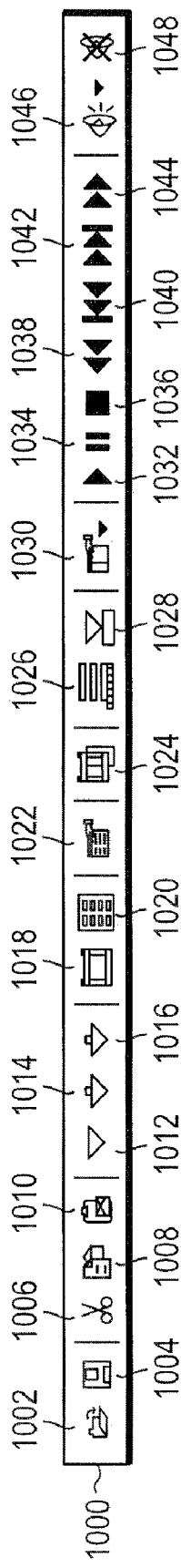
FIG. 10
FIG. 11A
FIG. 11B
FIG. 12A
FIG. 12B

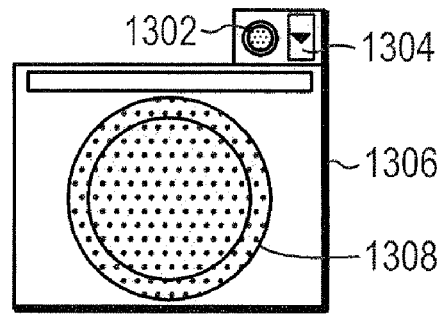
FIG. 13A
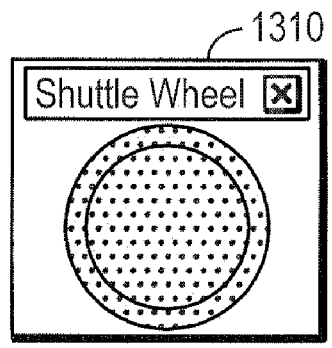
FIG. 13B
08:12:40.4 / 00:43:21.4 ~1400
FIG. 14

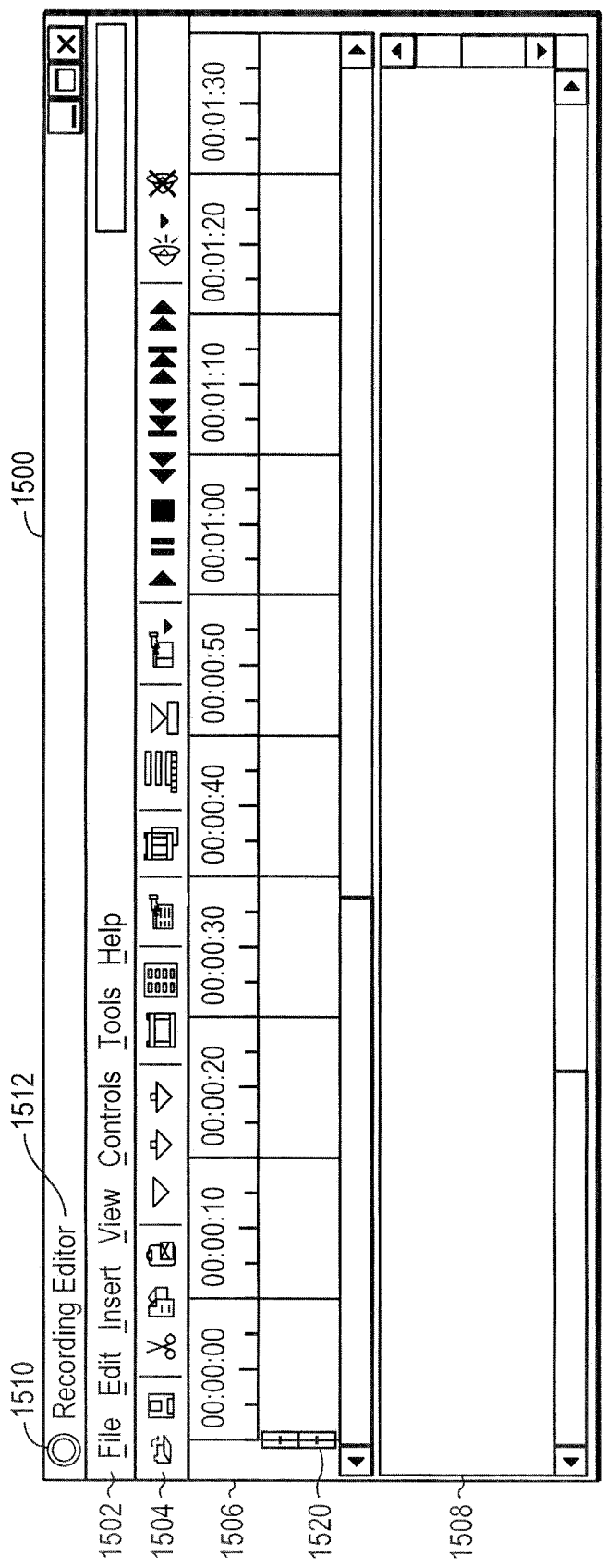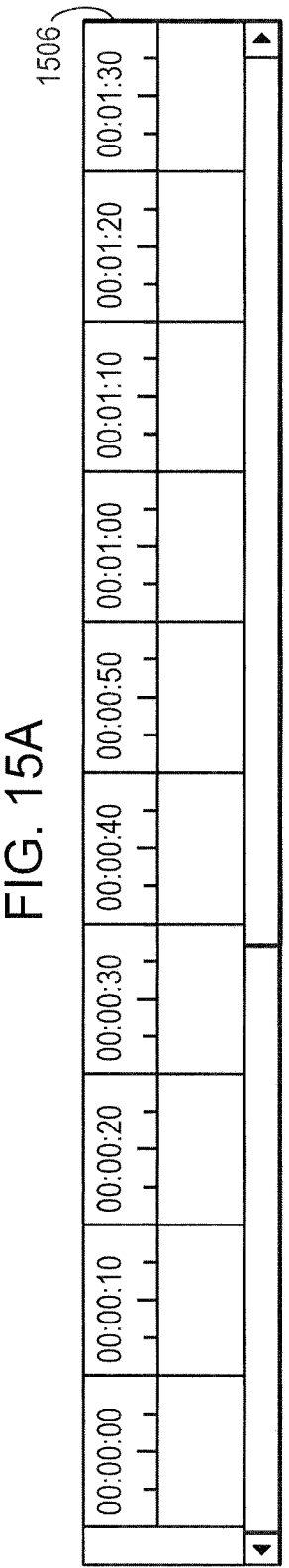
FIG. 15A
FIG. 15B
FIG. 15C

Segments — 2700

| Time | Number | Name |
|---|---|---|
| 00:00:00 | 1 | Introduction |
| 00:05:25 | 2 | Overview of Tasks |
| 00:16:36 | 3 | Scheduling a Meeting |
| 00:45:18 | 4 | Joining a Meeting |
| 00:58:29 | 5 | Chatting |
| 01:08:32 | 6 | Sharing a Document |
| 01:21:13 | 7 | Sharing an Application |

[Go To] [Play]

FIG. 27

Markers — 2800

| Type | Time | Name |
|---|---|---|
| ▽ | 00:00:00 | Introduction |
| ▽ | 00:05:25 | Introduction |
| ▽ | 00:05:25 | Overview of Tasks |
| ▽ | 00:16:36 | Overview of Tasks |
| ▽ | 00:16:36 | Scheduling a Meeting |
| ▽ | 00:45:18 | Scheduling a Meeting |
| ▽ | 00:45:18 | Chatting |
| ▽ | 00:58:12 | Chatting |
| ▽ | 01:25:00 | Resume Editing |
| ▽ | 01:45:00 | Insert Recording |

Clipboard — 2900

▽ Introduction

FIG. 29

ON-LINE CONFERENCE RECORDING SYSTEM

CROSS REFERENCE TO RELATED APPLICATIONS

This application is a continuation of application Ser. No. 10/112,697 filed on Mar. 28, 2002, now U.S. Pat. No. 7,213,051 issue on May 1, 2007, all of which are expressly incorporated herein by reference.

CROSS-REFERENCE TO CD-ROM APPENDIX

An Appendix containing a computer program listing is submitted on a compact disk, which is herein incorporated by reference in its entirety. The total number of compact discs including duplicates is two. Appendix A, which is part of the present specification, contains a list of the files contained on the compact disk. These listings contain material which is subject to copyright protection. The copyright owner has no objection to the facsimile reproduction by anyone of the patent document or the patent disclosure, as it is displayed in the patent and trademark office patent file or records, but otherwise reserves all copyright rights whatsoever.

BACKGROUND OF THE INVENTION

1. Field of the Invention

The present invention relates generally to collaborative computing systems and, more particularly, to recording activity in a collaborative computing system.

2. Related Art

Traditional collaborative computing tools allow computer users at different locations to communicate via a computer network and share documents or application programs stored and/or executed on one of the user's computers. While both peer-to-peer and client-server communication models have been used in the past, web-based collaborative tools generally employ a client-server model.

For example, client-server application program sharing (also discussed in the context of "distributed computing") is described in U.S. Pat. No. 5,434,852 "Distributed Processing Architecture for Control of Broadband and Narrowband Communication Networks;" U.S. Pat. No. 5,887,170 "System for Classifying and Sending Selective Requests;" and U.S. Pat. No. 6,038,593 "Remote Application Control for Low Bandwidth Application Sharing," all incorporated herein by reference in their entireties. Other group communication techniques are described by Ulrick Hall and Franz J. Hauck, "Promondia: A Java-Based Framework for Real-time Group Communication in the Web," Proceedings of Sixth International World Wide Web Conference (Apr. 7-11, 1997); Lane Boyd, "Taking Collaboration Into Orbit," Computer Graphics World, Vol. 21, No. 9, p. 36 (September 1998); and Eric Ly, "Distributed Java Applets for Project Management on the Web," IEEE Internet Computing Online, Vol. 1, No. 3 (May/June 1997), all incorporated herein by reference in their entireties.

International Telecommunications Union (ITU) Standard T.120 is a family of open standards that provides both communications and application protocols to support real-time multipoint data communications for collaboration and conferencing, among other uses. This standard is outlined in "A Primer on the T.120 Series Standard by DataBeam Corp." available at http://mail.symuli.com/t120primer/t120primer.html (printed Mar. 11, 2002), incorporated herein by reference in its entirety.

Traditional collaborative tools, however, are limited in that they only allow for screen capture at a single computer. For example, Lotus® ScreenCam™ from Lotus Development Corporation of Cambridge, Mass. allows for screen capture at a single computer.

SUMMARY OF THE INVENTION

The system, method, and article of manufacture of the present invention allow for recording an on-line meeting (also referred to as an "on-line conference") and saving the recording as a meeting recording file. Additionally, the saved meeting recording file may be played back and/or edited. Moreover, a user may open a meeting recording file during an on-line meeting, and all attendees of the on-line meting can see, as well as hear, the recording content.

BRIEF DESCRIPTION OF THE DRAWINGS

The present disclosure may be better understood and its numerous features and advantages made apparent to those skilled in the art by referencing the accompanying drawings.

FIG. 9 illustrates window menus, in accordance with some embodiments of the invention.

FIG. 10 illustrates a toolbar, in accordance with some embodiments of the invention.

FIGS. 11A-11B illustrate a volume slider and volume palette, respectively, in accordance with some embodiments of the invention.

FIGS. 12A-12B illustrate a location slider and location palette, respectively, in accordance with some embodiments of the invention.

FIGS. 13A-13B illustrate a shuttle wheel and a shuttle wheel palette, respectively, in accordance with some embodiments of the invention.

FIG. 14 illustrates an elapsed time and duration indicator, in accordance with some embodiments of the invention.

FIGS. 15A-15C illustrate an editor window, a timeline, and a current location indicator, respectively, in accordance with some embodiments of the invention.

FIG. 27 illustrates a Segments palette, in accordance with some embodiments of the invention.

FIG. 28 illustrates a Markers palette, in accordance with some embodiments of the invention.

FIG. 29 illustrates a Clipboard palette, in accordance with some embodiments of the invention.

The use of the same reference symbols in different drawings indicates similar or identical items.

DETAILED DESCRIPTION OF THE INVENTION

Embodiments of the present invention provide the ability to record an on-line meeting (also referred to as an "on-line conference") and save the recording as a meeting recording file. Embodiments of the invention provide the ability to edit a saved meeting recording file. Additionally, embodiments of the present invention allow a user to open a meeting recording file during an on-line meeting, and all attendees can see, as well as hear, the recording content.

Figure 1:
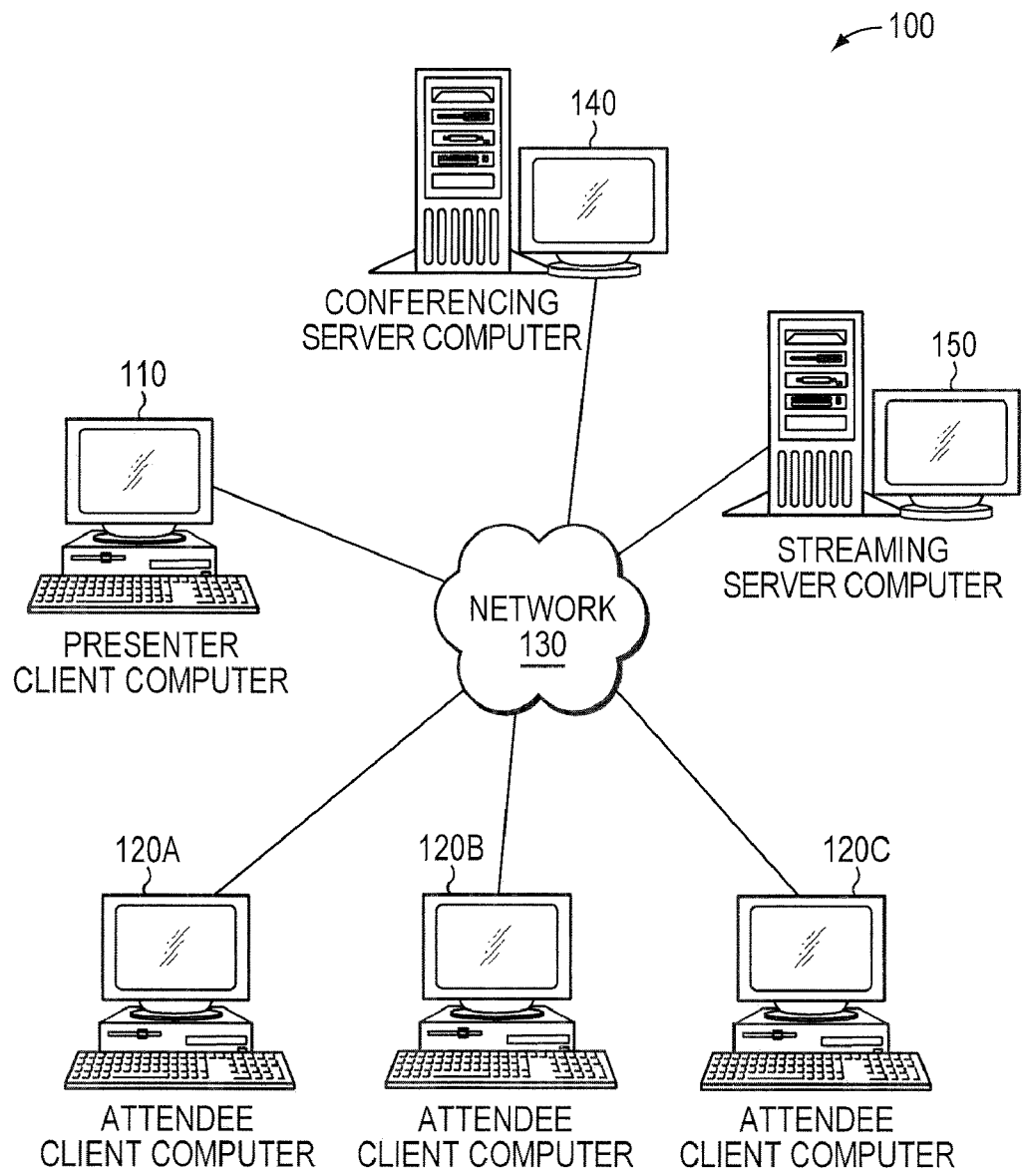
FIG. 1 illustrates a distributed collaborative computing system, in accordance with some embodiments of the invention.

FIG. 1 illustrates a distributed collaborative computing system 100, in accordance with some embodiments of the invention. Computer system 100 includes a presenter client computer 110, a plurality of attendee client computers 120n (where n=A, B, C . . . ), a conferencing server computer 140, and a streaming server computer 150 connected to each other through a computer network 130 (e.g., a global area network).

In some embodiments of the invention, presenter client computer 110 (whose user will be a presenter at a meeting) establishes a connection to conferencing server computer 140 over computer network 130. Each attendee client computer 120n (whose users will join the meeting presented by presenter client computer 110) establishes a connection to conferencing server computer 140 over computer network 130. Additionally, each client computer 110 and 120n establish connections to streaming server computer 150 to obtain data during the meeting. In some embodiments, a host schedules a meeting to be presented by a presenter. The host and presenter may be the same user or may be different users. In some embodiments, the host, the presenter at presenter client computer 110, and users at attendee client computers 120n are referred to as attendees as all of them attend the meeting.

Details of distributed collaborative computing system 100 are further described in the following United States patent Applications and patents, each of which is incorporated herein by reference in its entirety:

"Rich Multi-Media Format for Use in a Collaborative Computing System," co-pending and commonly assigned application Ser. No. 10/104,170, filed on Mar. 21, 2002;

"System and Method for Accessing a Target Computer from a Remote Location Using a Remote Computer," co-pending and commonly assigned application Ser. No. 10/001,435, filed on Oct. 31, 2001;

"Systems and Methods for Establishing Quasi-Persistent HTTP Connections," co-pending and commonly assigned application Ser. No. 09/963,216, filed on Sep. 25, 2001;

"Application Based Screen Sampling," co-pending and commonly assigned application Ser. No. 09/835,079, filed on Apr. 13, 2001;

"Sharing OpenGL Applications Using Application Based Screen Sampling," co-pending and commonly assigned application Ser. No. 09/835,116, filed on Apr. 13, 2001;

"Sharing Directdraw Applications Using Application Based Screen Sampling," co-pending and commonly assigned application Ser. No. 09/835,086, filed on Apr. 13, 2001;

"Distributed Network System Architecture For Collaborative Computing," co-pending and commonly-assigned Ser. No. 09/751,424, filed Dec. 29, 2000;

"Fault-Tolerant Distributed System For Collaborative Computing," co-pending and commonly-assigned Ser. No. 09/751,807, filed Dec. 29, 2000;

"Scalable Distributed System For Collaborative Computing," co-pending and commonly-assigned Ser. No. 09/751,548, filed Dec. 29, 2000;

"Distributed Meeting Management," co-pending and commonly-assigned Ser. No. 09/751,595, filed Dec. 29, 2000;

"Fault Tolerant Server Architecture For Collaborative Computing," co-pending and commonly-assigned Ser. No. 09/752,376, filed Dec. 29, 2000;

"Distributed Application Sharing," co-pending and commonly-assigned Ser. No. 09/751,806, filed Dec. 29, 2000;

"Distributed Document Sharing," co-pending and commonly-assigned Ser. No. 09/753,193, filed Dec. 29, 2000;

"Secure Communications System For Collaborative Computing," co-pending and commonly-assigned Ser. No. 09/752,284, filed Dec. 29, 2000;

"Fault Tolerant Server For Collaborative Computing," co-pending and commonly-assigned Ser. No. 09/751,519, filed Dec. 29, 2000;

"Quality Of Service Maintenance For Distributed Collaborative Computing," co-pending and commonly-assigned Ser. No. 09/752,377, filed Dec. 29, 2000;

"Instant Document Sharing," co-pending and commonly-assigned Ser. No. 09/442,424, filed Nov. 17, 1999;

"Instant Sharing of Documents in a Viewer Server," co-pending and commonly-assigned Application for U.S. patent Ser. No. 09/471,938, filed Dec. 23, 1999;

"Viewer Document Serving," co-pending and commonly-assigned Ser. No. 09/591,377, filed Jun. 9, 2000;

"Instantaneous Viewer Control of an Unattended Server," co-pending and commonly-assigned Ser. No. 09/515,684, filed Feb. 29, 2000;

"Remote Document Serving," co-pending and commonly-assigned Ser. No. 09/471,938, filed on Dec. 23, 1999;

"Instantaneous Remote Control of an Unattended Server," co-pending and commonly-assigned Ser. No. 09/515,684;

"Method for Establishing a Communication Connection Between Two or More Users Via a Network of Interconnected Computers," co-pending and commonly-assigned Ser. No. 09/195,801, filed on May 12, 2000;

"Emulating a Persistent Connection Using HTTP," co-pending and commonly-assigned Ser. No. 09/449,011, filed on Nov. 24, 1999;

"Method of Transferring Data at Adjustable Levels of Priorities to Provide Optimum Response to User Demands," U.S. Pat. No. 5,623,603;

"Method to Provide for Virtual Screen Overlay," U.S. Pat. No. 5,577,188;

"Collaborative Web Browser," U.S. Pat. No. 5,944,791; and

"Method for Creating Peer-to-Peer Connections Over an Interconnected Network to Facilitate Conferencing Among Users," U.S. Pat. No. 6,167,432.

Figure 2A:
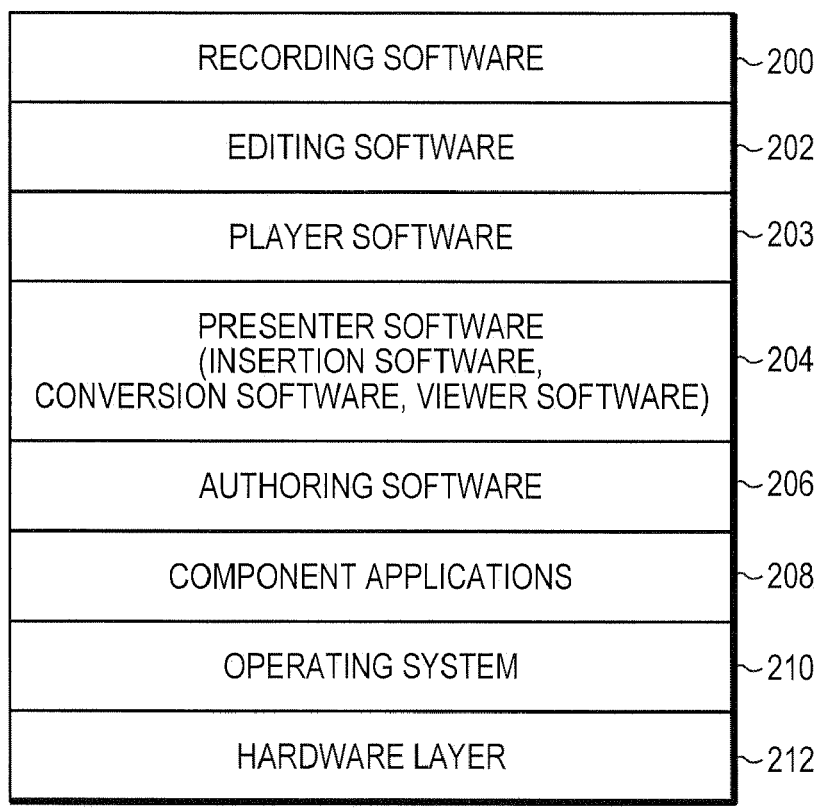
FIGS. 2A, 2B, and 2C illustrate the hardware/software structure of a presenter client computer, an attendee client computer, and a server computer, in accordance with some embodiments of the invention.

FIG. 2A illustrates a hardware/software structure of presenter client computer 110, in accordance with some embodiments of the invention. During operation of computer system 100, recording software 200, editing software 202, player software 203, presenter software 204, authoring software 206, and component applications 208 are executed on top of operating system 210, that controls hardware layer 212. Hardware layer 212, in turn, provides a physical connection to computer network 130.

Recording software 200 allows for recording an on-line meeting between one or more presenters and attendees and saving the recording in, for example, a file. The saved recording will be referred to herein as a "meeting recording file." Recording software 200 allows a user to record audio and images of user interactions with interface elements on a computer screen. The atwotrecorder.cpp file submitted in Appendix A provides exemplary source code for recording an on-line meeting. The wot.h file submitted in Appendix A defines a meeting recording file format used by the atwotrecorder.cpp file to save a recording in the meeting recording file format (.wrf).

Editing software 202 allows for editing of the meeting recording file. The atmainwindow.cpp file submitted in Appendix A provides exemplary source code for editing a meeting recording file. Player software 203 allows a user to play back audio and images of user interactions with interface elements on a computer screen. The atwotplayer.cpp file submitted in Appendix A provides exemplary source code for playing a meeting recording file.

Presenter software 204 allows for sharing of meeting recording files during an on-line meeting.

Figure 3:
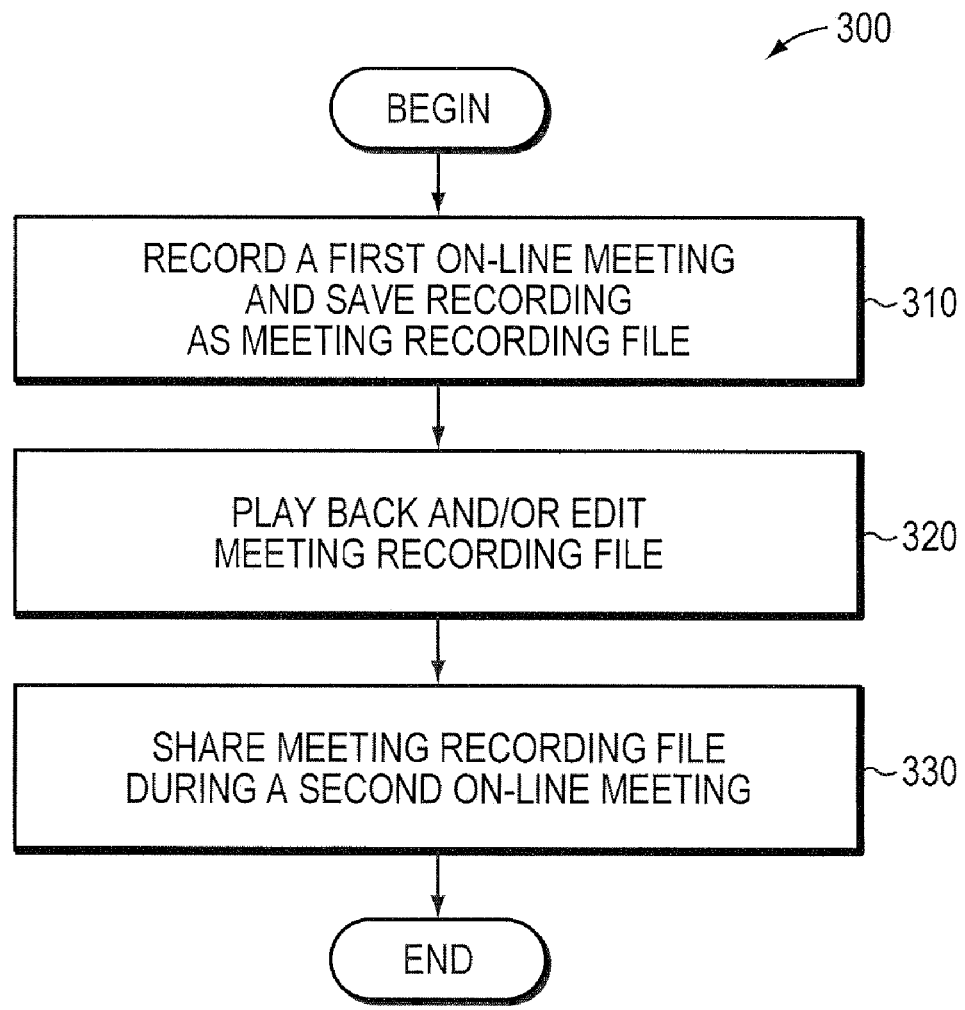
FIG. 3 is a flow diagram of an operation for use of the invention, in accordance with some embodiments of the invention.

FIG. 3 is a flow diagram of an operation 300 for use of the invention, in accordance with some embodiments of the invention. In stage 310, recording software 200 allows for recording of an on-line meeting and stores the recording as a meeting recording file. In stage 320, player software 203 and editing software 202 may be used, optionally, to play back and/or edit, respectively, the meeting recording file. In stage 330, the meeting recording file may be shared during an on-line meeting.

In some embodiments, recording software, editing software, and player software may each be separate computer programs or may be combined with each other and/or with other software. For example, in some embodiments, editing software and player software may be combined to form on computer program.

In some embodiments, presenter software 204 includes insertion software, conversion software, and viewer software. Insertion software allows custom objects to be embedded into a document prepared with authoring software 206. Conversion software performs conversion of the document to a Rich Multi-Media format provided by some embodiments of the invention. Viewer software enables viewing of a document with embedded custom objects, either while participating in a meeting (i.e. while "on-line") or outside of a meeting (i.e. while "off-line"). Details of insertion software, conversion software, and viewer software are further described in United States patent Application, "Rich Multi-Media Format for Use in a Collaborative Computing System," co-pending and commonly assigned application Ser. No. 10/104,170, filed on Mar. 21, 2002, which is incorporated herein by reference in its entirety.

In some embodiments, insertion software, conversion software, and viewer software may each be separate computer programs or may be combined with each other and/or with other software. For example, in some embodiments, insertion software, conversion software, and viewer software are separate computer programs. In some embodiments, insertion software, conversion software, and viewer software are combined to form a single computer program. In some embodiments, insertion software, conversion software, and viewer software may be combined in alternate ways (e.g., conversion software and viewer software may be combined into a single computer program, while insertion software is a separate computer program) or may be combined with other software (e.g., insertion software may be combined with authoring software 206 to form a single computer program).

Figure 2B:
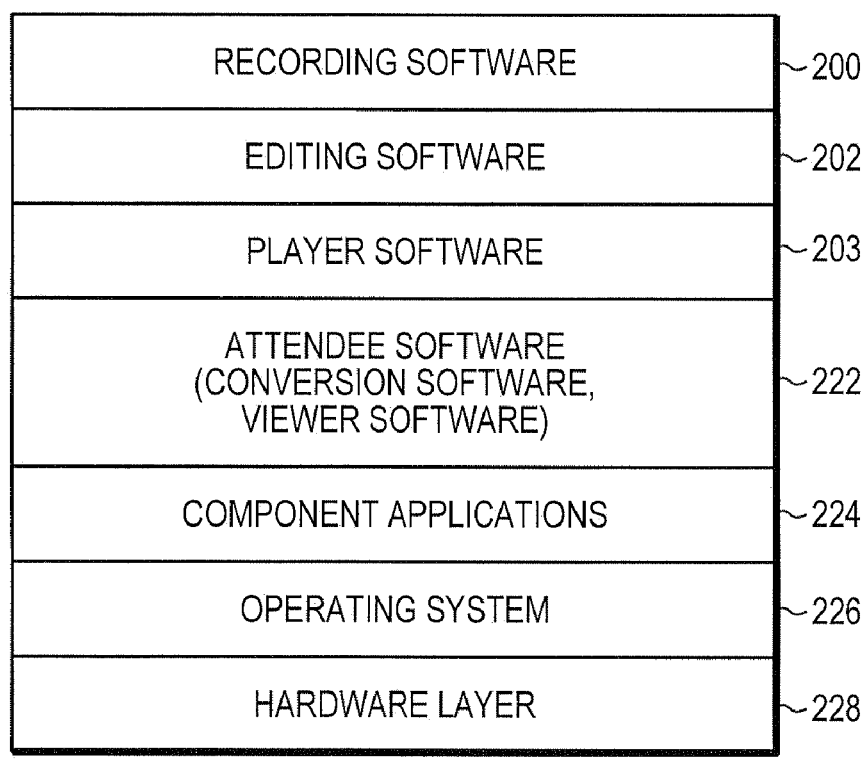

FIG. 2B illustrates a hardware/software structure of attendee client computer 120n, in accordance with some embodiments of the invention. During operation of computer system 100, recording software 200, editing software 202, player software 203, attendee software 222, and component applications 224 are executed on top of operating system 226 that controls hardware layer 228. Hardware layer 228, in turn, provides a physical connection to computer network 130. In some embodiments, attendee software 222 includes conversion software and viewer software, which may be separate computer programs, a single combined computer program, or which may be combined with each other and/or other software.

Figure 2C:
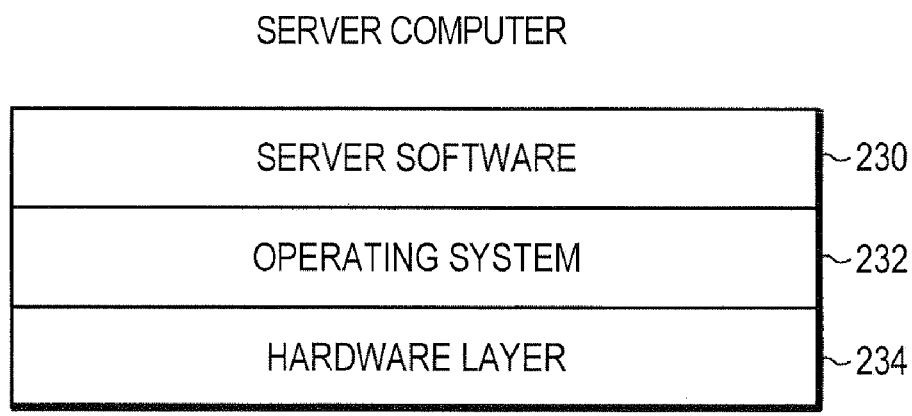

FIG. 2C illustrates a hardware/software structure of a conferencing server computer 140 or a streaming server computer 150, in accordance with some embodiments of the invention. During operation of computer system 100, server software 230 (e.g., database management software (DBMS)) is executed on top of operating system 232 that controls hardware layer 234. Hardware layer 234, in turn, provides a physical connection to computer network 130. Server software 230 stores and retrieves information in a database via operating system 232. The database may be any type of commercially available database, such as a IBM's DB2® database or an Oracle® database.

Conferencing server computer 140 and streaming server computer 150 may be any special or general purpose computer suitable for maintaining a website and/or streaming data, such as a Pentium™-based computer, available from a variety of third parties, an UltraSparc™ workstation, available from Sun Microsystems, Inc. of Mountain View, Calif., an RS6000 workstation, available from IBM of New York, etc.

Client computers 110 and 120n may be any special or general purpose computer suitable for accessing a website over the Internet, such as an Intel® Pentium®04-based computer, available from a variety of third parties, an UltraSparc™ IIe-based workstation, available from Sun Microsystems, Inc. of Mountain View, Calif., an RS/6000 workstation, available from IBM of New York, a PowerPC™ G4 computer, available from Apple Computer, Inc. of Cupertino, Calif., a handheld device or appliance, available from a variety of third parties, etc.

Operating systems 210, 226, and 232 are any suitable operating system for client computers 110 and 120n and server computers 140 and 150, such as Windows® 98, Windows® NT 4.0, Windows® 2000 or Windows® XP, available from Microsoft Corp. of Redmond, Wash., Mac® OS X, available from Apple Computer, Inc., any version of the Unix® operating system, including Linux.

Before a meeting is started, a presenter at presenter client computer 110 may use authoring software 206 to prepare a presentation to be shared during an on-line meeting (e.g., collaborative session). Then, the presenter may schedule an on-line meeting by, for example, accessing a web site hosted by conferencing server computer 140 and using a user interface at the web site to schedule the meeting for a particular date and time (e.g., a Business Development meeting to take place on Jun. 15, 2002 from 3:00 p.m. to 4:00 p.m.).

Attendees at attendee client computers 120n may register to attend the on-line meeting by, for example, accessing a web site hosted by conferencing server computer 140 and indicating that the attendee wishes to attend.

At the scheduled date and time, the presenter and registered attendees access the web site hosted by conferencing server computer 140 to participate in the on-line meeting. The presenter may share one or more documents with the attendees. After an attendee is registered, a document with embedded custom objects to be shared during the meeting is downloaded to the attendee client computer 120n. In some embodiments, multiple documents may be downloaded. During the meeting, presenter software 204 and attendee software 222 enable viewing of documents.

When a presenter at presenter client computer 110 starts the meeting, commands from presenter client computer 110 are routed to attendee client computer 120n via conferencing server 140. In some embodiments, presenter client computer 110 sends a command to conferencing server 140. The command identifies the data to be rendered at each attendee client computer 120n. For example, the command might indicate that a video, which is currently playing at each client computer 110 and 120n, is to be paused. Conferencing server computer 140 forwards the command to attendee client computers 120n, where the data is rendered by attendee software 222.

A. Recording

Recording software 200 resides at each presenter 110 and attendee 120n client computer. The atwotrecorder.cpp file submitted in Appendix A provides exemplary source code for recording an on-line meeting. In some embodiments, recording software 200 records user input and application output at a single computer. In some embodiments, recording software 200 at attendee client computer 120n records data from presenter client computer 110. In particular, if a presenter at presenter client computer 110 starts sharing an application during the on-line meeting, recording software 200 at attendee client computer 120n requires knowledge of the user input at presenter client computer 110 and/or the output of the shared application. Therefore, recording software 200 at presenter client computer 110 broadcasts key frames to all of attendee client computers 120n. Recording software 200 at attendee client computers captures the broadcast key frames and stores them in a meeting recording file.

Figure 4:
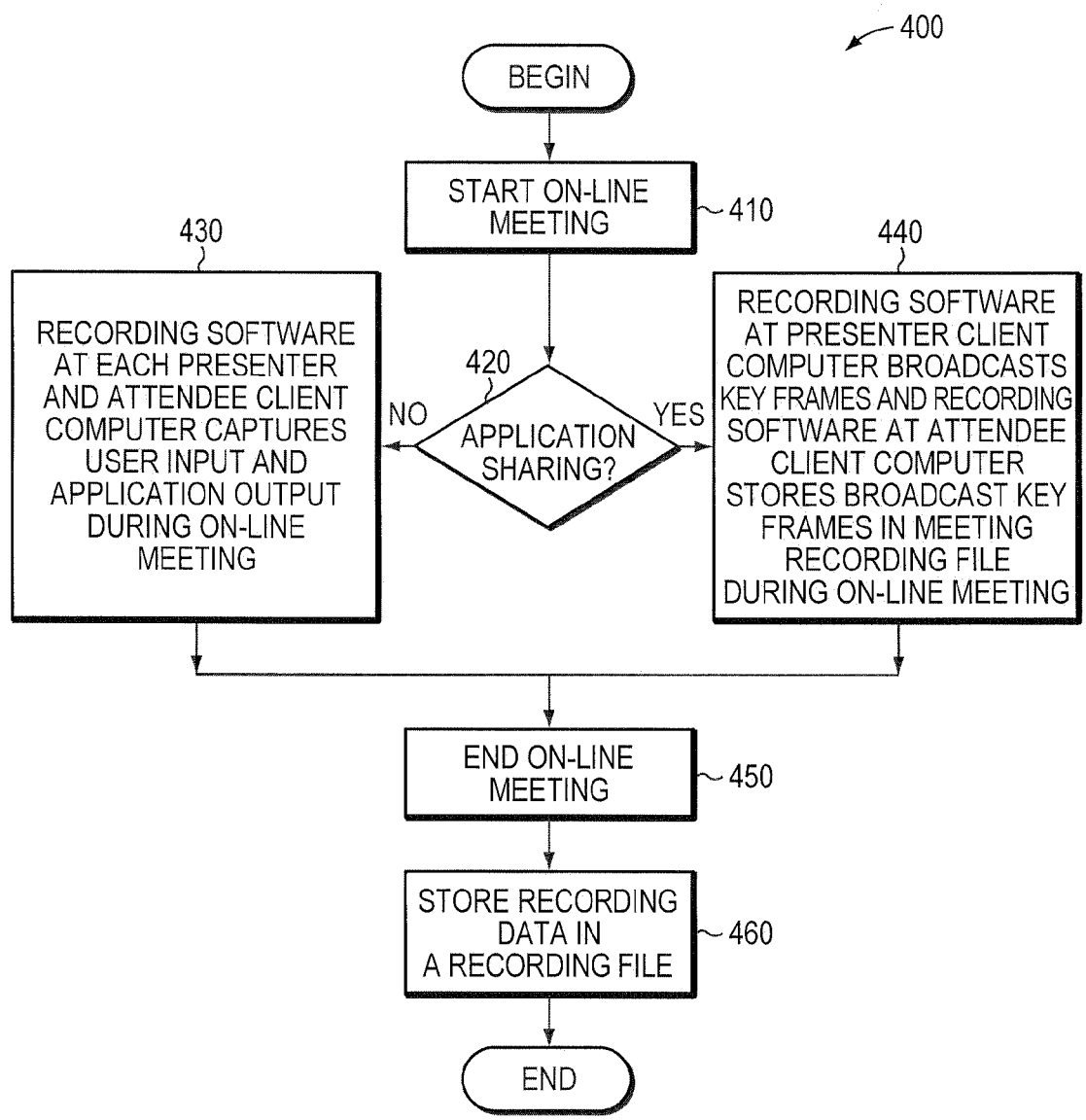
FIG. 4 is a flow diagram of an operation for recording an on-line meeting in a distributed collaborative computing system, in accordance with some embodiments of the invention.

FIG. 4 is a flow diagram of an operation 400 for recording an on-line meeting in a distributed collaborative computing system 100, in accordance with some embodiments of the invention. Initially, an on-line meeting is started (stage 410). If an application is being shared during the on-line meeting (stage 420), then processing continues to stage 440, otherwise, processing continues to stage 430. In stage 430, recording software 200 at each presenter 110 and attendee 120n client computer captures user input (e.g., mouse movements or keyboard input) and application output (e.g., screen changes). In stage 440, recording software 200 at presenter client computer 110 broadcasts key frames to all attendee client computers 120n. Recording software 200 at each attendee client computer 120n stores the broadcast key frames in a meeting recording file during the on-line meeting. When the on-line meeting ends (stage 430), recording software 200 stores the recorded data in a meeting recording file (stage 440). The file wot.h listed in Appendix A defines a meeting recording file (.wrf) file format, in accordance with some embodiments of the invention.

In some embodiments, an application may be shared during a portion of an on-line meeting. In this case, recording software 200 at presenter client computer 110 broadcasts key frames during the portion in which an application is being shared.

B. Editing and Playing

Editing software 202 enables editing of a meeting recording file. In some embodiments, recording software 200 stores captured data as key frames in the meeting recording file. In some embodiments, editing software 202 partitions the meeting recording file into key frames. A user is able to manipulate the key frames. For example, a user may select three key frames in a segment of 15 key frames to create a new segment. Also, a user may partition a key frame (e.g., by inserting "tags" into a segment of a recording to create a new segment). For example, if a user inserts a first tag into the middle of a first key frame and inserts a second tag into the middle of a third key frame, a portion of the first key frame, the second key frame, and a portion of the third key frame form a new segment. The new segment may be inserted into other meeting recording files. Moreover, the meeting recording file may be partitioned into channels (e.g., video, audio, document text, chat, polling, or application data). Then, a user is able to use editing software 202 to manipulate (e.g., edit or search) a particular channel or combination of channels (e.g., video or audio). These and other editing capabilities are discussed in further detail below. The atmainwindow.cpp file submitted in Appendix A provides exemplary source code for editing a meeting recording file.

Figure 5:
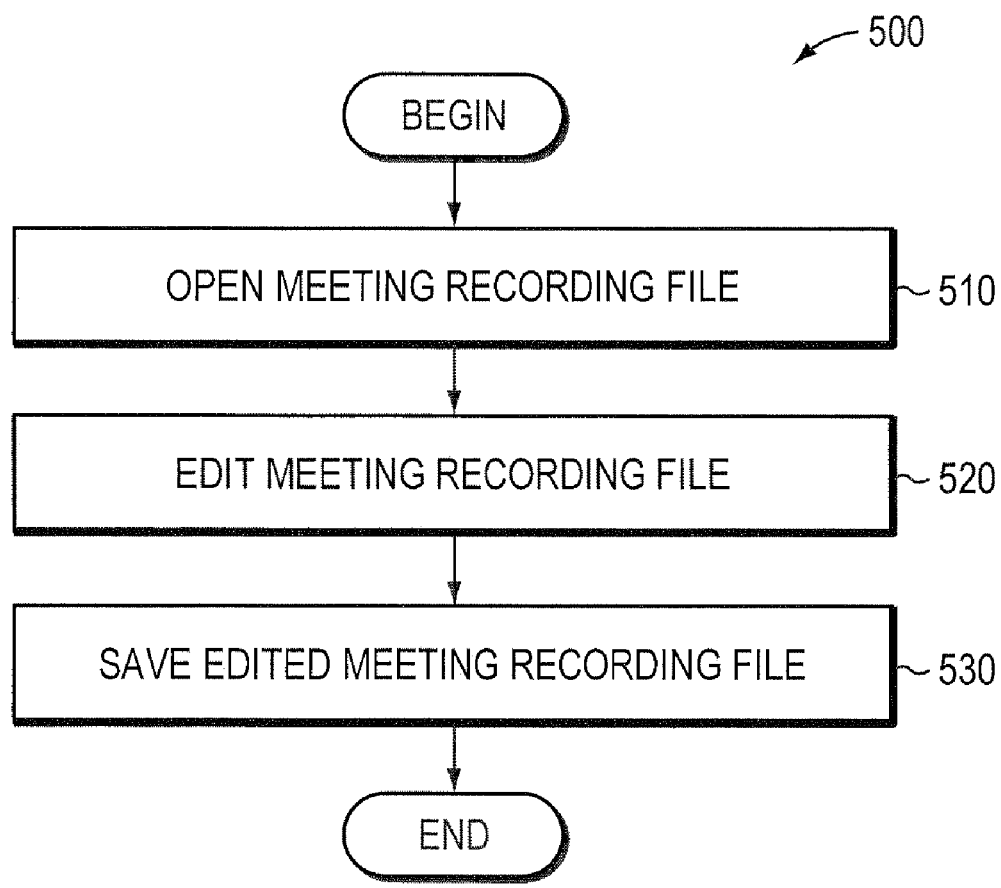
FIG. 5 is a flow diagram of an operation for editing an on-line meeting in a distributed collaborative computing system, in accordance with some embodiments of the invention.

FIG. 5 is a flow diagram of an operation 500 for editing an on-line meeting in a distributed collaborative computing system 100, in accordance with some embodiments of the invention. In stage 510, a meeting recording file is opened. In stage 520, the meeting recording file is edited using editing software 202. In stage 530, the edited meeting recording file is saved.

In some embodiments, editing software 202 (which is referred to as a "Recording Editor" in some embodiments) includes a user interface (e.g., a "Recording Editor" user interface that displays an editor window in which content is played) that enables users to do one or more of the following:

Record an on-line meeting (e.g., create .wrf file by, for example, invoking recording software 200).

Play back and edit recordings (e.g., .wrf files that users have created using recording software 200) The term "play back" refers to playing a recording during the editing process. The term "recording" refers to content in a .wrf file that a user has created using either editing software 200 or an integrated recording capability for an on-line meeting. This content consists of both audio and images of user interactions with interface elements on a computer screen.

Play back and edit recordings that users have captured using an integrated recording capability available during on-line meetings.

Navigate a timeline for a recording, which is displayed as snapshots of recorded images. The term "timeline" refers to a strip that displays time in increments of ten seconds and fractions of ten seconds. The timeline contains snapshots, or recorded images, each of which represents 10 seconds in the elapsed time of a recording. The term "snapshot" refers to, on the timeline, an image that represents 10 seconds in the elapsed time of a recording. Snapshots are representative images from a sequence of recorded images and are automatically generated at intervals of 10 seconds.

Fast forward or rewind a recording.

View a specific segment of a recording. The term "segment" refers to a part of a recording that a user creates either automatically during recording, for example, by pausing or stopping, then resuming recording, or manually using recording software 200. In a part of the timeline that shows increments of time, each segment of a recording may be displayed in a different color.

Cue a recording for editing while monitoring audio. The term "cue" refers to finding a specific location in a recording by slowly advancing or backtracking through the recording while monitoring audio.

Set markers that indicate a point on the timeline at which an action is to occur or to which a user can jump. The term "marker" refers to a flag that a user inserts to indicate a point on the timeline at which an action is to occur or to which a user can jump. A user may insert pairs of markers to indicate starting and ending points of a range of time.

Jump directly to a marker.

Punch in and punch out (manually and/or automatically) to edit part of a recording. The term "punch in" refers to manually beginning recording at a specific location in an existing recording and overwriting the existing recording. The term "punch-in point" refers to a location at which a user inserts a T-shaped marker in a circle, to indicate a point at which auto punch in occurs. The term "punch out" refers to manually stopping recording at a specific location in an existing recording. The term "punch-out point" refers to a location at which a user inserts a T-shaped marker in a square, to indicate a point at which auto punch out occurs. The term "punch points" refer to specified locations at which auto punch in and punch out occur. In some embodiments, a rehearsal mode is available that allows a user to rehearse punching in and punching out by simulating the punch-in/punch-out process. The term "auto punch in refers to automatically beginning recording at a specific location in an existing recording and overwriting the existing recording. The term "auto punch out" refers to automatically stopping recording at a specific location in an existing recording.

Record a new segment for insertion at a specific point in an existing recording.

Truncate a beginning or ending of a recording (e.g., delete all data that either precedes or follows a current location in a recording).

Define and name new segments in an existing recording.

Edit or delete existing segments of a recording.

Reorder recorded segments of a recording.

Drag, cut, copy, and paste selected data or segments, and view data in, for example, a clipboard (e.g., memory that contains a copy of data last copied or cut for audio and/or recorded images).

Drag or copy selected data or segments from one recording to another recording.

Build a recording by concatenating existing segments of recordings or entire recordings (e.g., entire .wrf files).

Merge and unmerge segments of a recording. The term "merge" refers to creating a single segment from two or more segments that are currently selected. The term "unmerge" refers to restoring a selected segment consisting of previously merged segments to component segments.

Split a segment into two segments.

Insert a picture to appear in a recording for a specified duration.

Add titles to appear in a recording for a specified duration.

Annotate a recording.

Start an on-line meeting.

In some embodiments, a conceptual model design is used for an editing software user interface. The conceptual model for editing software user interface includes:

Key components with which users will interact.

An overall structure of a user interface, including menus and dialog boxes.

User interaction models that provide a consistent user experience throughout the user interface, including:
navigation models,
selection models,
editing models, and High-level presentation standards for work products, processes, windows, dialog boxes, and message boxes.

Users of editing software 202 may focus on creation of a specific work product (e.g., a meeting recording file). Within a recording, users may also create segments. The tasks that a user performs or processes involved in creating a recording may include one or more of the following:

Creating a new recording.

Annotating a recording.

Saving a recording.

Playing back a recording.

Starting a meeting.

Navigating a timeline for a recording.

Viewing a specific segment.

Cueing a recording, where the term "cueing" refers to slowly advancing or backtracking through part of a recording, while monitoring audio, to select a location at which to insert a marker, or begin recording or playback. Cueing allows a user to precisely select a new current location at which to begin playback or editing, or insert a marker. The term "playback" refers to an act of playing back a recording.

Inserting a marker.

Editing an existing recording.

Punching in and out to edit a recording.

Inserting a new recorded segment.

Truncating a recording.

Defining, editing, and deleting a segment.

Sequencing segments.

Cutting and pasting segments.

Inserting an existing segment.

Inserting another existing recording (e.g., an entire .wrf file).

Merging and unmerging segments.

Splitting a segment into two segments.

Inserting a picture.

Inserting titles (e.g., text inserted into a recording).

Specifying preferences.

In some embodiments, editing software 202 user interface has the following menu structure, and, thus, navigation to primary dialog boxes:

File menu—ALT+F
Edit menu—ALT+E
Insert menu—ALT+I
View menu—ALT+V
Controls menu—ALT+C
Tools menu—ALT+T
Window menu—ALT+W
Help menu—ALT+H In some embodiments, for both commands on menus on the menu bar and commands on pop-up menus, an underlined letter in each command name indicates an access key associated with the command. Use of an access key (e.g., CRTL+<access key>) has the same effect as clicking a command. The term "clicking" refers to pointing at an item with, for example, a mouse and depressing a mouse button.

Figure 6:
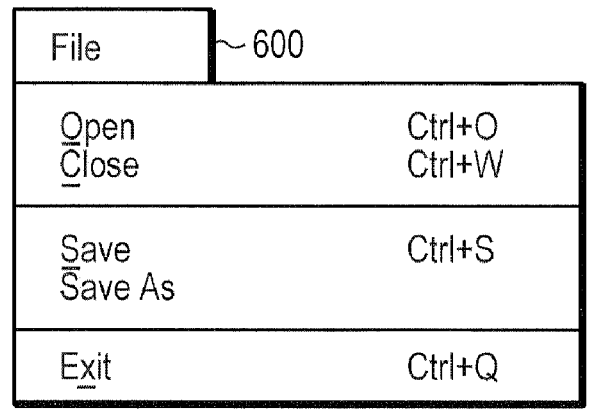
FIG. 6 illustrates a File menu, in accordance with some embodiments of the invention.

In some embodiments, the File menu groups commands pertaining to recorded files. The term "recorded file" refers to a meeting recording file and has a .wrf file extension. FIG. 6 illustrates a File menu 600, in accordance with some embodiments of the invention. In some embodiments, the File menu contains one or more of the following commands and separator bars, in the following order:

Open . . .
Close
_____ (separator bar)
Save
Save As . . .
_____ (separator bar)\
Preview
_____ (separator bar)
Exit In some embodiments, the File menu also includes a New command.

Table 1 identifies the name of a command in the File menu, the keyboard shortcut for the command, and detailed information about the command in some embodiments.

TABLE 1

| COMMAND | KEYBOARD SHORTCUT | FUNCTION |
| --- | --- | --- |
| New . . . | Ctrl + N | When a user chooses this command, the New Recording dialog box is displayed, allowing the user to create a new, untitled recording. |
| Open . . . | Ctrl + O | When a user chooses this command, an Open dialog box is displayed, with the title Open Recording, allowing the user to open an existing recorded file stored on either the user's hard disk or a local server. In some embodiments, this command appears dimmed once a user has opened a recorded file. The term "dimmed" refers to a menu, command, button, or option that a user cannot currently choose, click, or select, respectively, because the menu, command, button, or option is currently unavailable; such an element may appear grayed or shaded. In some embodiments, users open files one at a time, while in other embodiments, users may open multiple files at once. When the recorded file is displayed in the editor window, the first frame of the recording is displayed in the editor window viewer. The term "frame" refers to a single image in a series of images that constitutes a recording. In some embodiments, each frame corresponds to 0.4 second on the timeline. The term "editor window viewer" refers to an area of editing software 202 user interface in which playback occurs. |
| Close Ctrl + W | Ctrl + W | When a user chooses this command, the active window closes. If no window other than the editor window is currently open and a user chooses this command, the editor window closes. In this case, choosing the Close command has the same effect as choosing the Exit command. If the window is an application window and contains the last recorded file remaining open, the following message may be displayed: Do you want to quit Recording Editor? |

TABLE 1-continued

| COMMAND | KEYBOARD SHORTCUT | FUNCTION |
|---|---|---|
| | | The user can click Yes or No. Clicking Yes quits the application. Clicking No closes the recorded file, but not the application. An empty editor window remains open. When the user opens another recorded file, the recorded file is displayed in the empty editor window. If a user has made unsaved changes to the recorded file in the window being closed, the following message may be displayed: Do you want to save your changes to [File Name]? The user can click Yes, No, or Cancel. Clicking Yes saves the user's changes, then closes the editor window. Clicking No closes the editor window, without saving the user's changes to the recorded file. Clicking Cancel returns the user to the editor window, which remains open. |
| Save | Ctrl + S | This command allows a user to save a previously saved file at the same location on either the user's hard disk or a local server, under the same file name. Once a user has saved changes to the recording in the active window, or if no unsaved changes currently reside in memory, this command appears dimmed. When a user chooses this command and has not previously saved changes to the recording in the active window, a Save As dialog box is displayed, with the title Save Recording As, allowing the user to save the recording. |
| Save As . . . | | This command allows a user to save a file at a specific location on either the user's hard disk or a local server, under a specified file name, and as a file of a specified type. When no recording is currently open, this command appears dimmed. When a user chooses this command, a Save As dialog box is displayed, with the title Save Recording As, allowing the user to save changes to the recording in the active window. |
| Preview | Ctrl + P | This command allows a user to preview edits to a recording before saving them. Once a user has saved a new recording or edits, or if no unsaved recording or edits currently reside in memory, this command appears dimmed. When a user chooses this command, newly recorded or edited parts of the recording in the active window, which a user has not yet saved, play back in a Preview window. |
| Exit | Ctrl + Q | When a user chooses this command, the editor window and any other associated windows that the editor window contains close. If a user has made unsaved changes to the recorded file in the window being closed, the following message may be displayed: Do you want to save your changes to [File Name]? The user can click Yes, No, or Cancel. Clicking Yes saves the user's changes, then closes the editor window. Clicking No closes the editor window, without saving the user's changes to the recorded file. Clicking Cancel returns the user to the editor window, which remains open. |

In some embodiments, the Open Recording dialog box shows the first file in a list of files as being selected and the File name text box is empty by default. In the Open Recording and Save Recording As dialog boxes, the file type for recordings is, for example, *.wrf. In the Save Recording As dialog box, no file is selected in the list and the File name text box contains the following file name by default:

Untitled Recording.wrf

The default file name may appear highlighted. If a user has previously saved a file using the default file name during a work session, a number is added to the default 10 file name, preceding the extension. For example, when a user has saved a file named Recording.wrf, the default file name may be:

Untitled Recording 2.wrf

Initially, the default location to which a recorded file would be saved if a user does not specify a location may be a My Documents folder. However, once a user saves a file to another location during a work session, that location becomes the default location.

In some embodiments, messages may appear when a user chooses a command on the File menu. For example, when editing software 202 cannot find a file, editing software 202 may display the following message:

Cannot find the file [File Name].

The user can click OK. Clicking OK returns the user to the editor window.

When a user chooses Save As to save a recorded file and another file of the same name already exists at that location, the following message may be displayed:

A file of the name [File Name] already exists. Do you want to replace the existing file of the same name?

In some embodiments, the path name is not included in the [File Name] variable. The user can click Yes, No, or Cancel. Clicking Yes saves the file, replacing the existing file of the same name. Clicking No returns the user to the Save As dialog box, allowing the user to change the file name, then try again. Clicking Cancel returns the user to the editor window, without saving the user's changes to the recorded file under a different name or to a different location.

When a user saves a recorded file and there is not enough space available on the selected disk to save the file, the following message may be displayed:

Insufficient space is available on the selected disk to save your file. Please select a different disk and try again.

The user can click OK or Cancel. Clicking OK returns the user to the Save As dialog box, allowing the user to select another disk on which to save the file, then try again. Clicking Cancel returns the user to the editor window, without saving the user's changes to the recorded file.

When a user attempts to perform a task and there is not enough memory available, the following message may be displayed:

Insufficient memory is currently available to [Task Description]. Please close other applications or documents, then try again.

The user can click OK. Clicking OK returns the user to the editor window, without performing the operation.

In some embodiments, when a user opens a recorded file, one of the following progress indicators is displayed:

If the process of generating snapshots will take less than one minute, an hourglass pointer is displayed, indicating that processing is in progress.

[If the process of generating snapshots will take more than one minute, a progress message box is displayed, indicating the percentage of the process that is currently complete and the time remaining till completion. This message box remains visible until the process is complete.

For example, the title bar may contain the title "Recording Editor" and a Close button. The title may be indented by 5 pixels. The following message may be displayed on the first line of message text:
Generating snapshots . . .
This message text is left aligned, indented from the left border of the window by 15 pixels, and 15 pixels below the title bar of the message box.

Additionally, the time remaining, in minutes, may be displayed on the second line of message text, as follows:
Time remaining: about [#] minutes
Time remaining: about 1 minute
Time remaining: less than a minute The time-remaining message may be left aligned, indented from the left border of the window by 15 pixels, and 9 pixels below the baseline of the first line of text.

The progress bar may be indented from both the left and right borders of the window by 15 pixels, 15 pixels below the baseline of the time-remaining message text, 24 pixels in height, and 344 pixels wide. A solid bar may be used to show the percentage of completion.

In some embodiments, a user can click Cancel, click the Close button, or press Esc to stop the process at any time. The Cancel button may be 15 pixels below the progress bar, and 15 pixels from both the right and bottom borders of the window.

If a user stops the process of generating snapshots before the process is complete, when the user later moves a current location indicator to a part of the recording for which no snapshots have been generated, snapshots will be generated dynamically. The term "current location indictor" refers to an indicator that shows the current location on the timeline during playback, which may correspond to an image that currently is displayed in the editor window viewer. A user can drag the current location indicator to finely adjust the current location.

Figure 7:
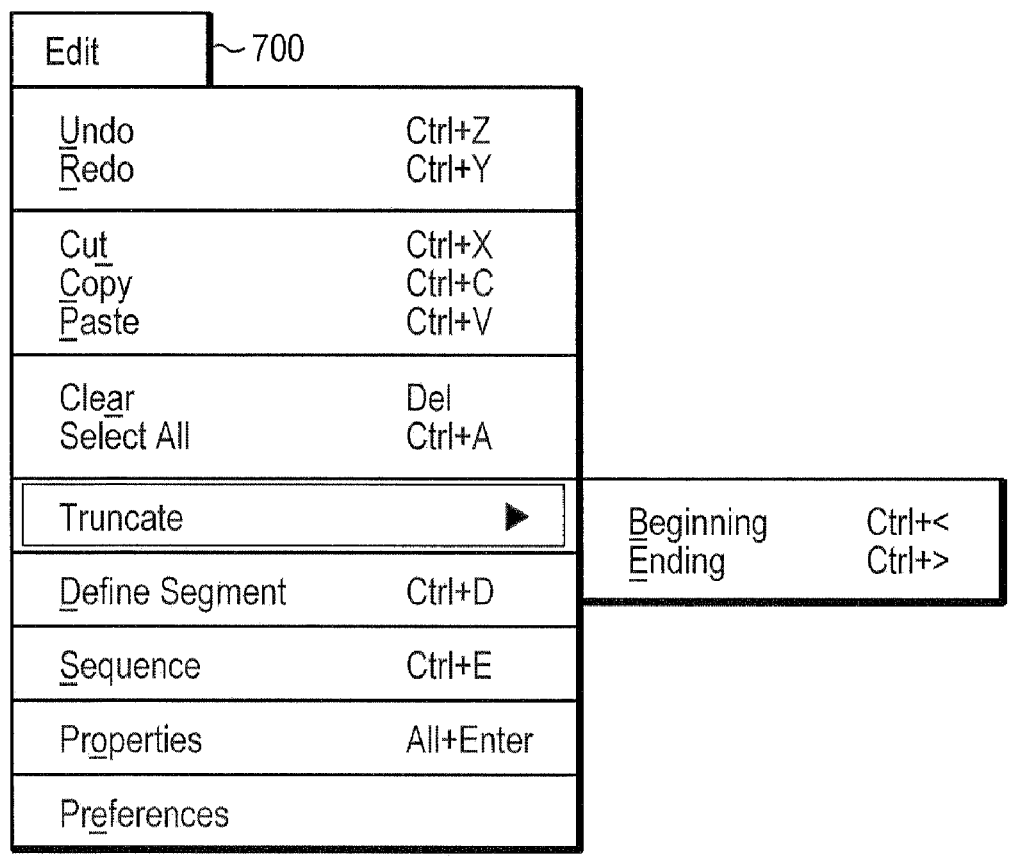
FIG. 7 illustrates an Edit menu, in accordance with some embodiments of the invention.
Figure 8A:
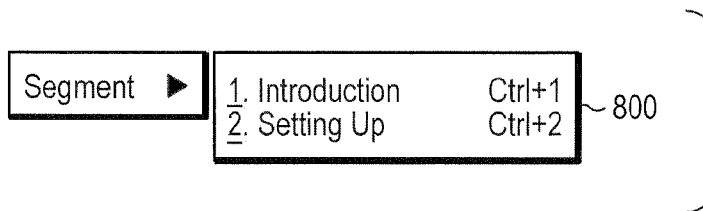
FIGS. 8A-8E illustrate segment submenus, in accordance with some embodiments of the invention.
Figure 8B:
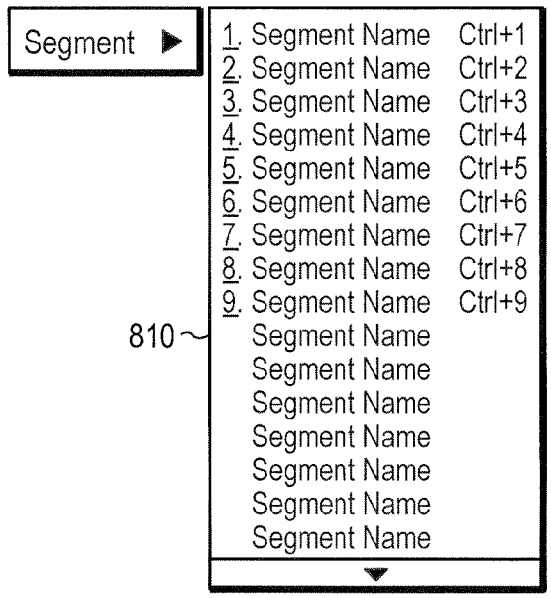
Figure 8C:
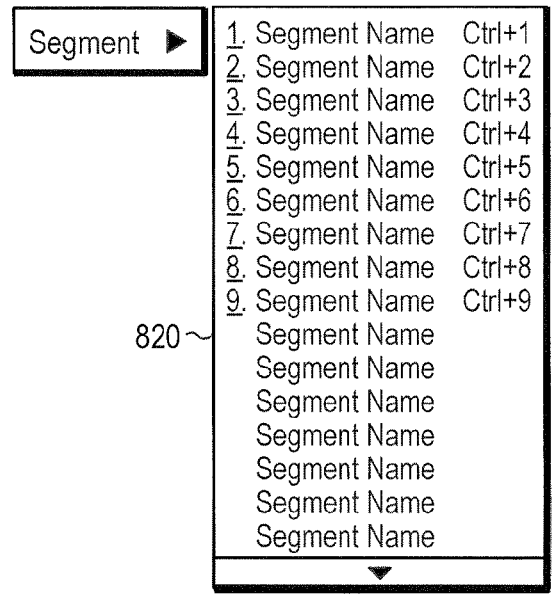
Figure 8D:
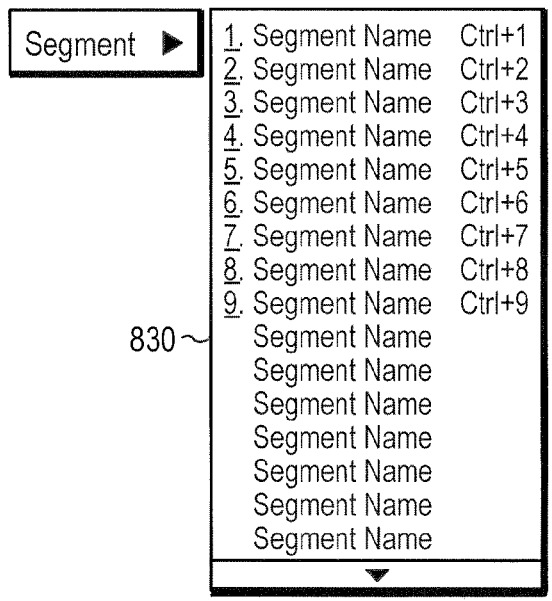
Figure 8E:
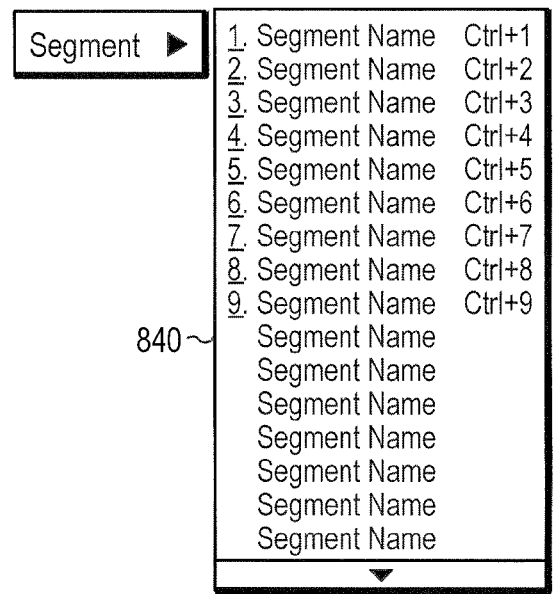

In some embodiments, the Edit menu groups commands for editing a recording. FIG. 7 illustrates an Edit menu 700, in accordance with some embodiments of the invention. In some embodiments, the Edit menu contains one or more of the following commands and separator bars, in the following order:

Undo
Redo
_____
Cut
Copy
Paste
_____
Clear
Select All
_____
Truncate (submenu)
   Beginning
   Ending
_____
Find . . .
_____
[Define Segment . . .
_____
Sequence . . .
_____
Properties . . .
_____
Preferences .

Table 2 provides detailed information about the commands on the Edit menu in some embodiments.

TABLE 2

| COMMAND | KEYBOARD SHORTCUT | FUNCTION |
|---|---|---|
| Undo | Ctrl + Z | Reverses a user's last action. This command provides a single level of undo.<br>This command appears dimmed when there is currently no action that can be reversed, or if the last reversible action edited the timeline or segment list, during playback or when playback is paused. |

TABLE 2-continued

| COMMAND | KEYBOARD SHORTCUT | FUNCTION |
|---|---|---|
| Redo | Ctrl + Y | Restores a user's last action. This command appears dimmed when there is currently no action that can be restored, or if the last reversible action edited the timeline or segment list, during playback or when playback is paused. |
| Cut | Ctrl + X | Removes the current selection and places the current selection on the Clipboard. This command appears dimmed when there is no current selection, or during playback or when playback is paused. |
| Copy | Ctrl + C | Copies the current selection and places the current selection on the Clipboard. This command appears dimmed when there is no current selection or the current selection is a cue point marker. The term "cue point" refers to the location at which a user inserts a marker, in the form of an inverted triangle, allowing the user to jump directly to that precise location on the timeline. |
| Paste | Ctrl + V | Inserts the contents of the Clipboard, as follows: if a range of recorded data, a segment, or an entire recording, editing software 202 inserts the recorded data, segment, or recording either at the current location or preceding any recorded data that is currently selected on a timeline or inserts the segment or recording before the current selection in the segment list in the sequence editor window if a marker, editing software 202 inserts at the current location on the timeline or replaces any marker that is currently selected on the timeline if text, editing software 202 inserts at the insertion point that is currently selected; or replaces any selected text This command appears dimmed when either the Clipboard is empty, the type of data on the Clipboard cannot be pasted at the current location or preceding the current selection, or during playback or when playback is paused. |
| Clear | Del | Deletes the current selection, without placing the current selection on the Clipboard, and thus, has the same effect as the Delete key. This command appears dimmed when there is no current selection, or during playback or when playback is paused. When a user chooses this command and a segment is the current selection, the Delete Segment message box is displayed, allowing the user to confirm the deletion. |
| Select All | Ctrl + A | Selects all content in the active window, or in a text box that contains the insertion point. This command appears dimmed when no recording is currently open or, in a dialog box, when no text box is active. |
| Truncate | | This submenu groups commands for truncating recordings. |
| Beginning | Ctrl + < | Truncates a recording from the current location to the beginning of the recording, without placing the data on the Clipboard. This command has the same effect as selecting a range of time from the current location to the beginning of the timeline, then pressing the Delete key. In the sequence editor window, this command truncates the beginning of a recording by removing all data that precedes the segment that is currently selected. This command appears dimmed when no recording is currently open, the frame view window is active, the current location is at the very beginning of a recording, or during playback or when playback is paused. When a user chooses Truncate Beginning, the Truncate Beginning message box is displayed, allowing the user to confirm the deletion. Truncates a recording from the current location to the beginning of the recording, without placing the data on the Clipboard. This command has the same effect as selecting a range of time from the current location to the beginning of the timeline, then pressing the Delete key. |

TABLE 2-continued

| COMMAND | KEYBOARD SHORTCUT | FUNCTION |
|---|---|---|
| | | In the sequence editor window, this command truncates the beginning of a recording by removing all data that precedes the segment that is currently selected. This command appears dimmed when no recording is currently open, the frame view window (e.g., a window in which a frame is displayed) is active, the current location is at the very beginning of a recording, or during playback or when playback is paused. When a user chooses Truncate Beginning, the Truncate Beginning message box is displayed, allowing the user to confirm the deletion. |
| Ending | Ctrl + > | Truncates a recording from the current location to the end of the recording, without placing the data on the Clipboard. This command has the same effect as selecting a range of time from the current location to the end of the timeline, then pressing the Delete key. In the sequence editor window (e.g., a window in which a sequence is displayed), this command truncates the ending of a recording by removing all data that follows the segment that is currently selected. This command appears dimmed when no recording is currently open, the frame view window is active, or the current location is at the very end of a recording, or during playback or when playback is paused. When a user chooses Truncate Ending, the Truncate Ending message box is displayed, allowing the user to confirm the deletion. |
| Find . . . | Ctrl + F | Displays the Find dialog box, in which a user can search for a text string in the titles, or the name of a segment or marker. The Find dialog box is a modeless dialog box. This command appears dimmed when no recording is currently open. |
| Define Segment . . | Ctrl + D | Displays the Define Segment dialog box, in which a user can define or edit a segment and the segment's properties, including the name of the segment. The Define Segment dialog box is a modeless dialog box. This command appears dimmed when no recording is currently open or the sequence editor window is active. When defining a new segment, a user can first insert either a starting point marker, an ending point marker, or both starting and ending point markers for the segment, select the marker or markers, then choose Define Segment. When created consecutively, starting and ending point markers automatically constitute a pair. A starting point refers to a location at which a user inserts a marker, in the form of, for example, an inverted triangle containing an S, to define the beginning of a range of time on the timeline. An ending point is a location at which a user inserts a marker, in the form of, for example, an inverted triangle containing an E, to define the end of a range of time on the timeline. A user can instead choose Define Segment with no markers selected. In this case, the current location constitutes the beginning of the segment by default and is displayed in the Starting point text box. The user may specify a different starting point. The user may specify the ending point. A user may specify a starting or ending point either by typing the point's location in the Starting point or Ending point text box; or while the Define Segment dialog box remains open, moving the current location indicator to the starting or ending point, then inserting a starting or ending point marker on the timeline. The locations of the starting and ending points appear in the Starting point and Ending point text boxes, respectively. Clicking Define closes the Define Segment dialog box, and the segment, and the segment's starting and ending point markers appear selected on the timeline. Also, a user can select the ending point marker for a preceding segment, then choose Define Segment. The precise location of the ending point constitutes the beginning of the new segment and is displayed in the |

TABLE 2-continued

| COMMAND | KEYBOARD SHORTCUT | FUNCTION |
| --- | --- | --- |
| | | Starting point text box. Likewise, the user can select the starting point for any segment that immediately follows the segment being defined. The precise location of the starting point constitutes the end of the new segment and is displayed in the Ending point text box.<br>To edit an existing segment, a user can select either the segment's starting point or the entire segment, then choose Define Segment or Properties. |
| Split Segment . . . | | Displays the Split Segment dialog box, in which a user can define a split point. The Split Segment dialog box is a modeless dialog box. The term "split point" refers to a location at which a user inserts a marker, in the form of an inverted triangle containing an S, to define the point at which to split an existing segment into two.<br>This command appears dimmed when no recording is currently open or the sequence editor window is active. When defining a split point, a user can first insert a starting point marker for the second segment, select the marker, then choose Split Segment.<br>A user can instead choose Split Segment with no marker selected. In this case, the current location constitutes the split point by default and is displayed in the Starting point text box for the second segment. The user can specify a different starting point, either by typing the location of the starting point in the Starting point text box, or while the Split Segment dialog box remains open, moving the current location indicator to the starting point, then inserting a starting point marker on the timeline. The location of the starting point marker is displayed in the Starting point text box. Clicking Split closes the Split Segment dialog box, and the two new segments, and their starting and ending point markers appear selected on the timeline. |
| Sequence | Ctrl + E | Displays the sequence editor window, in which a user can reorder, rename, merge, unmerge, or delete segments of a recording. This is a modeless window. This command appears dimmed when no recording is currently open, no segments have been defined, or the sequence editor window is active.<br>If a user makes changes in the sequence editor window, the changes are immediately reflected in the corresponding editor window, and vice versa.<br>In the sequence editor window, when a user selects a segment, then clicks Delete, the Delete Segment message box is displayed, allowing the user to confirm the deletion. If the user clicks Yes, the entire segment is deleted. |
| Properties | Alt + Enter or Alt + Double-click | Displays a Properties dialog box for the current selection, allowing a user to specify or edit properties of the current selection. Possible selections include segments, cue point markers, or titles. It is possible for multiple Properties dialog boxes to be open at once. Properties dialog boxes are modeless dialog boxes. This command appears dimmed when there is no current selection, the Properties dialog box for the current selection is already open, or there is no Properties dialog box for the current selection. |
| File Properties | | Displays the File Properties dialog box, in which a user can define the properties of a recorded file. |
| Preferences | | Displays the Preferences dialog box, in which a user can define preferences for editing software 202 user interface (e.g., the editor window). |

In some embodiments, the Insert menu groups commands for inserting elements into a recording. In some embodiments, the Insert menu contains one or more of the following commands and separator bars, in the following order:

Marker (submenu)
    Cue Point . . .
--------
Starting Point . . .
Ending Point . . .
--------
Punch-In Point . . .

Punch-Out Point . . .
--------
Punch In/Punch Out
--------
Recording . . .
Segment . . .
Image . . .
--------
Title . . .

Table 3 provides detailed information about the commands on the Insert menu in some embodiments.

TABLE 3

| COMMAND | KEYBOARD SHORTCUT | FUNCTION |
|---|---|---|
| Marker | | This submenu groups commands for inserting markers. The title of this submenu and all of the commands in the submenu appear dimmed when the sequence editor window is active. |
| Cue Point . . . | Ctrl + J | Sets a cue point at the current location, which allows a user to jump directly to that precise location on the timeline. A marker in the form of an inverted triangle represents this cue point. This command appears dimmed when no recording is currently open. When a user chooses this command, the Cue Point Marker Properties dialog box is displayed, in which the user can specify the properties of the cue point marker. |
| Starting Point . . . | Ctrl + T | Sets the starting point of a range of time at the current location. A marker in the form of an inverted triangle that contains an S represents this starting point. This command appears dimmed when no recording is currently open. When a user chooses this command, the Starting Point Marker Properties dialog box is displayed, in which the user can specify the properties of the starting point marker. |
| Ending Point . . . | Ctrl + Alt + T | Sets the ending point of a range of time at the current location. A marker in the form of an inverted triangle that contains an E represents this ending point. This command appears dimmed when no recording is currently open. When a user chooses this command, the Ending Point Marker Properties dialog box is displayed, in which the user can specify the properties of the ending point marker. |
| Punch-In Point . . . | Ctrl + U | Sets a punch-in point at which punch-in recording automatically begins at the current location. A T-shaped marker in a red circle represents this punch-in point. This command appears dimmed when no recording is currently open. When a user chooses this command, the Punch-In Point Properties Marker dialog box is displayed, in which the user can specify the properties of the punch-in point marker. |
| Punch-Out Point . . . | Ctrl + Alt + U | Sets a punch-out point - at which punch-in recording automatically ends—at the current location. A T-shaped marker in a black square represents this punch-out point. This command appears dimmed when no recording is currently open. When a user chooses this command, the Punch-Out Point Marker Properties dialog box is displayed, in which the user can specify the properties of the punch-out point marker. |
| Punch In/Punch Out | Ctrl + I | Toggle command. The Punch In command starts punch-in recording manually at the current location or automatically at the specified punch-in point. The Punch Out command manually stops punch-in recording. If punch out occurs automatically, the command toggles back to Punch In. Initially, the Punch In command appears dimmed when no recording is currently open. Once a user chooses Punch In, the command toggles to Punch Out, and vice versa. |
| Recording . . . | Ctrl + Alt + R | Inserts an existing recorded file, or .wrf file, at the current location on a timeline. In the sequence editor |

TABLE 3-continued

| COMMAND | KEYBOARD SHORTCUT | FUNCTION |
|---|---|---|
| | | window, inserts a recording before the selected segment, or if more than one segment is selected, the first selected segment.<br>This command appears dimmed when no recording is currently open, or during playback or when playback is paused. When a user chooses this command, an Open dialog box is displayed, with the title Insert Recording, allowing the user to insert an existing recorded file. An Insert button replaces the Open button. |
| Segment . . . | Ctrl + Alt + S | Inserts a segment from another recorded file, or .wrf file, at the current location. This command appears dimmed when a single recording or no recording is currently open.<br>When a user chooses this command, the Insert Segment dialog box is displayed, in which the user can select a recording from a list of open recordings, then select the recorded segment that the user wants to insert at the current location. |
| Image . . . | Ctrl + Alt + I | Inserts an image into a recording for a specified period of time, beginning at the current location.<br>This command appears dimmed when no recording is currently open.<br>When a user chooses this command, an Open dialog box is displayed, with the title Insert Image, allowing the user to insert an existing image file. An Insert button replaces the Open button. |
| Title . . . | Ctrl + " | Inserts a title, or caption, into a recording for a specified period of time, beginning at the current location.<br>This command appears dimmed when no recording is currently open.<br>When a user chooses this command, the Insert Title dialog box is displayed, in which the user can specify the text that the user wants to insert and format that text. |

In some embodiments, "post-roll offset" refers to the span of time between a specified punch-out point and the following post-roll point (e.g., a location in a recording that is 3 seconds after a specified punch-out point). A "pre-roll offset" refers to the span of time between a pre-roll point and the following specified punch-in point. The term "pre-roll point" refers to a location in a recording that is 5 seconds before a specified punch-in point.

In some embodiments, the View menu groups commands that pertain to the display of segments of a recording or palettes on a user's screen. In some embodiments, the View menu contains one or more of the following commands and separator bars, in the following order:

Sequence Editor

Frames . . .

Segments . . .
Markers . . .

Clipboard . . .

Hide All Palettes/Show Palettes

Toolbar
Timeline

Table 4 provides detailed information about the commands on the View menu in some embodiments.

TABLE 4

| COMMAND | KEYBOARD SHORTCUT | FUNCTION |
|---|---|---|
| Sequence Editor | Ctrl + E | Displays the sequence editor window, in which a user can reorder, rename, merge, or delete segments of a recording. This is a modeless window.<br>This command appears dimmed when no recording is currently open, no segments have been defined, or the sequence editor window is already open and active.<br>If a user makes changes in the sequence editor window, the changes are immediately reflected in the corresponding editor window, and vice versa.<br>In the sequence editor window, when a user selects a segment, then clicks Delete, the Delete Segment |

TABLE 4-continued

| COMMAND | KEYBOARD SHORTCUT | FUNCTION |
|---|---|---|
| | | message box is displayed, allowing the user to confirm the deletion. If the user clicks Yes, the entire segment is deleted. |
| Frames | F2 | Displays the frames that correspond to the current location snapshot that is currently selected on the timeline in the editor window (e.g., the preceding and two following snapshots on a timeline in the frame view window). This command appears dimmed when no recording is currently open, the editor window is not active, or the frame view window is already open, or no snapshot is currently selected. If a user selects more than one snapshot, then chooses this command, a message box is displayed, containing the following message text and an OK button: The user may select one snapshot, then choose Frames on the View menu to view the frames that correspond to that snapshot, and the preceding and following snapshots. If a user makes changes in the frame view window, the changes are immediately reflected in the corresponding editor window, and vice versa. |
| Segments | F11 | Displays, then hides a list of segments on a floating palette, referred to herein as a Segments palette. A user can select a segment in the list to navigate to the segment on the timeline. By default, the Segments palette is closed. Choosing Segments opens the palette and a check mark is displayed to the left of this command. Choosing Segments again closes the palette and removes the check mark. This command appears dimmed when no recording is currently open, the editor window is not active, or no segments have been defined. If the Segments palette is already open and a user opens the frame view or sequence editor window, the palette becomes inactive and the current contents of the palette appears dimmed. Once both of these windows are closed, if the user has edited the segment list, the list in the Segments palette is updated, then the contents of the palette again becomes available. |
| Markers | F12 | Displays, then hides a list of markers on a floating palette, referred to herein as a Markers palette. A user can select a marker in the list to navigate to the marker on the timeline. By default, the Markers palette is closed. Choosing Markers opens the palette and a check mark is displayed to the left of this command. Choosing Markers again closes the palette and removes the check mark. This command appears dimmed when no recording is currently open, the editor window is not active, or no markers have been defined. If the Markers palette is already open and a user opens the frame view or sequence editor window, the palette becomes inactive and the contents of the palette appears dimmed. Once both of these windows are closed, the contents of the palette again becomes available. |
| Clipboard | Ctrl + B | Displays the Clipboard palette, which shows the current contents of the Clipboard, if any. This command may appear dimmed when the Clipboard is empty. |
| Hide All Palettes/Show Palettes | Ctrl + H | This is a toggle command. Choosing Hide All Palettes hides all palettes that are currently open, including the Markers palette, Segments palette, Volume palette, and Set Current Location palette. Choosing Show Palettes displays all palettes that were previously open and were closed when the user chose Hide All Palettes. Initially, the Hide All Palettes command appears dimmed if no palettes are currently open. Once a user chooses Hide All Palettes, the command toggles to Show Palettes, and vice versa. |
| Toolbar | | This is a toggle command. By default, a check mark is displayed to the left of this command and the toolbar is displayed below the menu bar. Choosing Toolbar |

TABLE 4-continued

| COMMAND | KEYBOARD SHORTCUT | FUNCTION |
|---|---|---|
| Timeline | | hides the toolbar and removes the check mark. Choosing Toolbar again displays the toolbar and the check mark reappears. The term "toolbar" refers to a row of icon buttons immediately below the menu bar. This is a toggle command. By default, a check mark is displayed to the left of this command and the timeline is displayed below the toolbar. This command appears dimmed when the editor window is not active. Choosing Timeline hides the timeline and removes the check mark. Choosing Timeline again displays the timeline and the check mark reappears. |

In some embodiments, the Segments submenu may comprise a list of the segments in a recording. If a recording consists of more than, for example, ten segments, a downward-pointing arrow is displayed at the bottom of the submenu. A user can click the arrow to display additional items in the list. If the submenu consists of more items than can appear on the screen at once, the following rules apply:

Initially, a downward-pointing arrow is displayed at the bottom of the submenu, indicating that items are out of view at the bottom of the submenu.

If items are out of view at both the top and bottom of the submenu, an upward-pointing arrow is displayed at the top of the submenu and a downward-pointing arrow is displayed at the bottom of the submenu.

If items are out of view at the top of the submenu, an upward-pointing arrow is displayed at the top of the submenu.

Each item in the list of segments is displayed in the following format:

[#]: [Segment Name]

For example:

1: Introduction

3: Untitled 4

In some embodiments, the Controls menu groups commands pertaining to the recording console and transport and other controls. The term "recording console" refers to controls that appear on the screen during recording, which may be primarily transport controls. The term "transport controls" refers to controls that allow a user to record, play, pause/resume, stop, fast forward, and rewind a recording.

In some embodiments, the Controls menu contains one or more of the following commands and separator bars, in the following order:

Set Current Location
Go to Current Location

Record/Stop Recording

Start Playback/Stop Playback
Pause Playback/Resume Playback

Reverse Cueing The term "reverse cueing" refers to slowly backtracking through a recording, while monitoring audio.
Forward Cueing Rewind to Beginning
Previous Segment
Next Segment
Fast Forward to End Segment submenu
  [List of Segments]

Shuttle Wheel
Volume
Mute/Unmute

Hide Console/Show Console
Table 5 provides detailed information about the commands on the Controls menu in some embodiments.

TABLE 5

| COMMAND | KEYBOARD SHORTCUT | FUNCTION |
|---|---|---|
| Set Current Location | Ctrl+L | Sets the current location on a timeline by automatically moving the current location indicator to the left boundary of the snapshot, frame, or first snapshot in a segment or range of time that is currently selected. In the sequence editor window, sets the current location at the beginning of the selected segment. This command appears dimmed when no recording is currently open; no snapshot, frame, or segment or range of time is currently selected; or during playback or when playback is paused. |
| Go to Current Location | Ctrl+Alt +L | Scrolls the timeline to bring the current location indicator into view, at the center of the timeline. This command appears dimmed when no recording is currently open. |

TABLE 5-continued

| COMMAND | KEYBOARD SHORTCUT | FUNCTION |
|---|---|---|
| Record/Stop Recording | Ctrl+R | This is a toggle command.<br>Starts recording at the current location, then stops recording.<br>The Record command appears dimmed when no editor window is currently open. Once a user chooses Record, the command toggles to Stop Recording, and vice versa.<br>Once a user stops recording, the user can define the starting point of a new segment by starting recording again, then the ending point of the new segment by stopping recording again. |
| Start Playback/ Stop Playback | F3 | This is a toggle command.<br>Starts playback at the current location on a timeline, then stops playback. During playback, successive frames of the recording appear in the editor window viewer and the current location indicator shows the location of the current frame on the timeline. When playback stops, the frame that corresponds to the current location remains in the editor window viewer. When a user chooses Stop Playback, the current location indicator may not set to the beginning of the recording.<br>Choosing Start Playback starts playback at the current location. In some embodiments, playback may start at the beginning of the recording.<br>In the sequence editor window, Start Playback starts playback at the beginning of a selected segment or, if more than one segment is currently selected, at the beginning of the first selected segment. During playback the number of the segment that is currently playing back appears highlighted.<br>If a user chooses Start Playback when a snapshot, range of recorded data, or segment is currently selected in the editor window, a frame or range of recorded data is currently selected in the frame view window, one or more segments are currently selected in the sequence editor window, the entire selection is played back and playback stops automatically.<br>In the frame view window, playback stops when editing software 202 reaches the end of the frames on the timeline. The Start Playback command appears dimmed when no recording is currently open. Once a user chooses Start Playback, the command toggles to Stop Playback, and vice versa. |
| Pause Playback/ Resume Playback | F4 | This is a toggle command. Pauses playback at the current location, then resumes playback. When playback pauses, the frame that corresponds to the current location remains in the editor window viewer. Playback resumes at the current location, successive frames of the recording again appear in the editor window viewer, and the current location indicator shows the location of the current frame on the timeline.<br>The Pause Playback command appears dimmed when no recording is currently open or playback is not in progress. Once a user chooses Pause Playback, the command toggles to Resume Playback, and vice versa. |
| Reverse Cueing | F6 | During playback or when playback is paused, slowly rewinds a recording and moves the current location indicator to the beginning of the previous snapshot, while monitoring audio then automatically resumes playback.<br>If a user chooses Reverse Cueing during playback, playback then continues until the user either stops or pauses playback to cue the recording, or chooses Reverse Cueing again.<br>If a user chooses Reverse Cueing when playback is paused, playback continues until either the user stops or pauses playback to cue the recording, or the current location indicator returns to its original position (e.g., the position the current location indicator was at when the user chose Reverse Cueing), then playback pauses. During reverse cueing, no video data is displayed in the editor window viewer. When playback pauses after cueing, the frame that corresponds to the current location is displayed in the editor window viewer. |

TABLE 5-continued

| COMMAND | KEYBOARD SHORTCUT | FUNCTION |
|---|---|---|
| | | In some embodiments, this command has a similar effect as dragging the shuttle wheel to turn the shuttle wheel counterclockwise.<br>This command appears dimmed when no recording is currently open, playback is neither in progress nor paused, or the sequence editor window is active. |
| Forward Cueing | F7 | The term "forward cueing" refers to slowly advancing through a recording, while monitoring audio. When a user chooses Forward Cueing during playback or when playback is paused, once playback has advanced through the current and next snapshot, the playback slowly advances through the recording. In some embodiments, the user has neither stopped nor paused playback to cue the recording. In some embodiments, the recording automatically rewinds and the current location indicator moves to its original position (e.g., the position the current location indicator was at when the user chose Forward Cueing). In some embodiments, the current location indicator is moved to the beginning of the next snapshot, while monitoring audio, then playback is automatically resumed.<br>If a user chooses Forward Cueing during playback, playback then continues until the user either stops or pauses playback to cue the recording, or chooses Forward Cueing again.<br>If a user chooses Forward Cueing when playback is paused, once the current location indicator returns to its original position, playback pauses.<br>During forward cueing, video data may not is displayed in the editor window viewer. When playback pauses after cueing, the frame that corresponds to the current location is displayed in the editor window viewer.<br>In some embodiments, this command has a similar effect as dragging the shuttle wheel to turn the shuttle wheel clockwise.<br>This command appears dimmed when no recording is currently open, or when playback is neither in progress nor paused, or the sequence editor window is active. |
| Rewind to Beginning | F5 | Rewinds a recording to its beginning, moving the current location indicator directly to the beginning of the recording. The first frame of the recording is displayed in the editor window viewer.<br>This command appears dimmed when no recording is currently open, the editor window is not active, or the current location is already at the beginning of a recording. |
| Previous Segment | Ctrl+Alt+G | Moves the current location indicator to the beginning of the previous segment on the timeline and displays the first frame of the previous segment in the editor window viewer.<br>This command appears dimmed when no recording is currently open, the editor window is not active, there is no previous segment, or no segments have been defined. |
| Next Segment | Ctrl+G | Moves the current location indicator to the beginning of the next segment on the timeline and displays the first frame of the next segment in the editor window viewer.<br>This command appears dimmed when no recording is currently open, the editor window is not active, there is no next segment, or no segments have been defined. |
| Fast Forward to End | F8 | Fast forwards a recording to its end, moving the current location indicator directly to the end of the recording. The last frame of the recording is displayed in the editor window viewer.<br>This command appears dimmed when no recording is currently open, the editor window is not active, or the current location is already at the end of a recording. |
| Segment | | This submenu provides a list of the segments in a recording. Clicking a segment in the list moves the current location indicator to the beginning of that segment on the timeline and displays the first frame of that segment in the editor window viewer.<br>The Segment submenu appears dimmed when no |

TABLE 5-continued

| COMMAND | KEYBOARD SHORTCUT | FUNCTION |
|---|---|---|
| | | segments have been defined or the sequence editor window is open. |
| [List of Segments] | Ctrl+[#] | Each numbered segment is displayed in order in the menu. For example, 1 Introduction or 3 Untitled. The number for each of the segments 1 through 9 is underlined and may be used as an access key for that segment. Keyboard shortcuts are also available for segments numbered 1 through 9. |
| Shuttle Wheel | Ctrl+Alt+S | Displays or hides the shuttle wheel palette. The shuttle wheel allows a user to easily and precisely cue, or manually set the current location in, a recording. By default, no check mark is displayed to the left of this command and the palette is hidden. If a user chooses this command, a check mark is displayed to its left and the palette is displayed, by default, in the upper-right corner of the user's screen or at its previous location when the user last closed the palette. This command appears dimmed when no recording is currently open. When the shuttle wheel palette is currently open, the keyboard shortcuts for controlling the shuttle wheel are Ctrl+Right Arrow for forward cueing and Ctrl+Left Arrow for reverse cueing. |
| Volume | Ctrl+Alt+V | Displays, then hides the Volume palette. The Volume slider allows a user to easily and precisely set the volume during playback or editing. By default, the Volume palette is closed. Choosing Volume displays the palette, by default, in the lower-right corner of the user's screen or at its previous location when the user last closed the palette and a check mark is displayed to the left of this command. Choosing Volume again closes the palette and removes the check mark. This command appears dimmed when no recording is currently open. When the Volume palette is currently open, the keyboard shortcuts for controlling the Volume slider are Ctrl+Up Arrow to increase the volume and Ctrl+Down Arrow to reduce the volume. |
| Mute/Unmute | Ctrl+M | This is a toggle command. Mutes, then unmutes audio during playback. If a user drags the Volume slider or otherwise increases the volume, the Unmute command automatically toggles to Mute. The Mute command appears dimmed when no recording is currently open or playback is not in progress. Once a user chooses Mute, the command toggles to Unmute, and vice versa. |
| Hide Console/ Show Console | Ctrl+H | This is a toggle command. During recording, choosing Hide Console hides the recording console. Choosing Show Console displays the recording console. The Hide Console command appears dimmed when no recording is currently open. Once a user chooses Hide Console, the command toggles to Show Console, and vice versa. |

In some embodiments, the Segment submenu comprises a list of the segments in a recording. If a recording consists of more than, for example, 15 segments, a downward-pointing arrow is displayed at the bottom of the submenu. A user can click the arrow to display additional items on the submenu. If the submenu consists of more items than can appear on the screen at once, the following rules apply:

Initially, a downward-pointing arrow is displayed at the bottom of the submenu, indicating that items are out of view at the bottom of the submenu.

If items are out of view at both the top and bottom of the submenu, an upward-pointing arrow is displayed at the top of the submenu and a downward-pointing arrow is displayed at the bottom of the submenu.

If items are out of view at the top of the submenu, an upward-pointing arrow is displayed at the top of the submenu.

In some embodiments, entire items may appear in the submenu (e.g., items are not cut in half vertically in order for the submenu to fill the whole screen).

Each item in the Segment submenu is displayed in the following format:

[#] [Segment Name]

For example:

1 Introduction

3 Untitled

The number for each of the segments 1 through 9 is underlined and is may be used as an access key. FIGS. 8A-8E illustrate segment submenus 800, 810, 820, 830, and 840, in accordance with some embodiments of the invention.

In some embodiments, the term "shuttle monitoring" refers to listening to audio while using the shuttle wheel. A user can turn off shuttle monitoring when using the shuttle wheel to go to a general location in a recording, rather than to precisely cue a recording for editing.

The term "shuttle wheel" refers to a form of continuous controller that allows a user to advance or backtrack through a recording, for the purpose of selecting the current location at which to insert a marker, or begin recording or playback. During playback, the term "current location" refers to the location on the timeline of the data that currently is displayed in the editor window viewer. The wheel has a detent position that represents the current location in a recording, from which a user can turn the wheel clockwise to advance through the recording or counterclockwise to go back through the recording. The term "detent" refers to, on a control such as a shuttle wheel, a central position, which corresponds to a neutral setting. The shuttle speed increases as the distance from the detent increases in either direction, as follows: 0.25 times., 0.5 times, 1.0 times, 2.0 times, 4.0 times, 8.0 times.

In some embodiments, the Tools menu groups commands pertaining to the toolbar and other tools. In some embodiments, the Tools menu contains one or more of the following commands and separator bars, in the following order:

Recording Options . . .

---

Annotate/Stop Annotating
Annotation Color (submenu)

---

Start Meeting

Table 6 provides detailed information about the commands in the Tools menu in some embodiments.

When the menu scrolls to display additional items, the windows that are currently open for a single recorded file are displayed on the screen at the same time.

If the menu consists of more items than can appear on the screen at once, the following rules apply:

Initially, a downward-pointing arrow is displayed at the bottom of the menu, indicating that items are out of view at the bottom of the menu.

If items are out of view at both the top and bottom of the menu, an upward-pointing arrow is displayed at the top of the menu and a downward-pointing arrow is displayed at the bottom of the menu.

If items are out of view at the top of the menu, an upward-pointing arrow is displayed at the top of the menu.

In some embodiments, entire items appear in the submenu (e.g., items are not cut in half vertically in order for the submenu to fill the whole screen).

Each item in the Window menu is displayed in one of the following formats:

[#] [File Name].wrf
[#] Sequence: [File Name].wrf

For example:

1 Quarterly Meeting.wrf
2 Sequence: Quarterly Meeting.wrf
3 frame view: Quarterly Meeting.wrf FIG. 9 illustrates window menus 900 and 910, in accordance with some embodiments of the invention.

The Help menu provides access to Recording Editor Help and information about Recording Editor. In some embodiments, the Help menu contains one or more of the following commands and separator bars, in the following order:

TABLE 6

| COMMAND | KEYBOARD SHORTCUT | FUNCTION |
| --- | --- | --- |
| Recording Options . . . | Ctrl+Alt+O | Displays the Recording Options dialog box, in which a user can specify various recording options, including whether to record audio. |
| Annotate/Stop Annotating | Ctrl+Alt+A | This is a toggle command. During recording or playback, lets a user annotate a recording, using a highlighter pen, then stop annotating. The Annotate command appears dimmed when recording is not currently in progress. Once a user chooses Annotate, the command toggles to Stop Annotating, and vice versa. |
| Annotation Color | | This submenu provides a palette of colors for annotations. |
| Start Meeting | Ctrl+Alt+M | Starts a meeting in Meeting Center and, if there is a recording in the active window, automatically shares the recording. |

In some embodiments, a window menu is provided. The Window menu comprises a list of editor windows and sequence editor windows that are currently open. When both of these windows for a single recorded file are open, they are set off together by separator bars.

In the Window menu, a number is displayed to the left of each window name. The windows are numbered in the order in which the user opened them. The number for each of the windows 1 through 9 is underlined and may be used as an access key. A checkmark is displayed to the left of the window that is currently active.

If more than 15 windows are currently open, a downward-pointing arrow is displayed at the bottom of the menu. A user can click the arrow to display additional items on the menu.

Recording Editor Help

---

About Recording Editor

Table 7 provides detailed information about the commands on the Help menu in some embodiments.

TABLE 7

| COMMAND | KEYBOARD SHORTCUT | FUNCTION |
| --- | --- | --- |
| Recording Editor Help | F1 | Displays the Recording Editor Help window. |
| About Recording Editor | | Displays the About Recording Editor box. |

In some embodiments, an editor workspace is provided. The editor workspace is a window that consists of one or more of the following elements:

menu bar toolbar gray workspace area

In the editor workspace, recorded files, or recordings, appear in the editor window. Users can also manipulate segments of a recording in the sequence editor window.

FIG. 10 illustrates a toolbar 1000, in accordance with some embodiments of the invention. In some embodiments, toolbar 1000 resides below a menu bar in the editor window and consists of one or more of the following buttons:

Open

Save

_____ (separator bar)

Cut

Copy

Paste

---

Insert Cue Point

Insert Starting Point

Insert Ending Point

---

Define Segment

Sequence Editor

---

Properties

---

View Selected Frames

---

Segments Palette

Markers Palette

---

Set Current Location, with drop-down control panel

---

Play

Pause

Stop

Rewind

Previous Segment

Next Segment

Fast Forward

---

Volume, with drop-down control panel

Mute/Unmute

---

Shuttle Wheel, with drop-down control panel

In some embodiments, the name of each toolbar button is displayed in a ToolTip when a user points to the button. The term "ToolTip" refers to text that provides information about a tool.

When a user points to a button on toolbar 1000, including a button that contains a downward-pointing arrow, the button's border becomes visible. Once a user clicks an action button, the button's border disappears. A toggle button remains in a down state until the user clicks the button again.

In some embodiments, there are buttons on toolbar 1000 that have the same function as a command in a menu, and these buttons may appear dimmed or available according to the specifications for the corresponding commands.

Table 8 provides detailed information about the buttons on the toolbar in some embodiments. In some embodiments, the button ToolTips have associated images that are displayed on a tool bar.

TABLE 8

| Button ToolTip | Function |
| --- | --- |
| Open 1002 | This button has the same function as the Open command on the File menu. |
| Save 1004 | This button has the same function as the Save command on the File menu. |
| Cut 1006 | This button has the same function as the Cut command on the Edit menu. |
| Copy 1008 | This button has the same function as the Copy command on the Edit menu. |
| Paste 1010 | This button has the same function as the Paste command on the Edit menu. |
| Insert Cue Point 1012 | This button has the same function as the Cue Point command on the Marker submenu, on the Insert menu. |
| Insert Starting Point 1014 | This button has the same function as the Starting Point command on the Marker submenu, on the Insert menu. |
| Insert Ending Point 1016 | This button has the same function as the Ending Point command on the Marker submenu, on the Insert menu. |
| Define Segment 1018 | This button has the same function as the Define Segment command on the Edit menu. |
| Sequence Editor 1020 | This button has the same function as the Sequence command on the Edit menu. |
| Properties 1022 | This button has the same function as the Properties command on the Edit menu. |
| View Selected Frames 1024 | This button has the same function as the Frames command on the View menu. |
| Segments Palette 1026 | This button has the same function as the Segments command on the View menu. |

TABLE 8-continued

| Button ToolTip | Function |
| --- | --- |
| Markers Palette 1028 | This button has the same function as the Markers command on the View menu. |
| Set Current Location 1030 | This button has the same function as the Set Current Location command on the Controls menu. Clicking the button displays the Set Current Location palette, which contains the Location slider. Clicking the button in its down state closes the Set Current Location palette. The Location slider lets the user adjust the current location during playback or editing. |
| Play 1032 | This button has the same function as the Start Playback command on the Controls menu. The button remains in a down state as long as playback continues, that is, until a user clicks another transport button or command. |
| Pause/Resume 1034 | This button has the same function as the Pause Playback command on the Controls menu. The button remains in a down state as long as playback is paused, that is, until a user either clicks the button again, which has the same effect as the Resume Playback command on the Controls menu, or clicks another transport button or command. |
| Stop 1036 | This button has the same function as the Stop Playback command on the Controls menu. |
| Rewind to Beginning 1038 | This toggle button rewinds a recording, moving the current location indicator backward snapshot by snapshot or, in the frame view window, frame by frame. During rewind, no video data is displayed in the editor window viewer. This button remains in a down state and rewind continues until a user either clicks the button again, or clicks another transport button or command, or the current location indicator reaches the beginning of the recording. When rewind stops, the frame that corresponds to the current location appears in the editor window viewer. This command appears dimmed when no recording is currently open, neither the editor window nor the frame view window is active, or the current location is already at the beginning of a recording. |
| Previous Segment 1040 | This button has the same function as the Previous Segment command on the Control menu. |
| Next Segment 1042 | This button has the same function as the Next Segment command on the Control menu. |
| Fast Forward to End 1044 | This toggle button fast forwards a recording, moving the current location indicator forward snapshot by snapshot or, in the frame view window, frame by frame. During fast forward, no video data is displayed in the editor window viewer. This button remains in a down state and fast forward continues until a user either clicks the button again, or clicks another transport button or command, or the current location indicator reaches the end of the recording. When fast forward stops, the frame that corresponds to the current location is displayed in the editor window viewer. This command appears dimmed when no recording is currently open, neither the editor window or frame view window is active, or the current location is already at the end of a recording. |
| Volume 1046 | The Volume toggle button has the same function as the Volume command on the Controls menu. Clicking the button displays the Volume palette, which contains the Volume slider. Clicking the button in its down state closes the Volume palette. The Volume slider lets the user adjust the volume during playback or editing. |
| Mute/Unmute 1048 | The Mute/Unmute toggle button has the same function as the Mute/Unmute toggle command on the Controls menu. A user clicks this button to mute audio during playback or editing. This button remains in a down state until a user either clicks the button again to unmute audio, or drags the Volume slider or otherwise increases the volume. |
| Shuttle Wheel | The shuttle wheel toggle button has the same function as the shuttle wheel command on the Controls menu. Clicking the button displays the shuttle wheel palette, which contains the shuttle wheel. Clicking the button in its down state closes the shuttle wheel palette. The shuttle wheel allows a user to easily and precisely cue, or manually set the current location in, a recording. |

FIG. 11A illustrates a volume slider, in accordance with some embodiments of the invention. In some embodiments, a user can click a downward-pointing arrow 1104 to the right of volume button 1102 to display volume drop-down control panel 1106, which contains a volume slider 1108 with a current volume indicator 1109. While control panel 1106 remains open, arrow button 1104 remains in a down state. The initial setting of volume slider 1108 may correspond to the system volume setting.

Once the user adjusts volume slider 1108 using, for example, a mouse, and releases the mouse button, control panel 1106 closes. If the user points to a gray bar at the top of control panel 1106, control panel 1106 turns blue, indicating that the user can drag control panel 1106 to a new location. Once the user drags control panel 1106 to a new location, control panel 1106 takes on the appearance of a floating volume palette. FIG. 11B illustrates a floating volume palette 1110, in accordance with some embodiments of the invention.

When the user detaches volume palette 1110 from a toolbar, the appearance of volume button 1102 changes to a down state and arrow button 1104 no longer remains in a down state. Volume button 1102 remains in a down state until the user either clicks the close box on volume palette 1110 or clicks volume button 1102 to close the palette.

When volume control panel 1106 or volume palette 1110 is currently open, the keyboard shortcuts for volume slider 1108 are Ctrl+Up arrow to increase the volume and Ctrl+Down arrow to reduce the volume.

FIG. 12A illustrates a location slider, in accordance with some embodiments of the invention. In some embodiments, a user can click a downward-pointing arrow 1204 to the right of a set current location button 1202 to display a set current location drop-down control panel 1206, which contains a location slider 1208 with a current slider location indicator 1209. While control panel 1206 remains open, arrow button 1204 remains in a down state. The initial setting of location slider 1208 corresponds to that of a current location indicator.

Once the user adjusts location slider 1208, using, for example, a mouse, and releases the mouse button, control panel 1206 closes. If the user points to a gray bar at the top of control panel 1206, control panel 1206 turns blue, indicating that the user can drag control panel 1206 to a new location. Once the user drags control panel 1206, control panel 1206 takes on the appearance of a floating location palette. FIG. 12B illustrates a floating location palette 1210, in accordance with some embodiments of the invention.

When the user detaches the location palette 1210 from a toolbar, the appearance of Set Current Location button 1202 changes to a down state and arrow button 1204 no longer remains in a down state. Set Current Location button 1202 remains in a down state until the user either clicks the close box on location palette 1210 or clicks Set Current Location button 1202 to close location palette 1210.

When set current location control panel 1206 or location palette 1210 is currently open, the keyboard shortcuts for location slider 1208 are Ctrl+Up arrow to advance current slider location indicator 1209 forward and Ctrl+Down arrow to move current slider location indicator 1209 backward.

FIG. 13A illustrates a shuttle wheel, in accordance with some embodiments of the invention. In some embodiments, a user can click a downward-pointing arrow 1304 to the right of a shuttle wheel button 1302 to display shuttle wheel drop-down control panel 1306, which contains shuttle wheel 1308. While control panel 1306 remains open, arrow button 1304 remains in a down state. Once the user adjusts shuttle wheel 1308 with, for example, a mouse, and releases the mouse button, control panel 1306 closes.

If the user points to a gray bar at the top of control panel 1306, control panel 1306 turns blue, indicating that the user can drag control panel 1306 to a new location. Once the user drags control panel 1306 to a new location, control panel 1306 takes on the appearance of a floating shuttle wheel palette. FIG. 13B illustrates a floating shuttle wheel palette 1310, in accordance with some embodiments of the invention.

When the user detaches control panel 1306 from a toolbar, the appearance of shuttle wheel button 1302 changes to a down state and arrow button 1304 no longer remains in a down state. Shuttle wheel button 1304 remains in a down state until the user either clicks the close box on shuttle wheel palette 1310 or clicks shuttle wheel button 1302 to close shuttle wheel palette 1310.

When shuttle wheel control panel 1306 or shuttle wheel palette 1310 is currently open, the keyboard shortcuts for controlling shuttle wheel 1308 are Ctrl+Right arrow for forward cueing and Ctrl+Left arrow for reverse cueing.

FIG. 14 illustrates an Elapsed Time and Duration indicator 1400, in accordance with some embodiments of the invention. In some embodiments, Elapsed Time and Duration indicator 1400 resides at the extreme right on the menu bar, in the editor window. Elapsed Time and Duration indicator 1400 shows the elapsed time during playback or editing, and the total duration of a recording, in hours, minutes, seconds, and tenths of a second (e.g., 02:38:12.5/03:10:45.5).

When an editor window is initially displayed, the elapsed time is set to 00:00:00.0. Elapsed Time and Duration indicator 1400 tracks the movement of the current location indicator. If a user makes the window narrower, Elapsed Time and Duration indicator 1400 moves to the left and thus remains visible.

FIGS. 15A-15C illustrate an editor window 1500, a timeline 1506, and a current location indicator 1520, respectively, in accordance with some embodiments of the invention. In some embodiments, editor window 1500 consists of one or more of the following elements:
  menu bar 1502
  toolbar 1504
  timeline 1506, with current location indicator 1520
  editor window viewer 1508

In some embodiments, to display the window shortcut menu for editor window 1500, a user can point to an application icon 1510 on a title bar 1512 and click title bar 1512 using the secondary mouse button or press Alt+Spacebar. In some embodiments, the window shortcut menu for editor window 1500 contains one or more of the following commands:
  Restore
  Move
  Size
  Minimize
  Maximize Close Alt+F4
In some embodiments, editor window 1500 provides one or more of the following controls:
  title bar
  title bar buttons
    Minimize/Restore button
    Maximize/Restore button—editor window 1500 is maximized by default. The Restore button is available by default.
    Close button
  vertical scroll bar scroll bar shaft—Scrolls the equivalent of the height of the window minus 0.25 inch.

scroll arrows—Scroll in increments of 0.25 inch.

horizontal scroll bar scroll bar shaft—Scrolls the equivalent of the width of the window minus 0.25 inch.

scroll arrows—Scroll in increments of 0.25 inch.

window frame size grip

FIG. 15B illustrates a timeline 1506 independent of an editor window 1500, in accordance with some embodiments of the invention. In some embodiments, timeline 1506 displays time in increments of ten seconds and fractions of ten seconds. Specifically, the increment marks on the upper part of timeline 1506 demarcate 2.5-second, 5-second, 7.5-second, and 10-second intervals of time. The term "increment mark" refers to a marking on timeline 1506 that indicates fine increments of time (e.g., ten-second increments and fractions of ten-second increments).

Each frame in a recording may be 0.4 seconds, and each audio packet may be 0.05 seconds. The ToolTip text for timeline 1506 is "Timeline."

FIG. 15C illustrates a current location indicator 1520, in accordance with some embodiments of the invention. A user can place current location indicator 1520 or a marker precisely at any 0.05-second interval on the timeline. During playback or editing, current location indicator 1520 shows a current location on timeline 1506, which corresponds to an image that currently is displayed in editor window viewer 1508.

There is an 8-pixel wide space to the left of the zero point, which allows current location indicator 1520 to align with the zero point. There is a similar space at the end of timeline 1506, so current location indicator 1520 aligns with the end of the recording.

The upper part of timeline 1520 contains any markers that define cue points or segments, and a different pastel color may highlight the span of each segment in a recording. If a recording consists of more than 12 segments, the same sequence of colors may be used again.

In editor window 1500, a user can click anywhere on the colored portion of the upper part of timeline 1506 that demarcates a segment to select the corresponding segment. A user can double-click the colored portion of the upper part of timeline 1506 that demarcates a segment to display the Segment Properties dialog box for that segment.

A user can click a snapshot to select the snapshot. To select a range of time on timeline 1506, a user can either drag to select the entire range, or click the first snapshot in the range, then Shift-click the last snapshot in the range. When a user selects a snapshot, range of time, or segment on timeline 1506, the middle and lower parts of timeline 1506 appear highlighted in the color that the user designated for selected items when customizing the display properties. The term "highlighted" refers to the appearance of the part of timeline 1506 that is currently selected, which appears in the color that a user designated for selected items when customizing the computer's display properties. Snapshots on timeline 1506 appear highlighted when they are selected.

When a user selects a segment on timeline 1506, the segment also appears selected in the segment list in the sequence editor window, and vice versa. The segment list scrolls automatically to display the selected segment or, if more than one segment is selected, the first selected segment.

When a user selects one or more segments in the sequence editor window, timeline 1506 scrolls to the beginning of the selected segment or, if more than one segment is selected, to the beginning of the first selected segment.

The lower part of timeline 1506 contains snapshots, or representative images from a sequence of recorded images, each of which represents 10 seconds in the elapsed time of a recording. Snapshots are automatically generated at intervals of 10 seconds and populate the entire visible portion of timeline 1506.

A user can double-click a snapshot to display the frames that correspond to that snapshot, and the preceding and following snapshots in a frame view window.

During playback or when playback is paused, a user can do one or more of the following actions on timeline 1506 in the editor window:

insert a marker;

select a marker, snapshot, range of time, or segment;

view the properties of a selected marker or segment;

rename a marker or segment; or copy recorded data.

In some embodiments, a user may not edit recorded data on timeline 1506 during playback or when playback is paused.

If a user attempts to drag recorded data during playback or when playback is paused, the following message may be displayed:

A user cannot drag recorded data during playback or when playback is paused. To edit recorded data on the timeline, the user first stops playback, then tries again.

If a user attempts to drag recorded data from another recording to timeline 1506 during playback or when playback is paused, the following message may be displayed:

A user cannot drag recorded data from another recording to the timeline during playback or when playback is paused. To edit recorded data on the timeline, the user first stops playback, then tries again.

If a user attempts to drag another entire recording to timeline 1506 during playback or when playback is paused, the following message may be displayed:

The user may not drag another recording to the timeline during playback or when playback is paused. To edit recorded data on the timeline, the user first stops playback, then try again.

If a user attempts to delete recorded data from timeline 1506 during playback or when playback is paused, the following message may be displayed:

A user cannot delete recorded data from the timeline during playback or when playback is paused. To delete recorded data from the timeline, the user first stops playback, then tries again.

Each of these message boxes has an OK button. When a user clicks OK, the message box closes and the Recording Editor again becomes the active window.

In some embodiments, when loading the key frame containing current location indicator 1520 into memory, three screens of snapshots representing recorded images are generated (e.g., for the previous screen, the current screen, and the next screen) and an audio-only recording covering the same time span. The three screens of snapshots and the audio-only recording are buffered in memory. The term "key frame" refers to a two-minute unit of video and audio data in the series of key frames that constitutes a recording.

A timeline for the series of snapshots and audio recording is independent of, but the same as a timeline for the recording. Each snapshot is time stamped. Once these snapshots reside in memory, a user is able to navigate through, for example, three screens of snapshots on the timeline, in either direction.

Once a user inserts a marker, three screens of snapshots are generated in the background. The three screens represent recorded images for the previous screen, the current screen, and the next screen. The snapshots are saved with the marker definition. When the user navigates to the marker, these snapshots are loaded into memory, so the user can traverse, for example, three screens of snapshots on the timeline, in either direction.

In some embodiments, when a user drags a current location indicator or a marker, presses the Right Arrow or Left Arrow key to move a current location indicator or a selected marker, or cues a recording using the Reverse Cueing and/or Forward Cueing commands, no recorded images appear in the editor window viewer until the user releases the current location indicator or marker, or stops or pauses cueing. Then, the frame corresponding to the current location on timeline 1506 is displayed, for example, after a slight delay of three to five seconds. If the user starts playback, the display and audio corresponding to the current location on timeline 1506 begins after, for example, a slight delay of three to five seconds.

In some embodiments, the lower part of timeline 1506 represents the audio track for a recording and shows the amplitude of the audio signal.

In some embodiments, timeline 1506 scroll bar allows a user to quickly navigate to another part of timeline 1506. Scrolling with the scroll bar does not affect the current location or selection. However, a user can scroll to a location on timeline 1506, then select a snapshot and choose Set Current Location on the Controls menu to set a new current location.

In some embodiments, when a user points to timeline 1506, then presses, for example, the secondary (e.g., right) mouse button, a pop-up menu is displayed. This menu contains the following commands, which have the same functions and behaviors as the corresponding commands on the menus on the menu bar:

Set Current Location
   Go To (submenu)
      Beginning
      Previous Segment
      Next Segment
      End
   Cueing (submenu)
      Reverse
      Forward
Start Playback/Stop Playback
Pause Playback/Resume Playback Insert Marker (submenu)
   Cue Point . . .

Starting Point . . .
   Ending Point . . .
Define Segment . . .
Insert Recording . . .

View Frames . . .
Hide Timeline

Select All

Cut
Copy
Paste

Table 9 shows the correspondences between commands on the Timeline pop-up menu and commands residing on menus on the menu bar in some embodiments of the invention.

TABLE 9

| Command on Timeline Pop-up Menu | Corresponding Command on Menu on Menu Bar |
| --- | --- |
| Set Current Location command | Set Current Location command on Controls menu |
| Go To submenu | N/A |
| Beginning command | Rewind to Beginning command on Controls menu |
| Previous Segment command | Previous Segment command on Controls menu |
| Next Segment command | Next Segment command on Controls menu |
| End command | Fast Forward to End command on Controls menu |
| Cueing submenu | N/A |
| Reverse command | Reverse Cueing command on Controls menu |
| Forward command | Forward Cueing command on Controls menu |
| Start Playback/Stop Playback command | Start Playback/Stop Playback command on Controls menu |
| Pause Playback/Resume Playback command | Pause Playback/Resume Playback command on Controls menu |
| Insert Marker submenu | Marker submenu on the Insert menu |
| Cue Point . . . command | Cue Point . . . command |
| Starting Point . . . command | Starting Point . . . command |
| Ending Point . . . command | Ending Point . . . command |
| Define Segment . . . command | Define Segment . . . command on the Edit menu |
| Insert Recording . . . command | Recording . . . command on the Insert menu |
| View Frames . . . command | Frames . . . command on the View menu |
| Hide Timeline command | Timeline command on the View menu |
| Select All command | Select All command on the Edit menu |
| Cut command | Cut command on the Edit menu |
| Copy command | Copy command on the Edit menu |
| Paste command | Paste command on the Edit menu |

In some embodiments, during playback or editing, the current location indicator shows the current location on the timeline, which corresponds to the image that currently is displayed in the editor window viewer. The ToolTip text for the current location indicator is "Current Location."

To navigate the timeline for a recording and finely adjust the current location, a user can do the following:

Drag the current location indicator.

If no marker is currently selected, press the Right Arrow or Left Arrow key to move the current location indicator continuously along the timeline.

If no marker is currently selected, hold down the Ctrl key while pressing the Right Arrow or Left Arrow key to move the current location indicator by a distance that is approximately equivalent to the width of the window.

Press the Home key to move the current location indicator to the beginning of the recording.

Press the End key to move the current location indicator to the end of the recording.

In some embodiments, during playback or when playback is paused, a user can use the current location indicator to cue a recording while monitoring audio, or select a location on the timeline at which to insert a marker, begin playback, or initiate some other action.

In some embodiments, when a user moves the current location indicator to the right or left boundary of the timeline (e.g., by dragging the current location indicator, or pressing Right Arrow, Left Arrow, Ctrl+Right Arrow, or Ctrl+Left Arrow), the timeline automatically scrolls in the direction in which the user is dragging.

In some embodiments, a user can insert a marker to indicate a point on the timeline at which an action is to occur or to which a user can jump. If a user inserts a marker during playback, playback may stop automatically.

Table 10 shows various types of markers that a user can insert in some embodiments of the invention.

and ending point markers that a user inserts consecutively (e.g., between which no intervening starting or ending point marker exists) automatically constitute a pair of markers. However, if a user inserts a starting point marker, but no ending point marker, the end of the recording automatically constitutes the ending point of the range or segment. If a user instead inserts a starting point marker, but no ending point marker, then inserts another starting point marker, the second starting point marker automatically constitutes the ending point of the first range or segment, and editing software 202 automatically inserts an ending point marker at the same location as the second starting point marker.

In some embodiments, when a user inserts a marker, the new marker is selected and appears highlighted. When a user Ctrl-clicks either a starting or ending point marker in a pair to select the point marker, both the starting and ending point markers are selected and appear highlighted.

In some embodiments, when defining consecutive ranges of time or segments, a user can insert the starting point of a new range or segment at the ending point of the preceding segment. Starting and ending point markers that reside at the same location on the timeline are closely coupled to one another. Thus, if a user drags or moves such a selected marker along the timeline by pressing Right Arrow, Left Arrow, Ctrl+Right Arrow, or Ctrl+Left Arrow, the other marker moves with the selected marker.

Pairs of starting and ending point markers may share the same number. Cue point markers, pairs of starting and ending point markers that define a range of time, and segments are numbered in sequential order. Thus, if a user inserts a segment preceding other segments, the numbers of all segments that follow increment by one. If a user deletes a segment, the numbers of any segments that follow decrement by one.

In some embodiments, once a pair of starting and ending point markers defines a segment, the number for the segment, and the segment's starting and ending point markers, belongs

TABLE 10

| Marker Type | ToolTip Text | Function |
| --- | --- | --- |
| Cue point | Cue Point [#]: [Name]<br>For example:<br>Cue Point 6: Presentation | A user can insert a cue point marker on the timeline marker to jump directly to, or autolocate, that point. There is a space following the colon. |
| Starting point marker | Starting Point [#]: [Name]<br>For example:<br>Starting Point 2: Demo<br>Segment [#] Starting Point: [Name of Segment]<br>For example: Segment 2 Starting Point: Demo | A user can insert a starting point on the marker timeline to define the beginning of a range of time or the beginning of a segment. There is a space following the colon. |
| Ending point marker | Ending Point [#]: [Name]<br>For example:<br>Ending Point 2: Demo<br>Segment [#] Ending Point: [Name of Segment]<br>For example:<br>Segment 2 Ending Point: Demo | A user can insert an ending point maker on the marker timeline to define the end of a range of time or the end of a segment. There is a space following the colon. |

In some embodiments, when a user points to a marker, a ToolTip is displayed that indicates the marker's type, number, and name; or in the case of starting and ending point markers that define a segment, the segment's number, marker type, and name.

In some embodiments, when defining a range of time or a segment, a user can insert a pair of markers that indicate the starting and ending points of the range or segment. Starting to the sequence of segment numbers rather than the sequence of numbers for starting and ending point markers that merely define a range of recorded data.

By default, a marker or segment's name may be Untitled [#].

In some embodiments, a user can click a marker to select the marker. When a marker is selected, the silver interior of a selected marker appears highlighted, in the user's highlight color. To deselect a marker, a user can either click the marker again or click somewhere outside the marker.

In some embodiments, a user can double-click a marker to display the marker's Properties dialog box. A user can Ctrl+click a starting-point or ending-point marker for a segment to select that segment, or Ctrl+double-click a starting-point or ending-point marker for a segment to display the Properties dialog box for that segment.

In some embodiments, to adjust a marker's position, a user can drag the marker, or press Right Arrow, Left Arrow, Ctrl+Right Arrow, or Ctrl+Left Arrow to move a selected marker. When playback is paused, a user can adjust a marker's position while monitoring audio or cue a recording to select a location on the timeline at which to insert a marker.

In some embodiments, when a user moves a marker to the right or left boundary of the timeline (e.g., by dragging the marker, or pressing Right Arrow, Left Arrow, Ctrl+Right Arrow, or Ctrl+Left Arrow), the timeline automatically scrolls in the direction in which the user is dragging.

In some embodiments, cue point and starting point markers appear on the timeline. An ending point marker is displayed on the timeline when:

a user is defining a new range of time or segment;

the corresponding range of time or segment is currently selected;

no other range of time, segment, or starting point marker immediately follows an ending point marker; or it is the last ending point marker in a recording.

If a user is defining a new range of time or segment or the corresponding range of time or segment is currently selected (e.g., in the first and second cases listed above), the ending point marker supplants any starting point marker that also resides at that location. If a user selects consecutive ranges of time or segments, the ending point for the last range of time or segment is displayed on the timeline.

In some embodiments, once a user selects a range of time or segment, and its ending point marker becomes visible, a user can click the ending point marker to select the ending point marker. Also, a user can select a marker on the Markers palette, then click Go To to navigate to and select a marker on the timeline.

In some embodiments, if a user cuts or deletes a segment or range of recorded data from the timeline, and no previously defined segment or range immediately precedes or follows the segment or range being deleted (e.g., there is no ending or starting point marker at the location at which the deletion occurred), a cue point marker is automatically inserted at that location. The Cue Point Marker Properties dialog box is displayed, allowing the user to name the marker or cancel insertion of the marker.

In some embodiments, if a user pastes or drags a range of recorded data into the timeline, and that range of recorded data currently has no starting point marker and/or ending point marker, a starting or ending point marker for the range is automatically inserted, as necessary, and the markers and the range are highlighted. Then, the Define Segment dialog box is displayed, allowing the user to define the selected range of recorded data as a segment.

In some embodiments, if a user cuts or deletes the starting point marker for a segment, the following message may be displayed:

Once you have removed a segment's starting point marker, the segment definition no longer exists, but the recorded data remains. You can either remove or edit the segment's ending point marker.

To remove the ending point marker, click Remove.

To edit the ending point marker's properties (e.g., rename the marker and change its type) click Edit.

This message box has Remove, Edit, and Close buttons. When a user clicks Remove, the ending point marker is deleted, the message box closes, and the Recording Editor again becomes the active window. When a user clicks Edit, the message box closes and the Ending Point Marker Properties dialog box is displayed. The marker type Ending Point is selected in the Marker type drop-down list by default. When a user clicks Close, the message box closes and the Recording Editor again becomes the active window.

In some embodiments, if a user cuts or deletes the ending point marker for a segment, the following message may be displayed:

You have removed the segment's ending point marker. You can either insert a new ending point marker for the segment, or remove or edit the segment's starting point marker.

To remove the starting point marker, click Remove.

To edit the starting point marker's properties (e.g., rename the marker or change its type) click Edit.

This message box has Remove, Edit, and Close buttons. When a user clicks Remove, the starting point marker is deleted, the message box closes, and the Recording Editor again becomes the active window. When a user clicks Edit, the message box closes and the Starting Point Marker Properties dialog box is displayed. The marker type Starting Point is selected in the Marker type drop-down list by default. When a user clicks Close, the message box closes and the Recording Editor again becomes the active window.

In some embodiments, if a user cuts or deletes the starting point marker for a range of recorded data, the following message may be displayed:

Once you remove the starting point marker for a range of recorded data, the range definition no longer exists, but the recorded data remains. You can either remove or edit the ending point marker for the range.

To remove the ending point marker, click Remove.

To edit the ending point marker's properties (e.g., rename the marker or change its type), click Edit.

This message box has Remove, Edit, and Close buttons. When a user clicks Remove, the ending point marker is deleted, the message box closes, and the Recording Editor again becomes the active window. When a user clicks Edit, the message box closes and the Ending Point Marker Properties dialog box is displayed. The marker type Ending Point is selected in the Marker type drop-down list by default. When a user clicks Close, the message box closes and the Recording Editor again becomes the active window.

In some embodiments, if a user cuts or deletes the ending point marker for a range of recorded data, the following message may be displayed:

You have removed the ending point marker for a range of recorded data. You may either insert a new ending point marker for the range, or remove or edit the starting point marker for the range.

To remove the starting point marker, click Remove.

To edit the starting point marker's properties (e.g., rename the marker or change its type), click Edit.

This message box has Remove, Edit, and Close buttons. When a user clicks Remove, the starting point marker is deleted, the message box closes, and the Recording Editor again becomes the active window. When a user clicks Edit, the message box closes and the Starting Point Marker Properties dialog box is displayed. The marker type Starting Point is selected in the Marker type drop-down list by default. When a user clicks Close, the message box closes and the Recording Editor again becomes the active window.

In some embodiments, if a user either cuts or copies, then pastes, or drags a selected frame, snapshot, range of recorded data, segment, or entire recording to another location on a timeline or to another timeline, any markers that reside within, or define the beginning and end of the selected data either move with the selected data or are also copied. Markers on the timeline are renumbered to reflect their new sequence on the timeline.

In some embodiments, if a user changes the type of the starting point marker for a segment, the following message may be displayed:

If you change the type of a segment's starting point marker, the segment definition will no longer exist.

Do you want to change the marker's type?

This message box has Yes and No buttons. When a user clicks Yes, the marker type changes, the segment is no longer defined, the message box closes, and the Recording Editor again becomes the active window. When a user clicks No, the marker type remains unchanged, the message box closes, and the Recording Editor again becomes the active window.

In some embodiments, if a user changes the type of the ending point marker for a segment, the following message may be displayed:

Once you change the type of a segment's ending point marker, you can either insert a new or use a different ending point marker for the segment, or remove or edit the segment's starting point marker.

To remove the starting point marker, click Remove.

To edit the starting point marker's properties (e.g., rename the marker or change its type), click Edit.

This message box has Remove, Edit, and Close buttons. When a user clicks Remove, the starting point marker is deleted, the message box closes, and the Recording Editor again becomes the active window. When a user clicks Edit, the message box closes and the Starting Point Marker Properties dialog box is displayed. The marker type Starting Point is selected in the Marker type drop-down list by default. When a user clicks Close, the message box closes and the Recording Editor again becomes the active window.

In some embodiments, if a user changes the type of the starting point marker for a range of recorded data, the following message may be displayed:

If you change the type of the starting point marker for a range of recorded data, the range definition will no longer exist.

Do you want to change the marker's type?

This message box has Yes and No buttons. When a user clicks Yes, the marker type changes, the range is no longer defined, the message box closes, and the Recording Editor again becomes the active window. When a user clicks No, the marker type remains unchanged, the message box closes, and the Recording Editor again becomes the active window.

In some embodiments, if a user changes the type of the ending point marker for a range of recorded data, the following message may be displayed:

Once you change the type of the ending point marker for a range of recorded data, you can either insert a new or use a different ending point marker for the range, or remove or edit the starting point marker for the range.

To remove the starting point marker, click Remove.

To edit the starting point marker's properties (e.g., rename the marker or change its type), click Edit.

This message box has Remove, Edit, and Close buttons. When a user clicks Remove, the starting point marker is deleted, the message box closes, and the Recording Editor again becomes the active window. When a user clicks Edit, the message box closes and the Starting Point Marker Properties dialog box is displayed. The marker type Starting Point is selected in the Marker type drop-down list by default. When a user clicks Close, the message box closes and the Recording Editor again becomes the active window.

In some embodiments, when a user inserts a starting point marker within an existing segment, then chooses Split Segment on the Edit menu, the marker constitutes a split point (e.g., the location on the timeline at which to split an existing segment into two). The split point corresponds to the ending point for the first segment and the starting point for the second segment. The ending point of the original segment automatically becomes the ending point of the second segment.

In some embodiments, when a user points to a marker, then presses the secondary (e.g., right) mouse button, a pop-up menu is displayed. This menu contains the following commands, which have the same functions and behaviors as the corresponding commands on the menus on the menu bar:

Set Current Location
Start Playback/Stop Playback
Pause Playback/Resume Playback
———
Define Segment . . .
———
View Frames . . .
———
Properties . . .
———
Cut
Copy
Paste
——— Clear Table 11 shows the correspondences between commands on the Marker pop-up menu and commands residing on menus on the menu bar in some embodiments of the invention.

TABLE 11

| Command on Marker Pop-up Menu | Corresponding Command on Menu on Menu Bar |
|---|---|
| Set Current Location command | Set Current Location command on Controls menu |
| Start Playback/Stop Start Playback command | Start Playback Stop Playback command on Controls menu |
| Pause Playback/Resume Playback command | Pause Playback/Resume Playback command on Controls menu |
| Define Segment . . . command | Define Segment . . . command on Edit menu |
| View Frames . . . command | Frames . . . command on View menu |
| Properties . . . command | Properties . . . command on Edit menu |
| Cut command | Cut command on Edit menu |

TABLE 11-continued

| Command on Marker Pop-up Menu | Corresponding Command on Menu on Menu Bar |
|---|---|
| Copy command | Copy command on Edit menu |
| Paste command | Paste command on Edit menu |
| Clear command | Clear command on Edit menu |

In some embodiments of the invention, when a user points to a segment on the timeline, then presses the secondary mouse button, a pop-up menu is displayed. This pop-up menu contains the following commands, which have the same functions and behaviors as the corresponding commands on the menus on the menu bar:

Set Current Location
Start Playback/Stop Playback
Pause Playback/Resume Playback Properties . . .

Undefine

Cut
Copy

Clear

Table 12 shows the correspondences between commands on the Segment pop-up menu and commands residing on menus on the menu bar in some embodiments of the invention.

TABLE 12

| Command on Segment Pop-up Menu | Corresponding Command on Menu on Menu Bar |
|---|---|
| Set Current Location | Set Current Location command on Controls command menu |
| Start Playback/Stop Playback command | Start Playback/Stop Playback command on Controls menu |
| Pause Playback/Resume Playback command | Pause Playback/Resume Playback command on Controls menu |
| Properties . . . command | Properties . . . command on Edit menu |
| Undefine command | None. Undefine button in Segment Properties dialog box. |
| Cut command | Cut command on Edit menu |
| Copy command | Copy command on Edit menu |
| Clear command | Clear command on Edit menu |

In some embodiments, the editor window viewer is the area of the editor window in which playback occurs. The editor window viewer displays the recorded images in a recorded file, or recording. The ToolTip text for the editor window viewer is "Editor Window Viewer."

In some embodiments, a key frame is a two-minute unit of video and audio data in the series of key frames that constitutes a recording. During playback or editing, the entire key frame containing the current location on the timeline resides in memory. Whenever a user changes the current location and the current location does not correspond to the beginning of a key frame, playback or transport initially occurs in memory, from the beginning of the key frame. The display (e.g., video) and audio may be suppressed until the current location is reached, then display and audio may be initiated. Thus, display and audio actually begin at the current location on the timeline.

In some embodiments, if the height and/or width of the image in the editor window viewer exceeds the size of the editor window viewer, when a user presses the mouse button and moves the mouse over the editor window viewer, the image in the editor window viewer pans in the direction in which the mouse is moving. When the part of the image that is of interest to the user is in view and the user releases the mouse button, panning stops. Pressing the mouse button may establish the origin point at which panning begins, which is represented by a panning origin mark (e.g., an image). The following types of panning are allowed in some embodiments of the invention:

Two-dimensional panning—when both the height and width of the image exceeds the editor window viewer size.

Vertical one-dimensional panning—when the height of the image exceeds the editor window viewer size.

Horizontal one-dimensional panning—when the width of the image exceeds the editor window viewer size.

Panning occurs once the pointer moves, for example, four pixels beyond the panning origin mark in any direction. During panning, the pointer changes to indicate the direction in which the user is panning. For example, during two-dimensional panning, the pointer remains over the origin mark. During vertical one-dimensional panning, the pointer remains over the origin mark. During horizontal one-dimensional panning, the pointer remains over the origin mark. When panning up, the pointer is over the drag location. When panning down, the pointer is over the drag location. When panning to the left, the pointer is over the drag location. When panning to the right, the pointer is over the drag location. When panning toward the upper left, the pointer is over the drag location. When panning toward the upper right, the pointer is over the drag location. When panning toward the lower left, the pointer is over the drag location. When panning toward the lower right, the pointer is over the drag location.

In some embodiments, in the editor window, when a user initiates a process, an hourglass pointer is displayed, indicating that processing is in progress, until the process is complete.

Figure 16:
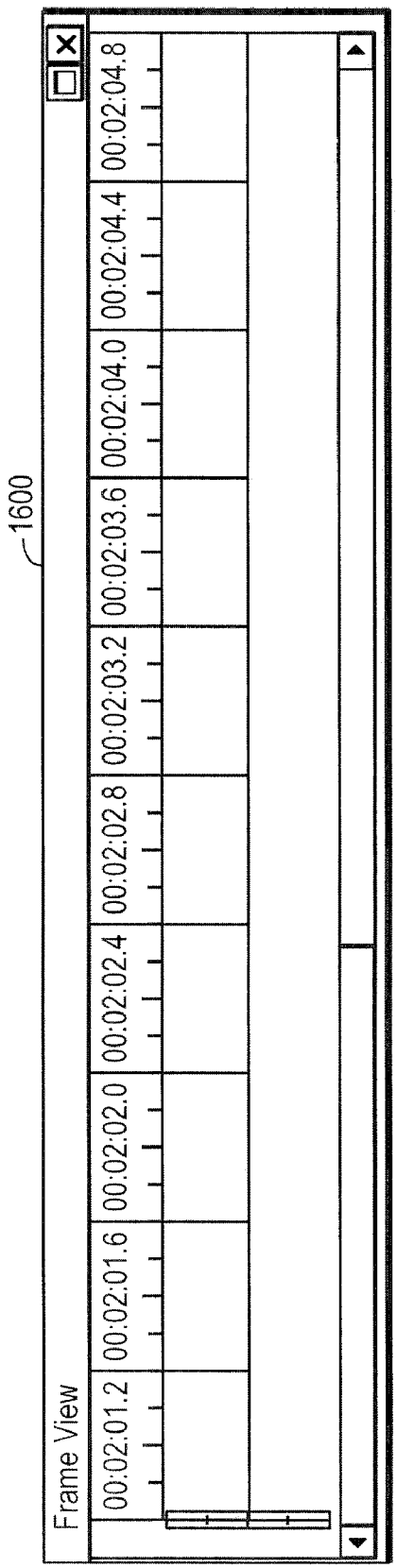
FIG. 16 illustrates a frame view window, in accordance with some embodiments of the invention.

In some embodiments, when a user selects a snapshot on a recording's timeline in the editor window, then chooses Frames on the View menu, the frame view window is displayed on top of the timeline in the corresponding editor window. FIG. 16 illustrates a frame view window 1600, in accordance with some embodiments of the invention. The frame view window is modal (e.g., the frame view window floats on top of a timeline in a corresponding editor window), and the user may close the frame view window in order to again use the timeline in the editor window.

The menu bar and the toolbar in the corresponding editor window are available when the frame view window is active. A user can interchangeably use commands on the menus in the editor window or buttons on the editor window's toolbar, or commands on the Timeline pop-up menu for the timeline in the frame view window that have the same functions. If a user makes changes in the frame view window, the changes are immediately reflected in the corresponding editor window, and vice versa.

The frame view window displays the frames that correspond to the current location (e.g., the snapshot that is currently selected, the snapshots that immediately precede the currently selected snapshots, and the two snapshots that immediately follow the currently selected snapshot on the timeline).

In some embodiments, in the frame view window, a user can do one or more of the following:
  Set the current location on the timeline.
  Insert a marker on the timeline.
  Insert a starting point marker to set a split point, at which to split a segment into two.
  Select a frame or a brief range of time on the timeline for editing.
  Cut, copy, paste, or clear a selection.
  Use forward or reverse cueing to cue a recording.
  During playback or when playback is paused, cue a recording by setting the current location indicator while monitoring audio, then start playback or insert a marker.
  When playback is paused, adjust a marker's position on the timeline while monitoring audio.

In some embodiments, in the frame view window, playback is restricted to the range of time represented on the timeline of the frame view window.

In some embodiments, the frame view window provides one or more of the following controls:
  Title bar—Contains the following title: frame view.
  Window shortcut menu—This menu is displayed when a user points to the title bar of the frame view window and contains one or more of the following commands:
    Restore—Restores the window to its former size and position, toggles the button to the Minimize button, and disables the Restore command and enables the Minimize command on the window shortcut menu.
    Size command—Choosing Size changes the pointer to a four-way arrow, allowing a user to change the width of the frame view window by dragging the left or right border of the window frame, or the size grip. The pointer changes to a double-headed arrow (e.g., pointing left and right) when a user moves the pointer over the left or right border of the window frame, or to a diagonal double-headed arrow when a user moves the pointer over the size grip. A user cannot change the height of the window. Therefore, the pointer does not change to a double-headed arrow when a user moves the pointer over the top or bottom border of the window frame.
    Minimize—Removes the window from the screen and changes its button on the taskbar to an up state, disables the Minimize command on the shortcut menu for the window's taskbar button, and enables the Restore command on the window shortcut menu.
    Close—Closes the window. Keyboard shortcut: Alt+F4.
  Title bar buttons:
    Minimize/Restore button—Clicking the Minimize button minimizes the frame view window and places the frame view window at the lower-left corner of the corresponding editor window, or to the immediate right of any other minimized window. Additionally, clicking the Minimize button toggles the button to the Restore button, disables the Minimize command on the window shortcut menu, and enables the Restore command on the window shortcut menu.
    Maximize/Restore button—licking the Maximize button displays the frame view window with the maximum width allowed by a user's screen. Clicking the Maximize button does not change the height of the window.
    Close button.
  Horizontal scroll bar
    Scroll bar shaft—Scrolls a distance that is equivalent to the width of the window minus 0.25 inch.
    Scroll arrows—Scroll in increments of one frame.
  Window frame—Dragging the left or right border of the window frame changes the width of the frame view window. The pointer changes to a double-headed arrow (e.g., pointing left and right) when a user moves the pointer over the left or right border of the window frame. A user cannot change the height of the window. Therefore, the pointer does not change when a user moves the pointer over the top or bottom border of the window frame.
  Size grip—Dragging this control changes the width of the frame view window. The pointer changes to a double-headed arrow (e.g., pointing left and right) when a user moves the pointer over the size grip.

In some embodiments, the timeline in the frame view window displays time in increments of 0.4 second. Specifically, the increment marks on the upper part of the timeline demarcate 0.1-second, 0.2-second, 0.3-second, and 0.4-second intervals of time. Each frame in a recording is 0.4 second. Each audio packet is 0.05 second. A user can place the current location indicator or a marker precisely at any 0.05-second interval on the timeline. The timeline in the frame view window displays both frames of video data and a track of audio data. The ToolTip text for the timeline is "frame view of Timeline."

In some embodiments, a user can click a frame to select the frame. To select a range of time on the timeline, a user can either drag to select the entire range, or click the first frame in the range, then Shift-click the last frame in the range. When a user selects a frame or range of time on the timeline, the middle and lower parts of the timeline appear highlighted in the color that the user designated for selected items when customizing the display properties.

In the frame view window, a middle part of the timeline contains the frames, or recorded images, that correspond to the snapshot that the user selected on the timeline in the editor window, and the snapshots that immediately precede and follow the selected snapshot. Each frame represents 0.4 second in the elapsed time of a recording.

In the frame view window, when a user drags the current location indicator or a marker on the timeline, presses Right Arrow, Left Arrow, Ctrl+Right Arrow, or Ctrl+Left Arrow to move the current location indicator or a selected marker, cues a recording using the Reverse Cueing and/or Forward Cueing commands, or makes an edit that affects the position of the current location indicator, no recorded images appear in the editor window viewer in the editor window until the user releases the current location indicator, marker, or key, or stops or pauses cueing, or the edit is completed. Then, the frame corresponding to the current location on the timeline is displayed in the editor window viewer. If a user starts or resumes playback, the display and audio corresponding to the current location on the timeline begins. If a user stops or pauses playback, the frame corresponding to the current location on the timeline is displayed in the editor window viewer.

In some embodiments, during playback or when playback is paused, a user can do one or more of the following on the timeline in the frame view window:
Cue a recording while monitoring audio.
Insert a marker.
Adjust a marker's position while monitoring audio.
Select a marker, frame, or range of time.
View the properties of a selected marker.
Rename a marker or segment.
Copy recorded data.

In some embodiments, a user cannot edit recorded data on the timeline during playback or when playback is paused.

In some embodiments, if a user attempts to drag recorded data during playback or when playback is paused, the following message may be displayed:
You cannot drag recorded data during playback or when playback is paused. To edit recorded data on the timeline, first stop playback, then try again.

In some embodiments, if a user attempts to drag recorded data from another recording to the timeline during playback or when playback is paused, the following message may be displayed:
You cannot drag recorded data from another recording to the timeline during playback or when playback is paused. To edit recorded data on the timeline, first stop playback, then try again.

In some embodiments, if a user attempts to drag another entire recording to the timeline during playback or when playback is paused, the following message may be displayed:
You cannot drag another recording to the timeline during playback or when playback is paused. To edit recorded data on the timeline, first stop playback, then try again.

In some embodiments, if a user attempts to delete recorded data from the timeline during playback or when playback is paused, the following message may be displayed:
You cannot delete recorded data from the timeline during playback or when playback is paused. To delete recorded data from the timeline, first stop playback, then try again.

Each of the above messages is displayed in a message box that has an OK button. When a user clicks OK, the message box closes and the Sequence Editor again becomes the active window.

Figure 17:
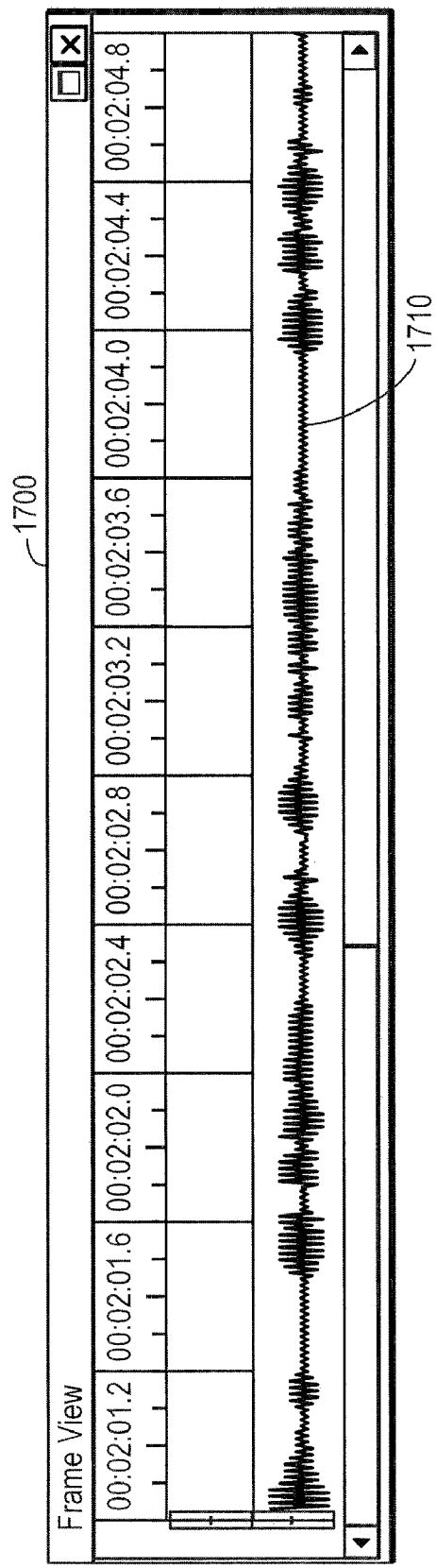
FIG. 17 illustrates a timeline in a frame view window with audio data, in accordance with some embodiments of the invention.
Figure 18A:
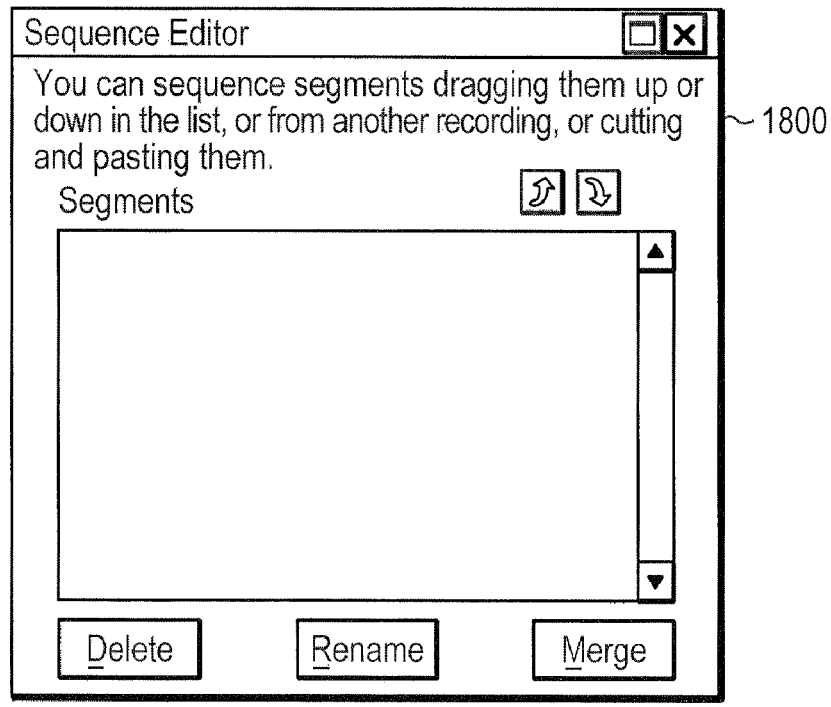
FIGS. 18A-18D illustrate sequence editor windows, in accordance with some embodiments of the invention.
Figure 18B:
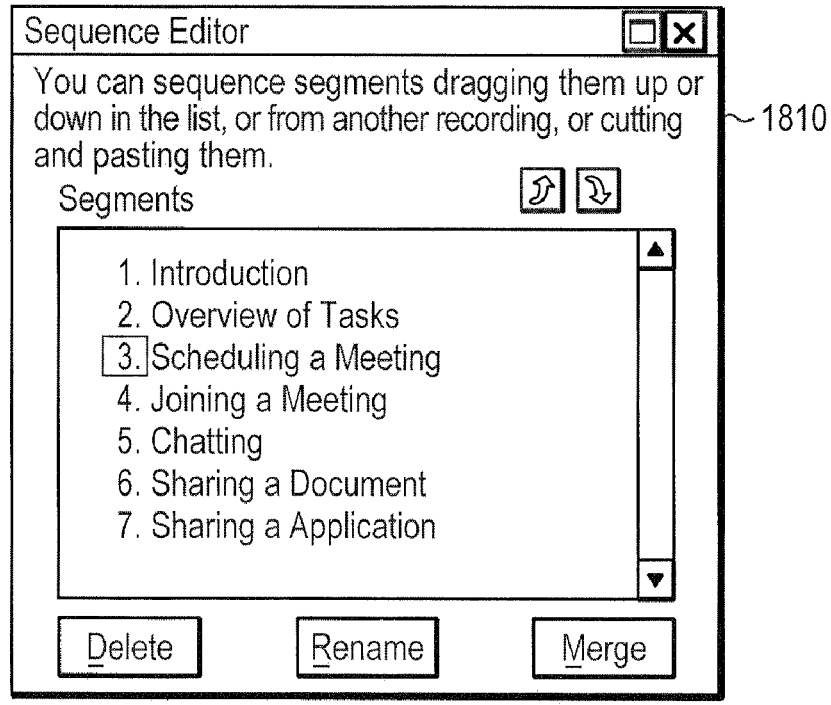
Figure 18C:
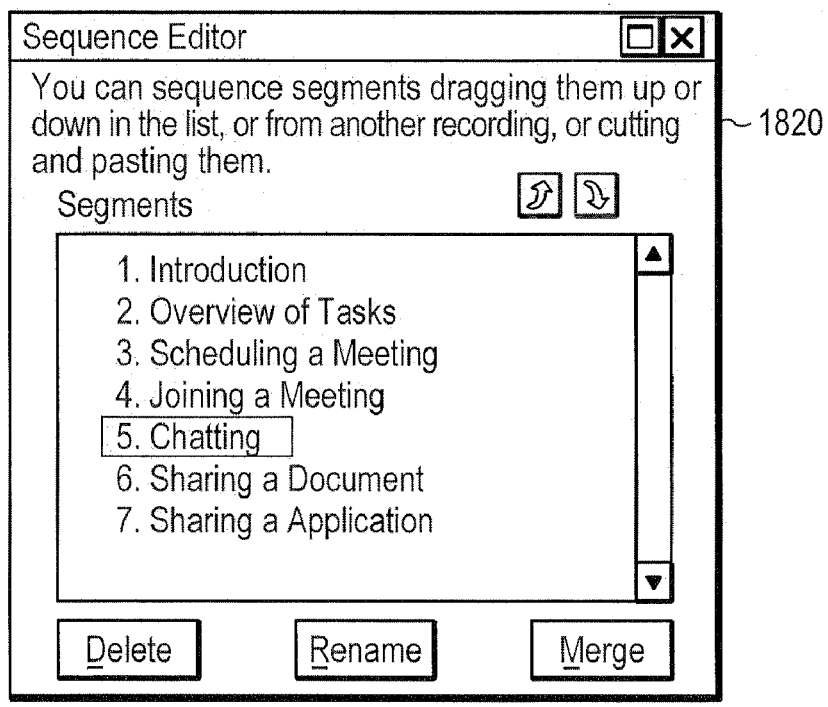
Figure 18D:
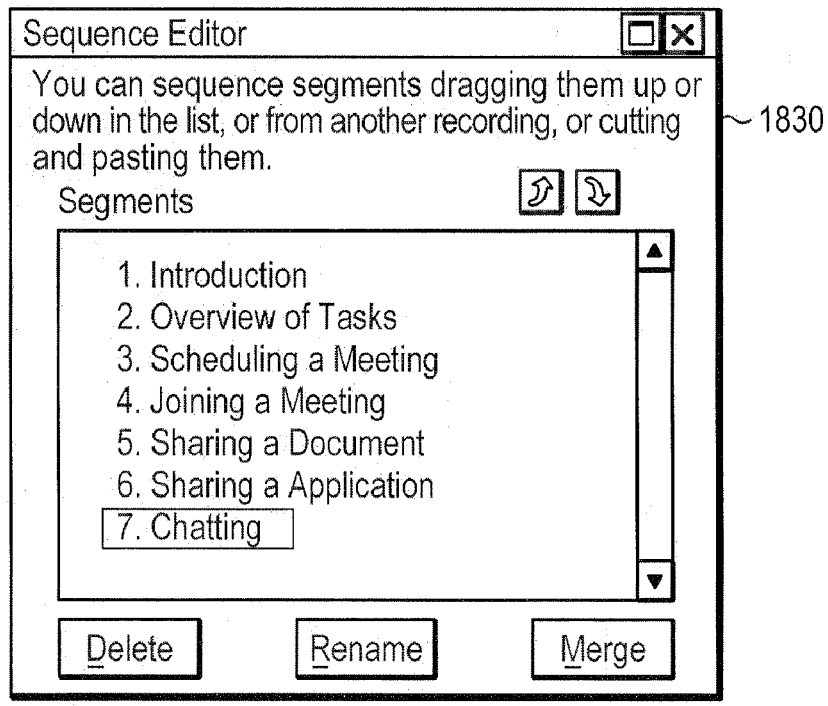

In some embodiments, the lower part of the timeline in the frame view window represents the audio track for a recording. In particular, the lower part of the timeline shows the amplitude of the audio signal. FIG. 17 illustrates a timeline in a frame view window 1700 with audio data 1710, in accordance with some embodiments of the invention.

When the frame view window is initially displayed, the current location indicator may be set immediately preceding the first frame corresponding to the selected snapshot on the timeline in the editor window. To navigate the frame view of the timeline for a recording and finely adjust the current location, a user can do one or more of the following:
Drag the current location indicator.
Press the Right Arrow or Left Arrow key to move the current location indicator continuously along the timeline.
Hold down the Ctrl key while pressing the Right Arrow or Left Arrow key to move the current location indicator by a distance that is approximately equivalent to the width of the window.
Press the Home key to move the current location indicator to the beginning of the timeline.
Press the End key to move the current location indicator to the end of the timeline.

During playback or when playback is paused, a user can use the current location indicator to cue a recording while monitoring audio, or select a location on the timeline at which to insert a marker, begin playback, or initiate some other action.

When a user moves the current location indicator to the right or left boundary of the timeline (e.g., by dragging the current location indicator, or pressing Right Arrow, Left Arrow, Ctrl+Right Arrow, or Ctrl+Left Arrow), the timeline automatically scrolls in the direction in which the user is dragging.

When playback is paused, a user can adjust a marker's position while monitoring audio or cue a recording to select a location on the timeline at which to insert a marker.

When a user points to the timeline in the frame view window, then presses the secondary mouse button, a pop-up menu is displayed. This menu contains one or more of the following commands, which have the same functions and behaviors as the corresponding commands on the menus on the menu bar:
Set Current Location
Cueing (submenu)
   Reverse
   Forward
Start Playback/Stop Playback
Pause Playback/Resume Playback

---

Insert Marker (submenu)
   Cue Point . . .

---

Starting Point . . .
Ending Point . . .

---

Cut
Copy
Paste

Table 13 shows the correspondences between commands on the Timeline pop-up menu and commands residing on menus on the menu bar in some embodiments of the invention.

TABLE 13

| Command on Timeline Pop-up Menu | Corresponding Command on Menu on Menu Bar |
| --- | --- |
| Set Current Location | Set Current Location command on Controls command menu |
| Cueing submenu | N/A |
| Reverse command | Reverse Cueing command on Controls menu |
| Forward command | Forward Cueing command on Controls menu |
| Start Playback/Stop Playback command | Start Playback/Stop Playback command on Controls menu |
| Start Playback/Stop Playback command | Start Playback/Stop Playback command on Controls menu |
| Pause Playback/Resume Playback command | Pause Playback/Resume Playback command on Controls menu |
| Insert Marker submenu | Marker submenu on the Insert menu |
| Cue Point . . . command | Cue Point . . . command |
| Starting Point . . . command | Starting Point . . . command |
| Ending Point . . . command | Ending Point . . . command |
| Cut command | Cut command on the Edit menu |
| Copy command | Copy command on the Edit menu |
| Paste command | Paste command on the Edit menu |

In the frame view window, when a user initiates a process, an hourglass pointer is displayed, indicating that processing is in progress, until the process is complete.

When a user chooses Sequence on the Edit menu, the sequence editor window is displayed centered, on top of the editor window viewer in the corresponding editor window. FIGS. 18A-18D illustrate sequence editor windows, in accordance with some embodiments of the invention. Sequence editor window 1800 is empty. The sequence editor window 1810 displays a list of segments in a recording, in numerical order (e.g., in the sequence in which they occur in the recording). In sequence editor window 1820, the sequence "Chatting" has been selected. In sequence editor window 1830, the sequence "Chatting" has been moved from fifth place on the list to seventh place on the list of sequences.

In some embodiments, in the sequence editor window, a user can do one or more of the following:

Reorder the sequence of the segments in a recording by either:
  dragging them up or down in the segment list;
  cutting, then pasting them at another location in the segment list, using the commands on the Edit menu; or
  selecting one or more segments in the segment list, then clicking the Move Up or Move Down buttons above the list.

Insert one or more segments from other recordings by either:
  dragging them from another Sequence Editor or editor window, then dropping them at the appropriate location in the segment list—this operation copies the segments; or
  copying or cutting them from another Sequence Editor or editor window, then pasting them at the appropriate location in the segment list, using the commands on the Edit menu.

Build a recording by concatenating segments from various recordings or entire recordings by:
  dragging segments from another Sequence Editor or editor window, then dropping them at the appropriate location in the segment list;
  selecting another entire recording in an editor window, then dragging the selected recording from that window and dropping the selected recording at the appropriate location in the segment list;
  dragging a recording's icon from Microsoft's Windows® Explorer or the desktop, then dropping the recording's icon at the appropriate location in the segment list;
  copying or cutting segments from another Sequence Editor or editor window, then pasting them at the appropriate location in the segment list, using the commands on the Edit menu;
  selecting another entire recording in an editor window, copying or cutting the recording, then pasting the selected recording at the appropriate location in the segment list, using the commands on the Edit menu; or
  inserting another recording by choosing Recording on the Insert menu or by choosing Insert Recording on the Segment List pop-up menu.

Delete or clear a selected segment and the recorded data that the segment contains.

Rename a selected segment.

Merge two or more contiguous, selected segments.

Truncate the beginning of a recording—removing all data that precedes the segment that is currently selected—by pointing to Truncate on the Edit menu, then choosing Beginning.

Truncate the ending of a recording—removing all data that follows the segment that is currently selected—by pointing to Truncate on the Edit menu, then choosing Ending.

Set the current location at the beginning of the segment that is currently selected by choosing Set Current Location on the Controls menu.

Go to the beginning or ending of a recording, or the beginning of the segment that is currently selected.

Start playback at the beginning of the segment that is currently selected by choosing Start Playback on the Controls menu, and stop, or pause and resume playback.

Also, a user can use any buttons on the toolbar or commands on the Segment List pop-up menu that have the same functions as these commands to perform these tasks.

In some embodiments, the menu bar and the toolbar in the corresponding editor window are available when the sequence editor window is active. A user can interchangeably use commands on the menus in the editor window, buttons on its toolbar, or commands on the Segment List pop-up menu that have the same functions. If a user makes changes in the sequence editor window, the changes are immediately reflected in the corresponding editor window, and vice versa.

In some embodiments, the sequence editor window provides one or more of the following controls:

Title bar—Contains the following title: Sequence Editor.

Window shortcut menu—This menu is displayed when a user points to the title bar of the sequence editor window, regardless of whether the sequence editor window is minimized.

Title bar buttons:

Minimize/Restore button—Clicking the Minimize button minimizes the sequence editor window and places the sequence editor window at the lower-left corner of the corresponding editor window, or to the immediate right of any other minimized window; toggles the button to the Restore button, disables the Minimize command on the window shortcut menu, and enables the Restore command on the window shortcut menu.

Close button.

Size grip.

In some embodiments, The sequence editor window contains the following instructional text, in, for example, 11-point Arial:

You can sequence segments by cutting and pasting them.

You can sequence segments by dragging them up or down in the list, or from another recording; or cutting and pasting them.

In some embodiments, the segment list is labeled with: "Segments:". In the segment list, a user can click a segment to select the segment. Also, a user can press the Spacebar key to select the first segment in the list. The selected segment appears highlighted within a dotted rectangle. When a segment is selected, the name of the segment appears highlighted.

When a user selects a segment in the segment list, the segment also appears selected on the timeline in the editor window, and vice versa. The timeline scrolls automatically to the beginning of the selected segment or, if more than one segment is selected, to the beginning of the first selected segment.

When a user selects one or more segments in the editor window, the segment list scrolls automatically to the selected segment or, if more than one segment is selected, to the first selected segment.

Once a user has selected a segment, a user can change the selection (e.g., select a different segment) by:

pressing Up Arrow or Down Arrow, which selects the previous or next segment, respectively;

pressing Home, which selects the first segment in the list;

pressing End, which selects the last segment in the list; or clicking another segment.

To select segments that are contiguous in the segment list, a user can extend the current selection in either direction by doing the following (and all of the intervening segments are selected):

shift-clicking another segment;

pressing Shift+Up Arrow—to extend the selection backward in the list, one segment at a time;

pressing Shift+Down Arrow—to extend the selection forward in the list, one segment at a time;

pressing Shift+Home—to extend the selection to the beginning of the first segment in the list; or pressing Shift+End—to extend the selection to the end of the last segment in the list.

To select segments that are not contiguous in the segment list, a user can extend the current selection in either direction by Ctrl-clicking one or more other segments. This is a disjoint selection and intervening segments are not selected.

The numbers in the segment list indicate the sequence of the segments in a recording. A segment's number is not part of its name.

In the sequence editor window, a user can double-click a segment to display the segment's Segment Properties dialog box. Also, a user can select a segment in the list, then choose Properties or Define Segment on the Edit menu.

When one or more segments are currently selected in the segment list, choosing Start Playback on the Controls menu starts playback at the beginning of the first selected segment. Once all selected segments play back, playback stops automatically.

Regardless of whether any segments were selected before playback began, during playback the number of the segment that is currently playing back appears highlighted.

During playback or when playback is paused, a user can do one or more of the following in the segment list in the sequence editor window:

Select one or more segments.

View the properties of a selected segment.

Rename a selected segment.

Copy one or more selected segments.

In some embodiments, a user cannot edit the segment list during playback or when playback is paused.

In some embodiments, if a user attempts to drag one or more selected segments during playback or when playback is paused, the following message may be displayed:

You cannot drag segments during playback or when playback is paused. To edit the segment list, first stop playback, then try again.

If a user attempts to drag one or more segments from another recording into the segment list during playback or when playback is paused, the following message may be displayed:

You cannot drag segments from another recording into the segment list during playback or when playback is paused. To edit the segment list, first stop playback, then try again.

If a user attempts to drag another entire recording into the segment list during playback or when playback is paused, the following message may be displayed:

You cannot drag another recording into the segment list during playback or when playback is paused. To edit the segment list, first stop playback, then try again.

If a user attempts to move one or more selected segments up or down in the segment list during playback or when playback is paused, the following message may be displayed:

You cannot move segments in the list during playback or when playback is paused. To edit the segment list, first stop playback, then try again.

If a user attempts to delete one or more selected segments during playback or when playback is paused, the following message may be displayed:

You cannot delete segments during playback or when playback is paused. To edit the segment list, first stop playback, then try again.

If a user attempts to merge two or more selected segments during playback or when playback is paused, the following message may be displayed:

You cannot merge segments during playback or when playback is paused. To merge the selected segments, first stop playback, then try again.

Each of the above messages is displayed in a message box, which has an OK button. When a user clicks the OK button, the message box closes and the Sequence Editor again becomes the active window.

Figure 19A:
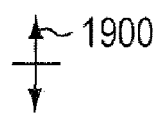
FIGS. 19A-C illustrate pointers, in accordance with some embodiments of the invention.

In some embodiments, in the sequence editor window, when a user drags an existing segment up or down in the segment list, the segment's name remains highlighted within a dotted rectangle in the list; and a 1-pixel-wide, horizontal black line, with a right-pointing arrow that is also in the user's highlight color, appears under and tracks the movement of a double-headed arrow pointer, an example of which is illustrated in FIG. 19A, in accordance with some embodiments of the invention. The line snaps to the gaps between the segment names, or immediately above the first segment name, or immediately below the last segment name in the list. When the user releases the mouse button, the line disappears, the segment name moves to the last location of the line in the list and remains highlighted, and the segments are renumbered as necessary to maintain their consecutive numbering.

In some embodiments, a user can drag another entire recording to the segment list, from the timeline in the editor window or the sequence editor window for the other recording, or from Microsoft's Windows® Explorer or the desktop. A user can drag segments to the segment list from the timeline in the editor window or the sequence editor window for another recording.

Figure 19B:

When a user drags another entire recording, or one or more segments from another recording to the segment list, an arrow pointer with a content box, an example of which is illustrated in FIG. 19B, in accordance with some embodiments of the invention, follows the user's mouse movement. Once the pointer is over the segment list, the destination sequence editor window becomes the active window; and a 1-pixel-wide, horizontal black line, with a right-pointing arrow that is in the user's highlight color, appears under and tracks the movement of the pointer. The line snaps to the gaps between the segment names, or immediately above the first segment name, or immediately below the last segment name in the list. When the user releases the mouse button, the destination sequence editor window becomes the active window, the recording's file name—with no extension—or the segment's name is displayed at the last location of the line in the list and remains highlighted, and the segments are renumbered as necessary to maintain their consecutive numbering. This operation copies the recording or segments.

In some embodiments, when a user points to the segment list in the sequence editor window, then presses the secondary mouse button, a pop-up menu is displayed. This menu contains one or more of the following commands, which have the same functions and behaviors as the corresponding commands on the menus on the menu bar:

Set Current Location
Go To (submenu)
    Beginning
    Segment
    End
Start Playback/Stop Playback
Pause Playback/Resume Playback

---

Insert Recording . . .

---

Properties . . .

---

Select All

---

Cut
Copy
Paste

Table 14 shows the correspondences between commands on the Segment List pop-up menu and commands residing on menus on the menu bar in some embodiments of the invention.

TABLE 14

| Command on Timeline Pop-up Menu | Corresponding Command on Menu on Menu Bar | Differences in Behavior of Command in Sequence Editor |
| --- | --- | --- |
| Set Current Location command | Sets the current location to command on Controls menu | Sets the current location to the beginning of the selected segment. |
| Go To submenu Beginning command | N/A Rewind to Beginning command on Controls menu | |
| Segment command | N/A | Moves the Current Location indicator to the left of the first snapshot in the selected segment. Analogous to choosing an item on the Segment submenu or the Segments palette. This command is dimmed during playback or when playback is paused. |
| End command | Fast Forward to End command on Controls menu | |
| Start Playback/Stop Playback command | Start Playback/Stop Starts playback command on Controls menu | Starts playback at the beginning of the selected segment. |
| Pause Playback/Resume Playback command | Pause Playback/Resume Playback command on Controls menu | |
| Insert Recording . . . command | Recording . . . command on the Insert menu | Inserts a recording before the selected segment, or if more than one segment is selected, the first selected segment. |
| Properties . . . command | Properties . . . command on the Edit menu | Displays a Segment Properties dialog box for each selected segment. |

TABLE 14-continued

| Command on Timeline Pop-up Menu | Corresponding Command on Menu on Menu Bar | Differences in Behavior of Command in Sequence Editor |
|---|---|---|
| Select All command | Select All command on the Edit menu | |
| Cut command | Cut command on the Edit menu | |
| Copy command | Copy command on the Edit menu | |
| Paste command | Paste command on the Edit menu | |

The sequence editor window may contain one or more of the buttons listed in Table 15 in some embodiments. In some embodiments, the buttons listed in Table 15 may have associated images.

TABLE 15

| Button Image or Text | Function |
|---|---|
| Move Up (ToolTip text) | Moves the selected segment or segments up in the list —that is, above the segment that precedes the first selected segment in the list. If a user holds down the mouse button while pointing to the Move Up button, continuously moves the selected segments upward in the list.<br>This button appears dimmed when there is no current selection. |
| Move Down (ToolTip text) | Moves the selected segment or segments down in the list —that is, below the segment that follows the last segment that is contiguous with the first segment selected in the list. If a user holds down the mouse button while pointing to the Move Down button, continuously moves the segments downward in the list.<br>This button appears dimmed when there is no current selection. |
| Delete | Deletes the selected segment or segments from the recording, and the recorded data that they contain, without placing the recorded data on the Clipboard. This button has the same effect as the Delete key, which a user can also use to delete the selected segments.<br>When a user clicks this button, the Delete Segment message box is displayed, allowing the user to confirm the deletion.<br>This button appears dimmed when there is no current selection. |
| Rename | Allows a user to rename a segment. When a user clicks this button, a box surrounds the highlighted segment name. The user can then either type a new name or select an insertion point in the name to edit it and press Return to complete the process. Also, once a user has selected a segment name, the user can click the segment name again to rename the segment.<br>This button appears dimmed when there is no current selection or more than one segment is selected. |
| Merge | Merges two or more contiguous, selected segments into one.<br>This button appears dimmed when there is no current selection.<br>If a user clicks this button and the selected segments are not contiguous, the following message is displayed:<br>The selected segments are not contiguous. You can merge only contiguous segments.<br>The user clicks OK to close the message box and return to the Sequence Editor window. |

In some embodiments, in the sequence editor window, when a user changes the sequence of the segments, inserts a segment, merges or concatenates segments, or initiates another process, one of the following progress indicators is displayed:

If the process will take less than one minute, the hourglass pointer is displayed, indicating that processing is in progress.

Figure 20:
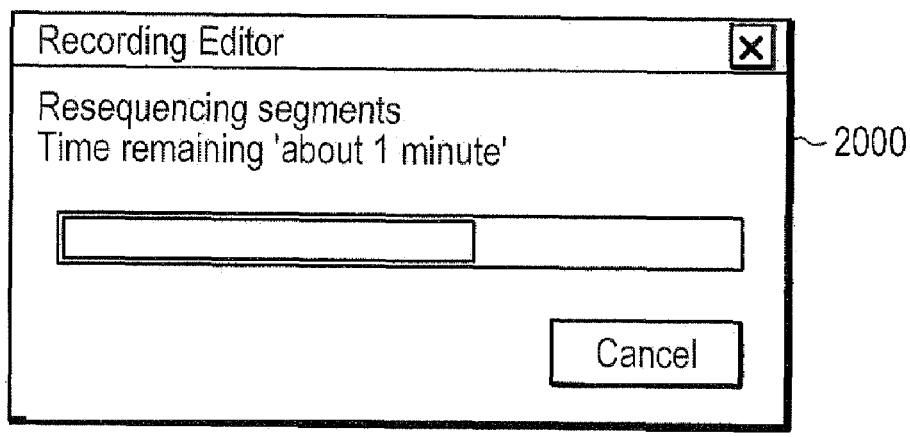
FIG. 20 illustrates a progress message box, in accordance with some embodiments of the invention.

If the process will take more than one minute, a progress message box is displayed, indicating the percentage of the process that is currently complete and the time remaining till its completion. The message box remains visible until the process is complete. FIG. 20 illustrates a progress message box 2000, in accordance with some embodiments of the invention.

The title bar may contain the title "Recording Editor" and a Close button. The title may be indented by 5 pixels.

Depending on the process in progress, one of the following messages may be displayed on the first line of message text:

Resequencing segments . . . . This message is displayed when a user has moved a segment.

Inserting segment . . . . This message is displayed when a user has inserted a segment.

Merging segments . . . . This message is displayed when a user has merged two or more segments.

Adding segment . . . . This message is displayed when a user has concatenated a segment.

This message text may be left aligned, indented from the left border of the window by 15 pixels, and 15 pixels below the title bar of the message box.

The time remaining, in minutes, may be displayed on the second line of message text, as follows:

Time remaining: about [#] minutes.

Time remaining: about 1 minute.

Time remaining: less than a minute.

The time-remaining message may be left aligned, indented from the left border of the window by 15 pixels, and 9 pixels below the baseline of the first line of text.

The progress bar may be indented from both the left and right borders of the window by 15 pixels, 15 pixels below the baseline of the time-remaining message text, 24 pixels in height, and 344 pixels wide. A solid bar may be used to show the percentage of completion.

A user can click Cancel, click the Close button, or press Esc to stop the process at any time, leaving the recording unchanged. The Cancel button may be 15 pixels below the progress bar, and 15 pixels from both the right and bottom borders of the window.

In some embodiments, the user interaction models for Recording Editor, include on or more of the following:

Navigation and cueing models.

Selection models.

Editing models.

In some embodiments, navigation and cueing models include one or more of the following:

Navigating a recording's timeline.

Setting a new current location on the timeline.

Cueing a recording.

In some embodiments, one or more of the following techniques are available for navigating a recording's timeline without setting a new current location on the timeline (note that the first three techniques of navigation use the scroll bar, while the last three techniques of moving a marker can be used interchangeably with one another):

Dragging the timeline scroll box to the right or left.

Clicking the scroll bar shaft to scroll a distance that is equivalent to the width of the window.

Clicking to the right of the scroll box to scroll to the right.

Clicking to the left of the scroll box to scroll to the left.

Clicking a scroll arrow to scroll by a snapshot.

Clicking the right scroll arrow to scroll to the right.

Clicking the left scroll arrow to scroll to the left.

Pointing to a scroll arrow and holding down the mouse button causes scrolling to auto-repeat, resulting in continuous scrolling in the direction of the arrow.

Dragging a marker forward or backward on the timeline.

Pressing the Right Arrow or Left Arrow key to move a selected marker continuously along the timeline.

Holding down the Ctrl key while pressing the Right Arrow or Left Arrow key to move a selected marker by a distance that is approximately equivalent to the width of the window.

Pressing the Home key to move the current location indicator to the beginning of the recording.

Pressing the End key to move the current location indicator to the end of the recording.

In some embodiments, when a user moves a selected marker to the right or left boundary of the timeline (e.g., by pressing Right Arrow, Left Arrow, Ctrl+Right Arrow, or Ctrl+Left Arrow), the timeline automatically scrolls in the direction in which the user is dragging.

In some embodiments, when a user is navigating a recording's timeline using any of the above-mentioned techniques, the frame corresponding to the current location on the timeline does not remain in the editor window viewer.

In some embodiments, one or more of the following techniques (which may be used interchangeably) are available for navigating a recording's timeline and setting a new current location on the timeline:

Dragging the current location indicator forward or backward on the timeline.

Pressing the Right Arrow or Left Arrow key to move the current location indicator continuously along the timeline.

Holding down the Ctrl key while pressing the Right Arrow or Left Arrow key to move the current location indicator by a distance that is approximately-equivalent to the width of the window.

Pressing the Home key to move the current location indicator to the beginning of the recording.

Pressing the End key to move the current location indicator to the end of the recording.

Scrolling, then selecting a snapshot and, on the Controls menu, choosing Set Current Location.

Using the transport controls to play, pause/resume, stop, rewind, go to the previous or next segment in, or fast forward a recording.

Using the transport commands to start, stop, pause, or resume playback; or rewind to the beginning or fast forward to the end of a recording.

Inserting a marker then autolocating the marker by clicking the corresponding item on the Markers palette.

Defining a segment then autolocating the segment's starting point marker by:

clicking the name of the segment on the Segments palette;

on the View menu, pointing to Segment, then clicking the name of the segment on the submenu; or on the View menu, choosing Next Segment or Previous Segment.

In some embodiments, when a user moves the current location indicator to the right or left boundary of the timeline (e.g., either by dragging the current location indicator, or pressing Right Arrow, Left Arrow, Ctrl+Right Arrow, or Ctrl+Left Arrow), the timeline automatically scrolls in the direction in which the user is dragging.

In some embodiments, when a user is moving the current location indicator on a recording's timeline, using any means except the transport controls or commands, no recorded images appear in the editor window viewer until the user releases the current location indicator or key, or a command completes its execution. Then, the frame corresponding to the current location on the timeline is displayed.

In some embodiments, on the timeline in either the editor window or the frame view window, a user can cue a recording (e.g., find a specific location in the recording) using any of the following techniques (which may be used interchangeably):

when playback reaches the precise location on the timeline at which the user wants to cue the recording, on the Controls menu, choosing Stop Playback (F3) or Pause Playback (F4); or on the Controls menu, choosing Reverse Cueing (F6) and/or Forward Cueing (F7), then at the precise location on the timeline at which the user wants to cue the recording, choosing Stop Playback (F3) or Pause Playback (F4).

In some embodiments, during playback or when playback is paused, a user can also cue a recording in the frame view window by slowly moving forward or backward through the recording while viewing frames on the timeline and monitoring audio. In some embodiments, the following techniques of cueing a recording are available in the frame view window during playback or when playback is paused:

Cueing with the current location indicator:

dragging the current location indicator forward or backward on the timeline;

pressing the Right Arrow or Left Arrow key to move the current location indicator continuously along the timeline;

holding down the Ctrl key while pressing the Right Arrow or Left Arrow key to move the current location indicator by a distance that is approximately equivalent to the width of the window.

Cueing with a marker.

When playback is paused, dragging a marker forward or backward on the timeline.

When playback is paused, pressing the Right Arrow or Left Arrow key to move a selected marker continuously along the timeline.

When playback is paused, holding down the Ctrl key while pressing the Right Arrow or Left Arrow key to move a selected marker by a distance that is approximately equivalent to the width of the window.

All of the techniques of cueing a recording with the current location indicator can be used interchangeably with one another. All of the techniques of cueing a recording with a marker can be used interchangeably with one another.

When a user moves the current location indicator or a marker while monitoring audio, the audio playback speed matches the speed at which the user is moving the pointer along the timeline.

Once a user locates a precise cue point, the user can insert a cue point marker at that location on the timeline to allow autolocation of the cue point. The term "autolocation" refers to a process of automatically going to a specific, preset location in a recording.

When a user is cueing a recording using the Reverse Cueing and/or Forward Cueing commands, when the recording is automatically rewinding, no sequence of recorded images is displayed in the editor window viewer. Once playback automatically resumes or pauses, the frame corresponding to the current location on the timeline is displayed.

In some embodiments, in the frame view window, when a user is cueing a recording by either dragging the current location indicator or a marker forward or backward; pressing Right Arrow, Left Arrow, Ctrl+Right Arrow, or Ctrl+Left Arrow to move the current location indicator or a selected marker; or using the Reverse Cueing and/or Forward Cueing commands, a user can view frames, or recorded images, on the timeline and hear audio. No sequence of recorded images is displayed in the editor window viewer until the user releases the current location indicator, marker, or key; or stops or pauses cueing. Then, the frame corresponding to the current location on the timeline is displayed.

In some embodiments, in the frame view window, when a user moves the current location indicator or a marker to the right or left boundary of the timeline (e.g., by dragging the current location indicator or marker or pressing Right Arrow, Left Arrow, Ctrl+Right Arrow, or Ctrl+Left Arrow), the timeline automatically scrolls in the direction in which the user is dragging.

In some embodiments, the following selection models for recorded data on the timeline are available:
  A frame or snapshot.
  A range of time.
  A marker.
  A segment.
  All content.

The term "selection" refers to a part of the timeline that is currently selected, which appears highlighted in the color that a user designated for selected items when customizing the display properties. When a user chooses a command or otherwise initiates an action, the command or action affects the current selection.

When a user chooses a command, or otherwise initiates an action, the command or action operates on the current selection, which may be a frame, snapshot, range of time, marker, or segment on the timeline. If there is currently no selection on the timeline, the command or action operates on the current location, that is, the location of the current location indicator on the timeline, which corresponds to the image that currently is displayed in the editor window viewer during playback or editing.

When a user clicks a frame or snapshot on the timeline to select the frame or snapshot, the frame or snapshot may appear highlighted.

In some embodiments, a user can select a range of time on the timeline by one or more of the following techniques:
  Pressing the mouse button to set an anchor point, dragging the mouse forward or backward over the timeline, then releasing the mouse button to set an active end point.
  Clicking the first frame or snapshot in the range to set an anchor point, scrolling to the end of the range, then holding down the Shift key and clicking the last frame or snapshot in the range to set an active end point.
  Clicking a cue point marker to select the cue point marker, scrolling to another cue point marker at the end of the range, then holding down the Shift key and clicking the second cue point marker.
  Holding down the Ctrl key, and clicking a starting point marker or ending point marker to select a predefined range of time or a segment.

When a user selects a range of time, the selected range may appear highlighted on the lower part of the timeline.

In some embodiments, to extend the range of a selection in either direction, a user can do one or more of the following:
  1. Hold down the Shift key to reset the active end point of the original selection.
  2. Drag the mouse over the timeline to extend the selection.
  3. Release the mouse button to set the active end point.

The extended range may appear highlighted.

If when selecting a range of time, a user drags the mouse across the right or left boundary of the timeline, the timeline automatically scrolls in the direction in which the user is dragging.

A user can click a marker to select the marker. When a user clicks a marker, the silver interior of the marker may appear highlighted, in the user's highlight color. A user can hold down the Ctrl key, and click a starting point marker or, if an ending point marker is visible, click the ending point marker to select a predefined range of time. The selection comprises both the starting and ending point markers, and the intervening range of time on the timeline. When a user Ctrl-clicks a starting or ending point marker, both of the markers that define the selected range appear highlighted and the intervening range of time may appear highlighted on the lower part of the timeline.

A user can hold down the Ctrl key and click a segment's starting point marker or, if an ending point marker is visible, click the ending point marker to select the segment. The selection includes the segment's starting and ending point markers, and the entire segment on the timeline. When a user Ctrl-clicks a segment's starting or ending point marker, both of the markers that define the segment appear highlighted and the entire segment appears highlighted on the lower part of the timeline.

Figure 21:
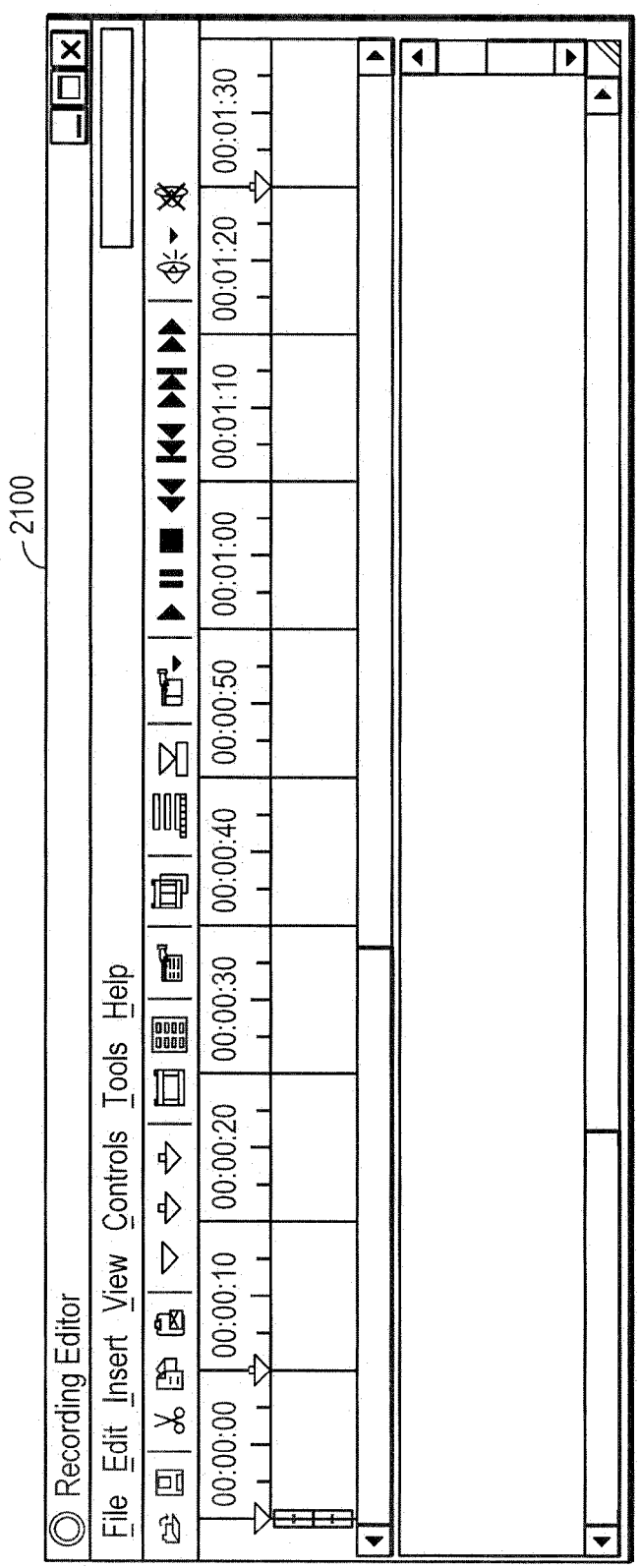
FIG. 21 illustrates an editor window with a segment selected, in accordance with some embodiments of the invention.

FIG. 21 illustrates an editor window 2100 with a segment selected, in accordance with some embodiments of the invention.

In some embodiments, a user can choose Select All on the Edit menu to select one or more of the following:
  All content in an active window.
  The contents of a text box that contains the insertion point.

In some embodiments, one or more of the following editing models may be available:
  Using the Cut, Copy, Paste, and Clear commands on the Edit menu.
  Drag-and-drop editing.
  Truncating a recording.
  Editing segments.
  Inserting a recording.

In some embodiments, the Cut, Copy, and Clear commands apply to one or more of the following selected elements:
  Frames, snapshots, or ranges of recorded data on a timeline.
  Markers on a timeline or the Markers palette.
  Segments on a timeline or the sequence editor window Segments palette.
  Entire recordings.
  Text in text boxes.
  Title text.

In some embodiments, the Cut and Copy commands place the current selection on the Clipboard, while the Clear command does not.

In some embodiments, the Paste command inserts the contents of the Clipboard, as follows:
- If the Clipboard contains recorded data, a segment, or an entire recording, the Paste command inserts:
  - the data, segment, or recording either at the current location or preceding any current selection on a timeline; or
  - the segment or recording before the current selection in the segment list in the sequence editor window;
- If the Clipboard contains a marker, the Paste command either inserts the marker at the current location on the timeline or replaces any marker that is currently selected on the timeline.
- If the Clipboard contains text, the Paste command either inserts the text at the insertion point that is currently selected or replaces any selected text.

In some embodiments, if a user pastes recorded data into the timeline in the frame view window, the number of frames that actually appear on the timeline remains the same. Frames on the Clipboard appear at the current location or preceding the current selection, and all frames to the right of the current location, or in and to the right of the current selection move to the right. If the number of frames on the Clipboard exceeds the number of frames to the right of the current location, or in and to the right of the current selection, frames on the Clipboard replace all of those frames. All frames on the right beyond the maximum number of frames that can appear on this timeline may not appear in the frame view window. The timeline in the editor window allows the user to view the recording, including all of the pasted data, in its entirety.

In some embodiments, when a user pastes another entire recording into the recording being edited, the pasted recording automatically becomes a segment, and the Define Segment dialog box is displayed, with the name of the recording in the Name box, and its starting and ending points in the Starting point and Ending point text boxes, respectively.

In some embodiments, a user may use drag-and-drop editing to do one or more of the following:
- On a timeline:
  - move a marker to another location;
  - adjust a marker's position;
  - move a selected segment; or
  - move a selected frame, snapshot, or range of recorded data.
- In the sequence editor window:
  - move a segment up or down in the segment list;
  - insert another entire recording or a segment from another recording in the segment list.

When a user drags a marker on a timeline, the image of the marker may follow an arrow pointer.

Figure 22:
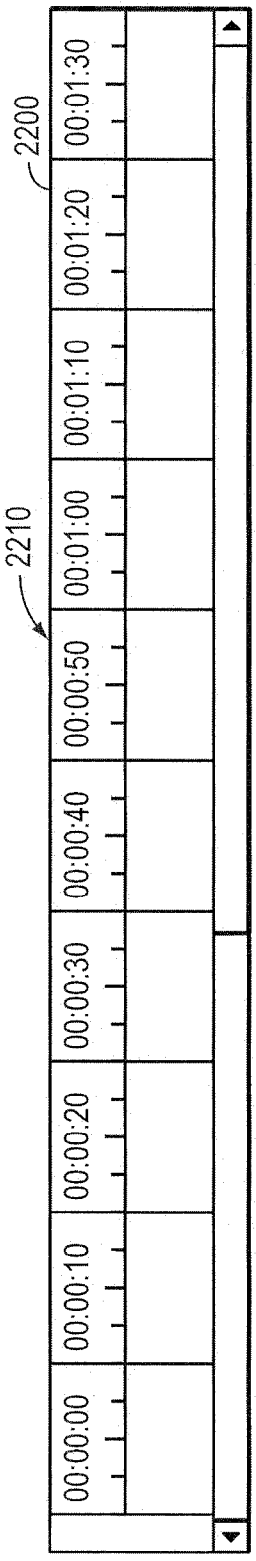
FIG. 22 illustrates a timeline in a frame view window, in accordance with some embodiments of the invention.

In some embodiments, when a user drags a selected frame, snapshot, range of recorded data, one or more segments, or an entire recording to another location on a timeline, an arrow pointer with a content box follows the user's mouse movement. FIG. 22 illustrates a timeline in a frame view window 2200, in accordance with some embodiments of the invention. On the upper part of the timeline, a red insertion point 2210 follows the pointer indicating that the user can insert the data. Once the pointer is over the location at which the user wants to insert the selected data and the user releases the mouse button, the data is displayed at that location and remains highlighted.

In some embodiments, when a user drags a selected frame, snapshot, range of recorded data, one or more segments, or an entire recording from one timeline to the timeline for another recording, an arrow pointer with a content box follows the user's mouse movement. In the Recording Editor or frame view window, once the pointer is over the destination timeline, a red insertion point 2210 is displayed on the upper part of the timeline indicating that the user can insert the data, and follows the movement of the pointer. When the pointer is at the location on the destination timeline at which the user wants to insert the selected data and the user releases the mouse button, the destination Recording Editor or frame view window becomes the active window, and the data is displayed at that location and remains highlighted. This operation copies the recorded data. The insertion point may be, for example, a one-pixel-wide, red line.

Figure 19C:
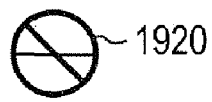

In some embodiments, if a user attempts to drag data to a destination that cannot contain data of its type, the pointer changes its shape to indicate that the user cannot drop the data. FIG. 19C illustrates a pointer 1920 that indicates that the user cannot drop data, in accordance with some embodiments of the invention. During a drag-and-drop operation, dropping the selected data onto its original position or pressing Esc cancels the operation.

In some embodiments, a user can truncate either the beginning or ending of a recording by doing one or more of the following:
- Pointing to Truncate on the Edit menu, then choosing Beginning:
  - In the editor window, this command truncates a recording from the current location on the timeline to the beginning of the recording.
  - In the sequence editor window, this command truncates the beginning of a recording by removing all data that precedes the segment that is currently selected.
- Pointing to Truncate on the Edit menu, then choosing Ending:
  - In the editor window, this command truncates a recording from the current location on the timeline to the end of the recording.
  - In the sequence editor window, this command truncates the ending of a recording by removing all data that follows the segment that is currently selected.

Truncating the beginning or ending of a recording does not place any data on the Clipboard.

A user can edit an individual segment's properties in either the Define Segment dialog box or the Segment Properties dialog box. A user can also adjust the length of the segment by dragging its starting point marker or ending point marker on a timeline.

In some embodiments, in the sequence editor window, the primary editing tasks that a user may perform include one or more of the following:
- Reorder the segments in the list.
- Insert segments from another recording.
- Insert another entire recording.
- Delete any segments that are currently selected and the recorded data that they contain.
- Rename a segment that is currently selected.
- Merge any contiguous segments that are currently selected.

In some embodiments, a user can insert an entire recording into a recorded file by doing one or more of the following:
- Choosing Recording on the Insert menu, then selecting a recorded file in the Insert Recording dialog box and inserting the recorded file at the current location on the timeline in the Recording Editor or frame view window, or into the list of segments in the sequence editor window.
- Selecting the entire timeline of another recording, then cutting or copying, and pasting the selected data at the current location on the timeline in the Recording Editor or frame view window, or into the list of segments in the sequence editor window.
- Selecting the entire timeline of another recording, then dragging the selected data to the timeline in the Recording Editor or frame view window, or into the list of segments in the sequence editor window.

The Recording Editor is used to edit work products (e.g., a recording, segments, ranges of recorded data, and markers). In some embodiments, an icon with a label represents a recording, or recorded file, on, for example, the desktop or in Microsoft's Windows® Explorer folder, and in the lists available in dialog boxes such as the following:

Open dialog box
Save As dialog box
Insert Recording dialog box

To open a recorded file in an editor window, a user can double-click the recorded file icon on the desktop or in the Microsoft's Windows® Explorer folder.

In some embodiments, the recorded file icon shortcut menu contains the following commands listed in Table 16.

In some embodiments, when a user installs editing software 202, an installer program installs the following files in an Editor folder on the user's hard disk, in, for example, the Programs folder or in another folder that the user selects:

Editor.exe
System folder—This folder and its contents are hidden. The System folder contains the following files:
.dll files
Help files The installer program automatically places a shortcut for Recording Editor in the Programs folder on the Start menu. The installer program also provides an option that allows a user to specify that a shortcut for Recording Editor be placed on the desktop (e.g., via a Place a shortcut for Recording Editor on desktop check box).

TABLE 16

| Command | Function |
| --- | --- |
| Open command | Opens the recorded file in a Recording Editor window. |
| Send To submenu | Displays a submenu of destinations to which a user can transfer the recorded file. The contents of the system's Send To folder determines the commands that appear on the submenu. |
| Cut command | Marks the recorded file for moving and places the recorded file on the Clipboard. |
| Copy command | arks the recorded file for copying and places the recorded file on the Clipboard. |
| Create Shortcut command | Creates a shortcut icon for the recorded file. |
| Delete command | Deletes the recorded file. |
| Rename command | Lets a user edit the recorded file name. |
| Properties command | Displays the Properties dialog box for the recorded file. |

An application icon with a label (e.g., 1510) may be used to represent the Recording Editor application on the desktop or in Microsoft's Windows® Explorer.

To open Recording Editor, a user can double-click the application icon on the desktop or in Microsoft's Windows® Explorer folder. An empty editor window is displayed.

In some embodiments, the Recording Editor application icon shortcut menu contains one or more of the following commands in Table 17.

The editor window's title bar contains a title bar icon (e.g., a ball). The title (e.g., [File name]-Recording Editor) may be indented from the icon by, for example, 3 pixels. On the title bars for all other windows, the title may be indented differently, for example, by 5 pixels. The title text may be in 12-point Microsoft Sans Serif, faux bold. To move a window, a user can drag the window by its title bar.

TABLE 17

| Command | Function |
| --- | --- |
| Open command | Opens the application. |
| Send To submenu | Displays a submenu of destinations to which a user can transfer the application. The contents of the system's Send To folder determines the commands that appear on the submenu. |
| Cut command | Marks the application for moving and places the application on the Clipboard. |
| Copy command | Marks the application for copying and places the application on the Clipboard. |
| Create Shortcut command | Creates a shortcut icon for the application. |
| Delete command | Deletes the application. |
| Rename command | Lets a user edit the application's file name. |
| Properties command | Displays the Properties dialog box for the application. |

In some embodiments, to display the window shortcut menu for a window, a user can do one or more of the following:

Point to the application icon on the window's title bar, if present.

Click the window's title bar using the secondary mouse button.

Press Alt+Spacebar.

In some embodiments, the window shortcut menu contains one or more of the following commands:

Restore

Move

Size

Minimize

Maximize

Close Alt+F4

Table 18 provides detailed information about the commands in the window shortcut menu in some embodiments.

TABLE 18

| Command | Keyboard Shortcut | Function |
| --- | --- | --- |
| Restore | | Restores the window to its former size and position; if a user formerly chose Maximize, toggles the Restore button to the Maximize button, and disables the Restore command and makes the Maximize command available on the window shortcut menu. If a user formerly chose Minimize, toggles the button to the Minimize button, and disables the Restore command and enables the Minimize command on the window shortcut menu. |
| Move | | Changes the pointer to a four-way arrow, allowing the user to drag the window. |
| Size | | Changes the pointer to a four-way arrow, allowing the user to resize the window by dragging either a border of the window frame or the size grip. |
| Minimize | | Removes the window from the screen and changes its button on the taskbar to an up state, disables the Minimize command on the shortcut menu for the window's taskbar button, and enables the Restore command on the window shortcut menu. |
| Maximize | | Displays the window with the maximum width allowed by the user's screen, toggles the button to the Restore button, and disables the Maximize command and enables the Restore command on the window shortcut menu. |
| Close | Alt + F4 | Closes the window. |

In some embodiments, one or more of the following buttons may reside in the title bar: Minimize/Restore button—Clicking the Minimize button has the same effect as choosing Minimize on the window shortcut menu. Clicking the Minimize button removes the window from the screen, changes its button on the taskbar to an up state, and disables the Minimize command and enables the Restore command on the shortcut menu for the window's taskbar button. To restore the window to its former size and position, a user can click the window's taskbar button, which changes the button to a down state, choose Restore on the shortcut menu for the window's taskbar button, or press Alt+Tab or Shift+Alt+Tab.

Maximize/Restore button—Clicking the Maximize button has the same effect as choosing Maximize on the window shortcut menu. Clicking the Maximize button typically displays a window with the maximum width and height allowed by a user's screen, toggles the button to the Restore button, and disables the Maximize command and enables the Restore command on the window shortcut menu. Clicking the Restore button has the same effect as choosing Restore on the window shortcut menu. Clicking the Restore button restores a window to its former size and position, toggles the button to the Maximize button, and disables the Restore command and enables the Maximize command on the window shortcut menu.

Close button—Clicking the Close button has the same effect as choosing the Close command on the window shortcut menu or pressing its keyboard shortcut, Alt+F4. Clicking the Close button closes the window.

In some embodiments, the vertical scroll bar scrolls up or down, allowing a user to view a part of the recorded image that is not currently visible in the editor window viewer. The vertical scroll bar appears dimmed when the height of the contents of the editor window viewer does not exceed the size of the window. The vertical scroll bar is available when the height of the contents of the editor window viewer exceeds the size of the window. In some embodiments, the vertical scroll bar includes one or more of the following controls:

Scroll box—Scrolls continuously up or down.

Scroll bar shaft—Scrolls the equivalent of the height of the window minus 0.25 inch. Pointing to the scroll bar shaft and holding down the mouse button causes scrolling to auto-repeat, resulting in continuous scrolling in the appropriate direction.

Clicking above the scroll box scrolls up.

Clicking below the scroll box scrolls down.

Scroll arrows—Scroll in increments of 0.25 inch. Dimmed when the contents of the window cannot be scrolled any further in a given direction. Pointing to a scroll arrow and holding down the mouse button causes scrolling to auto-repeat, resulting in continuous scrolling in the direction of the arrow.

Clicking the upward-pointing scroll arrow scrolls up.

Clicking the downward-pointing scroll arrow scrolls down.

In some embodiments, the horizontal scroll bar scrolls left or right, allowing a user to view a part of the recorded image that is not currently visible in the editor window viewer. The horizontal scroll bar appears dimmed when the width of the contents of the editor window viewer does not exceed the size of the window. The horizontal scroll bar is available when the width of the contents of the editor window viewer exceeds the size of the window. In some embodiments, the horizontal scroll bar includes one or more of the following controls:

Scroll box—Scrolls continuously left or right.

Scroll bar shaft—Scrolls the equivalent of the width of the window minus 0.25 inch. Pointing to the scroll bar shaft and holding down the mouse button causes scrolling to auto-repeat, resulting in continuous scrolling in the appropriate direction.

Clicking to the right of the scroll box scrolls to the right.

Clicking to the left of the scroll box scrolls to the left.

Scroll arrows—Scroll in small increments, as appropriate to the content. Dimmed when the contents of the window cannot be scrolled any further in a given direction. Pointing to a scroll arrow and holding down the mouse button causes scrolling to auto-repeat, resulting in continuous scrolling in the direction of the arrow.

Clicking the left-pointing scroll arrow scrolls left.

Clicking the right-pointing scroll arrow scrolls right.

In some embodiments, a user can drag a border of a window's frame to resize the window. The pointer changes to a double-headed arrow (e.g., pointing left and right) when a user moves the pointer over the left or right border of the window frame, or pointing up and down when a user moves the pointer over the top or bottom border.

In some embodiments, a user can drag the size grip in the lower-right corner of the window to resize the window. The pointer generally changes to a diagonal double-headed arrow when a user moves the pointer over the size grip.

In some embodiments, dialog boxes may be modeless or modal. A gray background color may be used for dialog boxes. The title of a dialog box is indented by 5 pixels, and title capitalization is used for the title. A user can drag a dialog box by its title bar. The title text may be in 12-point Microsoft Sans Serif, faux bold.

In some embodiments, to display the shortcut menu for a dialog box, a user can do either of the following:
  Click its title bar using the secondary mouse button.
  Press Alt+Spacebar.

In some embodiments, the shortcut menu for a modeless dialog box contains one or more of the following commands:
  Restore
  Move
  Minimize Close Alt+F4

In some embodiments, the shortcut menu for a modal dialog box contains one or more of the following commands:
  Move
  Close Alt+F4

Table 19 provides detailed information about the commands in the shortcut menu in some embodiments.

TABLE 19

| Command | Keyboard Shortcut | Function |
| --- | --- | --- |
| Restore | | Restores the dialog box to its former size and position, toggles the Restore button to the Minimize button, and disables the Restore command and enables the Minimize command on the shortcut menu. |
| Move | | Changes the pointer to a four-way arrow, allowing the user to drag the dialog box. |
| Minimize | | Minimizes the dialog box, and places the dialog box at the lower-left corner of the corresponding editor window, or to the immediate right of any other minimized windows or dialog boxes; toggles the Minimize button to the Restore button, and disables the Minimize command and enables the Restore command on the shortcut menu. |
| Close | Alt + F4 | Closes the dialog box. |

In some embodiments, one or more of the following buttons may reside in the title bar for a dialog box:
  Minimize/Restore button—A modeless dialog box has a Minimize/Restore button. Clicking the Minimize button has the same effect as choosing Minimize on the shortcut menu. Clicking the Minimize button minimizes the dialog box and places the dialog box at the lower-left corner of the corresponding editor window, or to the immediate right of any other minimized windows or dialog boxes; toggles the Minimize button to the Restore button; and disables the Minimize command and enables the Restore command on the shortcut menu. To restore the dialog box to its former size and position, a user can click the Restore button, choose Restore on the shortcut menu, or press Alt+Tab or Shift+Alt+Tab.
  Close button—Every dialog box has a Close button on its title bar. Clicking the Close button has the same effect as choosing the Close command on the shortcut menu or pressing its keyboard shortcut, Alt+F4. Clicking the Close button closes the dialog box.

In some embodiments, instructional text is provided. The instruction text may be left aligned and indented from the left border of the dialog box by 17 pixels. The top of the first line of instructional text is 17 pixels below the title bar. The longest line of the instructional text is a minimum of 17 pixels from the right border of the dialog box. Paragraphs of instructional text are separated by 15 pixels from the baseline of the first paragraph to the top of the next paragraph. The baseline of the last line of instructional text is separated from the topmost label or control by 18 pixels. Instructional text is in 11-point Arial. If there is no instructional text in a dialog box, the topmost label or control is 18 pixels below the title bar. Control labels are in 12-point Arial.

In some embodiments, labels for text boxes, spin boxes, and drop-down lists are vertically centered with and approximately 12 pixels to the left of the box or list. These controls are vertically separated from one another by 8 pixels. The vertical distance between the baseline of one box label and the next box below is 13 pixels. List box labels are left aligned with and 7 pixels above the list box, measuring from the baseline of the text. Check box labels are indented by 8 pixels; option button labels, by 6 pixels.

In some embodiments, to move the input focus to a box or other control, a user can either click the control or use its access key to navigate to the control directly, or press Tab or Shift+Tab to select the next or previous control, respectively. An access key has the same effect as clicking a control or button.

In some embodiments, tabbing moves the input focus from the upper-left corner to the lower-right corner. Within a single group of controls, this pattern is followed (e.g., left to right, then top to bottom). This pattern is followed to move to the next group of controls and, finally, to the command buttons in the lower-right corner of the dialog box.

A user can press Tab to move the input focus to the option button that is currently selected in a group of option buttons, then press Down Arrow or Up Arrow to select a different option button in the group. A user can press Tab to move the input focus to the first item in a list box, then press Down Arrow or Up Arrow to select a different item in the list.

In some embodiments, a control's appearance changes to indicate that the control has the input focus, for example:
  An empty text box contains a blinking insertion point.
  A text box that contains a value, a drop-down list box, or the first item in a list box appears highlighted.
  There is a dotted line around the label of a tab, button, check box, or option button.

When a user presses Tab to navigate to a combination control such as a spin box, combo box, or drop-down combo box, the input focus moves to the text box in the combination control. In a combo box or drop-down combo box, the user can then press Down Arrow or Up Arrow to select another item in the list.

If a list box has the input focus and a user presses the access key for a button that modifies the content of the list box, the input focus is returned to the list box.

In some embodiments, group boxes enclose subsets of related controls. Group box labels are in 12-point Arial. The group box border to the left of a group box label is 9 pixels in width. The spacing before and after a group box label is 4 pixels. A label for a group box at the top of a dialog box is 18 pixels below the title bar. Generally, group boxes are indented from both the left and right borders of a dialog box by 17 pixels, and are 17 pixels above the buttons at the bottom of the dialog box.

The spacing between group boxes and the controls they contain can vary between dialog boxes, according to the constraints of the contents of a group box, but remains consistent within a dialog box. The spacing between group boxes in a dialog box conforms to the spacing between the buttons, and other controls or the borders as closely as possible. The vertical spacing between a text box, spin box, or drop-down list, and the top or bottom of a group box is 10 pixels. A group box may contain a subgroup. A subgroup label is 14 pixels below the control above.

In some embodiments, when there are more options than can fit in a dialog box, tabbed pages group subsets of related controls. The front most tab is 8 pixels below the title bar; the other tabs, 10 pixels. A tabbed page is indented from both the left and right borders of a dialog box by 7 pixels. The tabbed page is also 7 pixels above the buttons at the bottom of a dialog box. The tabs may be the same width, unless, for example, there is one tab with a label that is much longer than those for the other tabs. Tab labels are in 12-point Arial. There are 6 pixels between the dotted outline that indicates the tab is selected, and the tab label, on the left and right; 10 between the label and the edge of the tab.

The top label or control on a tabbed page is 13 pixels below the top of the page. A group box is a consistent number of pixels within the border of a tabbed page.

In some embodiments, dialog boxes have OK and Cancel buttons. Clicking OK completes the action that a user initiated, closes the dialog box, and returns the user to the window that was previously active. Clicking Cancel closes the dialog box without completing the action that a user initiated and returns the user to the window that was previously active.

In some embodiments, a user can press Enter to activate the default button in a dialog box, which is usually the OK button, unless the action that the Enter button completes may destroy a user's data. In the latter case, the Cancel button is the default button and the OK button requires an access key. When the Cancel button is not the default button, the user can press Esc to activate the Cancel button. The Cancel button is 17 pixels from the right border of the dialog box. The OK button is 10 pixels to the left of the Cancel button. Both buttons are 17 pixels from the bottom border of the dialog box.

In some embodiments, a dialog box may also contain other buttons which are 17 pixels from the bottom border of the dialog box, and either
  10 pixels to the left of the OK button or its equivalent; or
  if the button may destroy a user's data,
    left aligned—17 pixels from the left border of the dialog box;
  centered in the intervening space between other controls or buttons.

Buttons are sometimes grouped vertically, in the upper-right corner of a dialog box. In this case, they are 18 pixels below the title bar, 17 pixels from the right border of the dialog box, and 8 pixels apart. Buttons may also be located within a group box or elsewhere, as required. The width of a button is 74 pixels. The height of a button is 22 pixels. Button labels are in 12-point Arial.

In some embodiments, dialog boxes that contain scrolling list boxes have a size grip in the lower-right corner. A user can drag the size grip to resize the dialog box. The pointer changes to a diagonal double-headed arrow when a user moves the pointer over the size grip.

In some embodiments, message boxes are modal and may have a gray background color. A message box is displayed when an editor window is active. The title "[File name]-Recording Editor" is displayed on the title bar for a message box and may be indented by 5 pixels. A user can drag a message box by its title bar. The title text may be in 12-point Microsoft Sans Serif, faux bold. A message box may have a Close button if the message box has a Cancel button. The dimensions of a message box may be 380 pixels in width, with the length of the message text determining the height of the message box. For example, the height of a message box containing a message that consists of two lines of text is 122 pixels.

Message text is left aligned and indented from the left border of the message box by 15 pixels. The top of the first line of message text is 15 pixels below the title bar. The longest line of the message text is a minimum of 15 pixels from the right border of the message box. Paragraphs of message text are separated by 15 pixels—from the baseline of the first paragraph to the top of the next paragraph. Message text may be in 12-point Arial.

Message boxes that provide information and do not require a user to make a choice have an OK button. Clicking OK closes the message box. The OK button is a default button, and is 21 pixels below the message text, and 15 pixels from both the right and bottom borders of the message box.

If a user can choose between completing or canceling an action, a message box has OK and Cancel buttons. Usually, the OK button is a default button, unless the action that the OK button completes may destroy a user's data, in which case the Cancel button is the default button. Both buttons are 21 pixels below the message text. The Cancel button is 15 pixels from the right border of the message box. The OK button is 10 pixels to the left of the Cancel button.

A Cancel button restores the state that preceded a user's last action. Use a Stop button to interrupt a process if the application cannot restore the previous state.

If a user may decide how to continue, a message box typically has Yes and No buttons. Usually, the Yes button is a default button, unless the action that the Yes button completes may destroy a user's data, in which case the No button is the default button. Both buttons are 21 pixels below the message text and 15 pixels from the bottom border of the message box. The No button is 15 pixels from the right border of the message box. The Yes button is 10 pixels to the left of the No button.

If a user may choose either how or whether to continue, a message box has Yes, No, and Cancel buttons. Usually, the Yes button is a default button, unless the action that the Yes button completes may destroy a user's data, in which case the No or Cancel button is the default button, as appropriate. All three buttons are 21 pixels below the message text and 15 pixels from the bottom border of the message box. The Cancel button is 15 pixels from the right border of the message box. The No button is 10 pixels to the left of the Cancel button. The Yes button is 10 pixels to the left of the No button.

The width of a button may be 74 pixels, while the height of a button is 22 pixels. Button labels may be in 12-point Arial.

In some embodiments, all palettes are modeless and have a gray background color. The title of a palette is indented by 5 pixels and uses title capitalization. A user can drag a palette by its title bar. The title text may be in 11-point Microsoft Sans Serif. Every palette has a Close button on its title bar.

On a palette that contains a columnar scrolling list, the column heads are in 9-point Arial bold. The items in the list are in 9-point Arial. There are 7 pixels between each item in the list from the baseline of one item to the top of the next item. On palettes that have buttons, their labels are specific action verbs. Clicking a button initiates an action. The width of a button on a palette may be 62 pixels, while the height may be 20 pixels. On palettes, button labels may be in 9-point Arial.

Palettes that contain scrolling list boxes have a size grip in the lower-right corner. A user can drag the size grip to resize the palette. The pointer changes to a diagonal double-headed arrow when a user moves the pointer over the size grip.

In some embodiments, when a user points to Truncate on the Edit menu, then chooses Beginning, the Truncate Beginning message box is displayed, allowing the user to confirm the deletion. This message box may contain the following message:

Do you want to truncate the beginning of this recording?

This message box has Yes and No buttons. The access keys for these buttons are Y and N, respectively. No is the default button. When a user clicks Yes, editing software 202 deletes all recorded data from the beginning of the recording to the current location indicator on the timeline, without placing the recorded data on the Clipboard; the previous location of the current location indicator becomes 00:00:00 on the timeline and the current location indicator is displayed at 00:00:00 on the timeline at the left side of the window; the message box closes, and the Recording Editor or Sequence Editor again becomes the active window. When a user clicks No, no truncation occurs, the message box closes, and the Recording Editor or Sequence Editor again becomes the active window.

In some embodiments, when a user points to Truncate on the Edit menu, then chooses Ending, the Truncate Ending message box is displayed, allowing the user to confirm the deletion. This message box may contain the following message:

Do you want to truncate the ending of this recording?

This message box has Yes and No buttons. The access keys for these buttons are Y and N, respectively. No is the default button. When a user clicks Yes, the Editor deletes all recorded data from the current location indicator to the end of the recording on the timeline, without placing the recorded data on the Clipboard; the previous location of the current location indicator is displayed both at the extreme right, or end, of the timeline and in the Duration indicator, and the current location indicator is displayed at the right side of the window; the message box closes, and the Recording Editor or Sequence Editor again becomes the active window. When a user clicks No, no truncation occurs, the message box closes, and the Recording Editor or Sequence Editor again becomes the active window.

Figure 23:
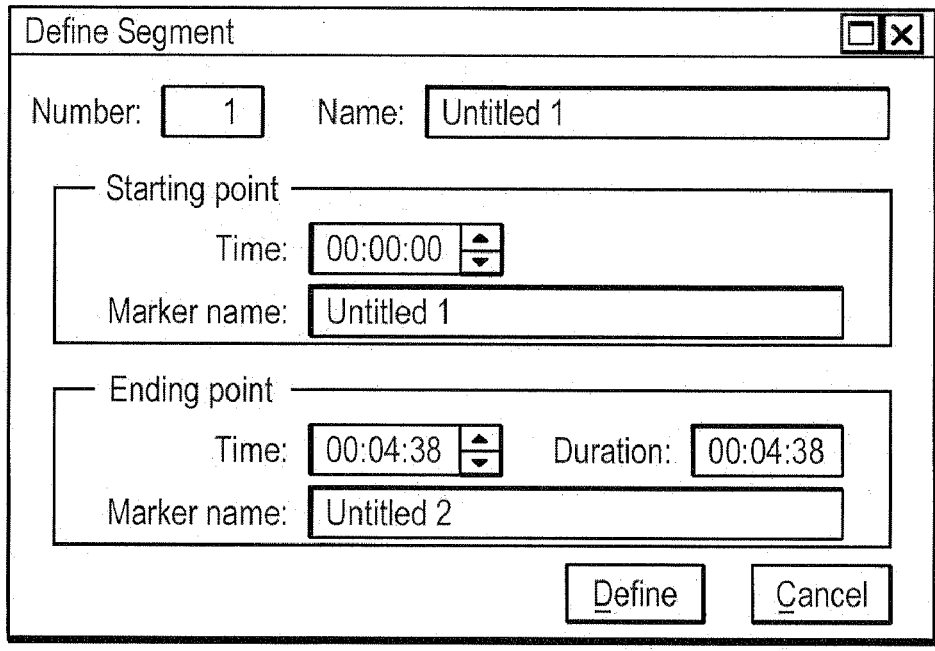
FIG. 23 illustrates a Define Segment dialog box, in accordance with some embodiments of the invention.

In some embodiments, when a user chooses Define Segment on the Edit menu or clicks the Define Segment button on the toolbar, the Define Segment dialog box is displayed, in which a user can define or edit a segment and its properties. The Define Segment dialog box is a modeless dialog box. FIG. 23 illustrates a Define Segment dialog box 2300, in accordance with some embodiments of the invention.

In some embodiments, when creating a new segment, a user can do one or more of the following:

Insert and select a starting point marker, then choose Define Segment, and specify the ending point of the segment by either:
typing its location in the Time spin box under Ending point;
while the Define Segment dialog box remains open with the insertion point in the Time spin box under Ending point, moving the current location indicator to the ending point, then inserting an ending point marker on the timeline; or
selecting the ending point marker for the preceding segment.

Insert and select both starting and ending point markers, then choose Define Segment.

Choose Define Segment without selecting any markers, and specify the starting and ending points of the segment by either:
typing their locations in the Time spin boxes under Starting point and Ending point, respectively;
while the Define Segment dialog box remains open, moving the current location indicator to the starting point on the timeline and inserting a starting point marker, then moving the current location indicator to the ending point and inserting an ending point marker; or
selecting the ending point marker for the preceding segment or the starting point marker for the subsequent segment, respectively.

If a user pastes a range of recorded data that currently has no starting point marker and/or ending point marker, editing software 202 automatically inserts a starting or ending point marker for the range, as necessary, and highlights the range. Then, the Define Segment message box is displayed, allowing the user to define the selected range of recorded data as a segment. This message box may contain the following message:

Do you want to define this range of recorded data as a segment?

This message box has Yes and No buttons. When a user clicks Yes, the message box closes; the range of recorded data becomes a segment; and the Define Segment dialog box is displayed with the default values for the segment, allowing the user to name the segment. When a user clicks No, the range of recorded data does not become a segment and the message box closes.

To edit an existing segment, a user can select the segment, then choose either Define Segment or Properties on the Edit menu. The Define Segment dialog box is a modeless dialog box and may contain one or more of the elements listed in Table 20 in some embodiments.

TABLE 20

| Label or Name | User Interface Element | Function |
| --- | --- | --- |
| Define Segment | Title in title bar | (None) |
| Minimize/ Restore (This button has no label.) | Title bar button | Clicking the Minimize button minimizes this dialog box and places the dialog box at the lower-left corner of the corresponding Recording Editor window, or to the immediate right of any other minimized window; toggles the button to the Restore button, disables the Minimize command on the window shortcut menu, and enables the Restore command on the window shortcut menu. Clicking the Restore button restores the dialog box to its former size and position, toggles the button to the Maximize button, and disables the Restore command |

TABLE 20-continued

| Label or Name | User Interface Element | Function |
| --- | --- | --- |
| | | and enables the Maximize command on the window shortcut menu. |
| Close (This button has no label.) | Title bar button | Clicking the Close button closes the Define Segment dialog box. |
| Number: | Text box label | The number of the segment on the timeline. Segments are automatically numbered in sequential order. The number in this text box is right aligned and is static text, as indicated by the gray background of the text box. A user cannot edit this number. |
| Name: | Text box label | A user can type a segment name in this text box. By default, a segment's name is Untitled [#], unless a user has previously specified a name for its starting point marker. In this case, the name of the starting point marker is displayed in this text box by default. A segment name is an alphanumeric string that can consist of up to 64 characters and include any characters. |
| Starting point | Group label | |
| Time: | Spin box label | The location of the segment's starting point on the timeline in the Recording Editor window, in hours, minutes, and seconds (00:00:00.0). A user can edit the value in the Time spin box, by doing the following: Typing a time in the proper format, [hh:mm:ss.s]- When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0. Clicking the up and down buttons - A user can select the number of hours, minutes, or seconds in the spin box, then click the up button to increase the number or click the down button to decrease the number. Once the spin box has the input focus, pressing Up Arrow or Down Arrow to increase or decrease the selected number, respectively. If a user tabs to the Time spin box, the number of hours is selected by default. Clicking the text box or the buttons also sets the input focus to the text box. Clicking a button selects the number of seconds by default. Once the text box has the input focus, the user can press Tab or Shift + Tab to select the next or previous number, respectively. If a user has inserted and selected a starting point marker on the timeline, then chosen Define Segment, the location of the starting point marker is displayed in the Time spin box under Starting point by default. If the selected starting point marker does not define the beginning of an existing segment, the user can define a new segment and its properties. If the selected starting point marker defines the beginning of an existing segment, the segment's properties appear in the dialog box and the user can edit them. If a user has chosen Define Segment with no starting or ending point marker selected, the current location constitutes the starting point of a new segment and is displayed in the Time spin box under Starting point by default. If a user has selected the ending point marker for another segment on the timeline, then chosen Define Segment, the location of that segment's ending point marker is displayed in the Time spin box under Starting point by default. To specify the starting point for a segment without inserting and selecting a starting point marker, a user can do one of the following: Type its location in the Time spin box under Starting point. While the Define Segment dialog box remains open with the insertion point in the Time spin box under Starting point: Move the Current Location indicator to the starting point on the |

TABLE 20-continued

| Label or Name | User Interface Element | Function |
|---|---|---|
| Marker name: | Text box label | timeline, then insert a starting point marker. The location of the starting point marker is displayed in the Time spin box.<br>Select the ending point marker for the preceding segment. The location of that segment's ending point marker is displayed in the Time spin box by default.<br>A user can type a marker name in this text box. By default, a marker's name is Untitled [#], unless a user has previously specified a name for the segment that the marker defines. In this case, the name of the segment is displayed in this text box by default. A marker name is an alphanumeric string that can consist of up to 64 characters and include any characters. |
| Ending point Time: | Spin box label | The location of the segment's ending point on the timeline in the Recording Editor window, in hours, minutes, and seconds (00:00:00.0). A user can edit the value in the Time spin box, by doing the following:<br>Typing a time in the proper format, [hh:mm:ss.s] -<br>When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0.<br>Clicking the up and down buttons - A user can select the number of hours, minutes, or seconds in the spin box, then click the up button to increase the number or click the down button to decrease the number.<br>Once the spin box has the input focus, pressing Up Arrow or Down Arrow to increase or decrease the selected number, respectively.<br>If a user tabs to the Time spin box, the number of hours is selected by default.<br>Clicking the text box or the buttons also sets the input focus to the text box. Clicking a button selects the number of seconds by default.<br>Once the text box has the input focus, the user can press Tab or Shift + Tab to select the next or previous number, respectively.<br>If a user has inserted and selected both a starting point marker and an ending point marker on the timeline, then chosen Define Segment, the location of the ending point marker is displayed in the Time spin box under Ending point by default.<br>If the selected ending point marker does not define the end of an existing segment, the user can define a new segment and its properties.<br>If the selected ending point marker defines the end of an existing segment, the segment's properties appear in the dialog box and the user can edit them.<br>To specify the ending point for a segment without selecting an ending point marker, a user can do one of the following:<br>Type its location in the Time spin box under Ending point.<br>While the Define Segment dialog box remains open with the insertion point in the Time spin box under Ending point:<br>Move the Current Location indicator to the ending point on the timeline, then insert an ending point marker. The location of the ending point marker is displayed in the Time spin box.<br>Select the starting point marker for the subsequent segment. The location of that segment's starting point marker is displayed in the Time spin box by default. |
| Marker name: | Text box label | A user can type a marker name in this text box. By default, a marker's name is Untitled [#], unless a user has previously specified a name for the segment that the marker defines. In this case, the name of the segment is displayed in this text box by default. A |

TABLE 20-continued

| Label or Name | User Interface Element | Function |
|---|---|---|
| | | marker name is an alphanumeric string that can consist of up to 64 characters and include any characters. |
| Duration | Text box label | The duration of the segment, in hours, minutes, and seconds (00:00:00.0). The value in this text box is static text, as indicated by the gray background of the text box. A user cannot edit this value. |
| Define | Button | Clicking Define defines the segment or sets any segment properties that a user has edited; closes the Define Segment dialog box; and the Recording Editor again becomes the active window, with the newly defined or edited segment, and its starting and ending point markers highlighted on the timeline. This button is the default button. |
| Cancel | Button | Clicking Cancel closes the Define Segment dialog box without defining a segment or setting any segment properties that a user has edited; and the Recording Editor again becomes the active window. |

In some embodiments, when a user inserts a starting point marker within an existing segment, then chooses Define Segment on the Edit menu, the marker constitutes a split point, which corresponds to the ending point for the first segment and the starting point for the second segment. A Define Segment dialog box for each segment is displayed. The default values in the Define Segment dialog box for the first segment may be as follows:

The following segment name is displayed in the Name box:
[Name of Original Segment] 1.
The location of the starting point marker for the original segment is displayed in the Time spin box under Starting point.
The location of the new starting point marker is displayed in the Time spin box under Ending point.
The marker name Untitled [#] is displayed in the Marker name text box under Ending point.

The default values in the Define Segment dialog box for the second segment may be as follows:

The following segment name is displayed in the Name box:
[Name of Original Segment] 2.
The location of the new starting point marker is displayed in the Time spin box under Starting point.
The location of the ending point marker for the original segment is displayed in the Time spin box under Ending point.

In some embodiments, to allow a user to confirm the deletion of a segment, the Delete Segment message box is displayed when a user selects a segment, then does one or more of the following:

In the Recording Editor or sequence editor window:
chooses Clear on the Edit menu; or
presses the Delete key.
In the sequence editor window, clicks Delete.
This message box may contain the following message:
Do you want to delete the segment '[Segment Name]' and the recorded data that it contains?

This message box has Yes and No buttons. The access keys for these buttons are Y and N, respectively. No is the default button. When a user clicks Yes, the Editor deletes the selected segment, without placing the selected segment on the Clipboard; the starting point of the deleted segment becomes the starting point of the subsequent segment; all subsequent segments are renumbered; the message box closes, and the Recording Editor or Sequence Editor again becomes the active window. When a user clicks No, no deletion occurs, the message box closes, and the Recording Editor or Sequence Editor again becomes the active window.

In some embodiments, when a user selects an element on the timeline or in a list, then chooses Properties on the Edit menu or clicks the Properties button on the toolbar, the appropriate Properties dialog box is displayed for the type of element selected. In the Properties dialog box, a user can specify or edit the properties of the selected element. Possible selections include segments, cue point markers, starting point markers, and ending point markers. Multiple Properties dialog boxes can be open at once. Properties dialog boxes may be modeless dialog boxes.

Figure 24:
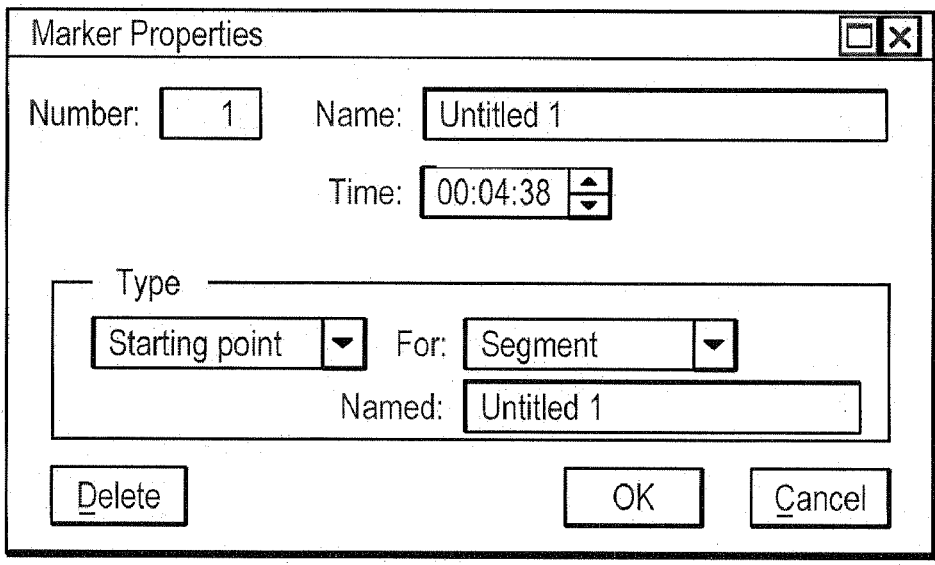
FIG. 24 illustrates a Marker Properties dialog box, in accordance with some embodiments of the invention.

In some embodiments, when a user points to Marker on the Insert menu, then chooses a command on the submenu or clicks its corresponding command on the toolbar, a Marker Properties dialog box is displayed, in which the user can specify the properties of the new marker. FIG. 24 illustrates a Marker Properties dialog box 2400, in accordance with some embodiments of the invention. The Marker Properties dialog box that is displayed depends on whether the user chose Cue Point, Starting Point, or Ending Point on the submenu.

In some embodiments, when a user selects a marker, then chooses Properties on the Edit menu or clicks the Properties button on the toolbar, a Marker Properties dialog box is displayed, in which a user can edit the marker's properties. Also, a user can double-click a marker to display its Marker Properties dialog box. The Marker Properties dialog box that is displayed depends on whether the user selected a cue point marker, starting point marker, or ending point marker.

In some embodiments, the Marker Properties dialog boxes for the various types of markers include one or more of the following:

Cue Point Marker Properties dialog box.
Starting Point Marker Properties dialog box.
Ending Point Marker Properties dialog box.
The Marker Properties dialog box is a modeless dialog box and contains one or more of the elements listed in Table 21 in some embodiments.

TABLE 21

| Label or Name | User Interface Element | Function |
| --- | --- | --- |
| Marker Properties | Title in title bar | (None) |
| Minimize/ Restore (This button has no label.) | Title bar button | Clicking the Minimize button minimizes this dialog box and places the dialog box at the lower-left corner of the corresponding Recording Editor window, or to the immediate right of any other minimized window; toggles the button to the button, disables the Minimize command on the window shortcut menu, and enables the Restore command on the window shortcut menu. Clicking the Restore button restores the dialog box to its former size and position, toggles the button to the Maximize button, and disables the Restore command and enables the Maximize command on the window shortcut menu. |
| Close (This button has no label.) | Title bar button | Clicking the Close button closes the Marker Properties dialog box. |
| Number: | Text box label | The number of a marker of a given type on the timeline. Markers of the following types are automatically numbered in sequential order: cue point markers pairs of starting and ending point markers that define a range of time pairs of starting and ending point markers that define a segment Pairs of starting and ending point markers share the same number. A segment number applies to the starting and ending point markers for a segment. The number in this text box is static text, as indicated by the gray background of the text box. A user cannot edit this number. |
| Name: | Text box label | A user can type a marker name in this text box. By default, a marker's name is Untitled [#]. However, in the case of a starting or ending point marker, if a user has previously specified a name for any segment that the marker defines, the name of the segment is displayed in this text box by default. A marker name is an alphanumeric string that can consist of up to 64 characters and include any characters. |
| Time: | Spin box label | The location of the marker on a timeline, in hours, minutes, and seconds (00:00:00.0). By default, the location at which a user has inserted a marker on the timeline. A user can edit the value in the Time spin box, by doing the following: typing a time in the proper format, [hh:mm:ss.s] - When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0. Clicking the up and down buttons - A user can select the number of hours, minutes, or seconds in the spin box, then click the up button to increase the number or click the down button to decrease the number. Once the spin box has the input focus, pressing Up Arrow or Down Arrow to increase or decrease the selected number, respectively. If a user tabs to the Time spin box, the number of hours is selected by default. Clicking the text box or the buttons also sets the input focus to the text box. Clicking a button selects the number of seconds by default. Once the text box has the input focus, a user can press Tab or Shift + Tab to select the next or previous number, respectively. |
| Type | Group and drop-down list label | A marker's type—by default, the type of marker that a user chose on the Insert menu. A user can change a marker's type. |
| Cue point | Option | A marker that indicates a point on the timeline that a user wants to autolocate. |
| Starting point | Option | A marker that indicates the beginning of a range of time or segment. |
| Ending point | Option | A marker that indicates the ending of a range of time or segment. |

TABLE 21-continued

| Label or Name | User Interface Element | Function |
| --- | --- | --- |
| For: | Drop-down list label | If a marker is a starting or ending point marker, indicates whether the marker defines a range of time or a segment. A user can change the setting in the for drop-down list.<br>This drop-down list appears dimmed in the Cue Point Marker Properties dialog box. |
| Range | Option | A range of time on the timeline. If a user has not defined a segment for which the marker is a starting or ending point, the value Range is selected by default. |
| Segment | Option | A user-defined segment on the timeline. If a user has defined a segment for which the marker is a starting or ending point, the value Segment is selected by default. |
| Named: | Text box | If a starting or ending point marker defines a segment, the name of the segment is displayed in the Segment name text box by default. If a user types a new segment name, the name also is displayed in the Define Segment and Segment Properties dialog boxes.<br>This text box is dimmed in the following cases:<br>in the Cue Point Marker Properties dialog box<br>in the Starting Point Marker Properties dialog box if the starting point marker defines a range<br>in the Ending Point Marker Properties dialog box if the ending point marker defines a range. |
| Delete | Button | Clicking Delete deletes an existing marker from the timeline; renumbers any subsequent markers of the same type on the timeline; closes the Marker Properties dialog box; and the Recording Editor or Frame View window again becomes the active window.<br>When a user is inserting a new marker on the timeline and the Marker Properties dialog box is displayed to allow the user to specify its properties, the Delete button is dimmed. |
| OK | Button | Clicking OK inserts the marker on the timeline or sets any marker properties that a user has edited; renumbers any subsequent markers of the same type on the timeline; closes the Marker Properties dialog box; and the Recording Editor or Frame View window again becomes the active window, with the newly inserted or edited marker highlighted on the timeline. This button is the default button. |
| Cancel | Button | Clicking Cancel closes the Marker Properties dialog box without inserting a marker or setting any marker properties that a user has edited; and the Recording Editor or Frame View window again becomes the active window. |

In some embodiments, when a user points to Marker on the Insert menu, then chooses Cue Point or clicks the Insert Cue Point button on the toolbar, the Cue Point Marker Properties dialog box is displayed, in which the user can specify the properties of the new cue point marker.

In some embodiments, when a user selects a cue point marker, then chooses Properties on the Edit menu or clicks the Properties button on the toolbar, the Cue Point Marker Properties dialog box is displayed, in which a user can edit the marker's properties. Also, a user can double-click a cue point marker to display the Cue Point Marker Properties dialog box.

In some embodiments, if a user cuts or deletes a segment or range of recorded data from the timeline, and no previously defined segment or range immediately precedes or follows the segment or range being deleted (e.g., there is no ending or starting point marker at the location at which the deletion occurred), editing software 202 automatically inserts a cue point marker at that location. The Cue Point Marker Properties dialog box is displayed, allowing the user to name or cancel the insertion of the marker.

In some embodiments, when a user points to Marker on the Insert menu, then chooses Starting Point or clicks the Insert Starting Point button on the toolbar, the Starting Point Marker Properties dialog box is displayed, in which the user can specify the properties of the new starting point marker.

In some embodiments, when a user selects a starting point marker, then chooses Properties on the Edit menu or clicks the Properties button on the toolbar, the Starting Point Marker Properties dialog box is displayed, in which a user can edit the marker's properties. Also, a user can double-click a starting point marker to display the Starting Point Marker Properties dialog box.

In some embodiments, if a user cuts or deletes the ending point marker for a segment or range of recorded data, or changes its marker type, a message box is displayed that provides the user the opportunity to edit the corresponding starting point marker. If a user clicks Edit in the message box, the Starting Point Marker Properties dialog box is displayed, in which the user can rename the marker or change its type.

In some embodiments, when a user points to Marker on the Insert menu, then chooses Ending Point or clicks the Insert Ending Point button on the toolbar, the Ending Point Marker Properties dialog box is displayed, in which the user can specify the properties of the new ending point marker.

In some embodiments, when a user selects an ending point marker, then chooses Properties on the Edit menu or clicks the Properties button on the toolbar, the Ending Point Marker Properties dialog box is displayed, in which a user can edit the marker's properties. Also, a user can double-click an ending point marker to display the Ending Point Marker Properties dialog box.

In some embodiments, if a user cuts or deletes the starting point marker for a segment or range of recorded data, or changes its marker type, a message box is displayed that provides the user the opportunity to edit the corresponding ending point marker. If a user clicks Edit in the message box, the Ending Point Marker Properties dialog box is displayed, in which the user can rename the marker or change its type.

In some embodiments, to display the Segment Properties dialog box, in which a user can edit an existing segment's properties, the user can do one or more of the following:

Select the segment on the timeline in the editor window, then choose Properties on the Edit menu or click the Properties button on the toolbar.

Ctrl+double-click a starting-point or ending-point marker for a segment.

Select the segment in the list in the sequence editor window, then choose Properties on the Edit menu or click the Properties button on the toolbar.

Double-click the colored portion of the upper part of the timeline that demarcates the segment in the editor window.

Double-click the segment in the list in the sequence editor window.

Figure 25:
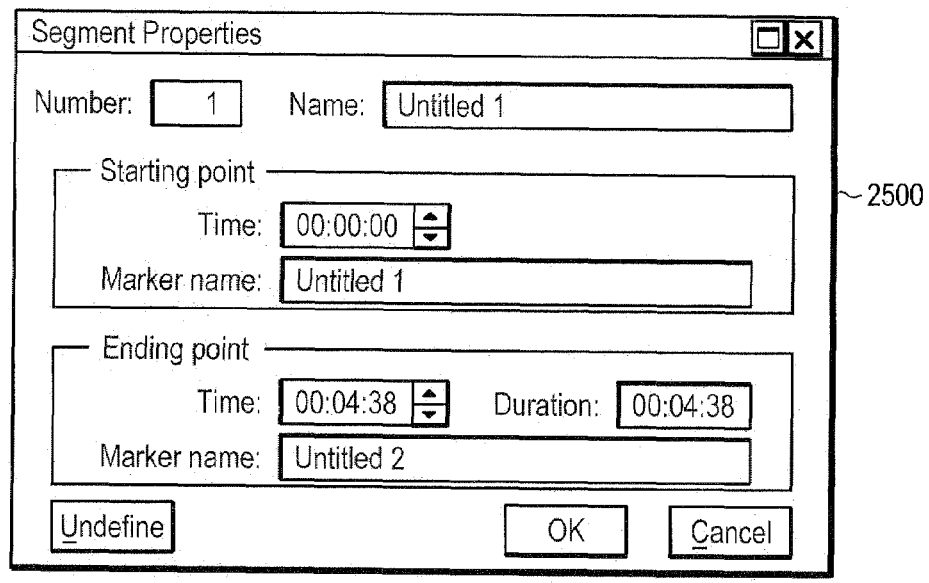
FIG. 25 illustrates a Segment Properties dialog box, in accordance with some embodiments of the invention.

FIG. 25 illustrates a Segment Properties dialog box 2500, in accordance with some embodiments of the invention. If more than one segment is selected, a Segment Properties dialog box may be displayed by editing software 202 for each selected segment.

In some embodiments, in the editor window, a user can select a segment either by clicking the colored portion of the upper part of the timeline that demarcates a segment, or by Ctrl-clicking the segment's starting point marker or ending point marker.

In some embodiments, if a user inserts or pastes another entire recording into the recording being edited, the recording automatically becomes a segment, and the Segment Properties dialog box is displayed, with the name of the recording in the Name box, and its starting and ending points in the Starting point and Ending point text boxes, respectively.

In some embodiments, to edit an existing segment, a user can select the segment and choose either Properties or Define Segment on the Edit menu.

In some embodiments, the Segment Properties dialog box is a modeless dialog box and contains one or more of the elements listed in Table 22 in some embodiments.

TABLE 22

| Label or Name | User Interface Element | Function |
| --- | --- | --- |
| Segment Properties | Title in title bar | (None) |
| Minimize/ Restore (This button has left no label.) | Title bar button | Clicking the Minimize button minimizes this dialog box and places the dialog box at the lower- corner of the corresponding Recording Editor window, or to the immediate right of any other minimized window; toggles the button to the Restore button, disables the Minimize command on the window shortcut menu, and enables the Restore command on the window shortcut menu. Clicking the Restore button restores the dialog box to its former size and position, toggles the button to the Maximize button, and disables the Restore command and enables the Maximize command on the window shortcut menu. |
| Close (This button has no label.) | Title bar button | Clicking the Close button closes the Segment Properties dialog box. |
| Number: | Text box label | The number of the segment on the timeline. Segments are automatically numbered in sequential order. The number in this text box is static text, as indicated by the gray background of the text box. A user cannot edit this number. |
| Name: | Text box label | The segment's name. By default, a segment's name is Untitled [#] unless a user has previously specified a name for its starting point marker. In this case, the name of the starting point marker is displayed in this text box by default. A segment name is an alphanumeric string that can consist of up to 64 characters and include any characters. |
| Starting point | Group label | |
| Time: | Spin box label | The location of the segment's starting point on the timeline in the Recording Editor window, in hours, minutes, and seconds (00:00:00.0). A user can edit the value in the Time spin box, by doing the following: typing a time in the proper format, [hh:mm:ss.s] - When a user clicks the number of hours, minutes, or seconds in the text box, that number is selected, not the entire contents of the text box. The colons are not selectable. A user can type a number of hours between |

TABLE 22-continued

| Label or Name | User Interface Element | Function |
|---|---|---|
| | | 00 and 99, a number of minutes between 00 and 60, and a number of seconds between 00.0 and 60.0. Clicking the up and down buttons - A user can select the number of hours, minutes, or seconds in the spin box, then click the up button to increase the number or click the down button to decrease the number. Once the spin box has the input focus, pressing Up Arrow or Down Arrow to increase or decrease the selected number, respectively. If a user tabs to the Time spin box, the number of hours is selected by default. Clicking the text box or the buttons also sets the input focus to the text box. Clicking a button selects the number of seconds by default. Once the text box has the input focus, the user can press Tab or Shift + Tab to select the next or previous number, respectively. If the selected starting point marker defines the beginning of an existing segment, the segment's properties appear in the dialog box and the user can edit them. |
| Marker name: | Text box label | The marker's name. By default, a marker's name is Untitled [#], unless a user has previously specified a name for the segment that the marker defines. In this case, the name of the segment is displayed in this text box by default. A marker name is an alphanumeric string that can consist of up to 64 characters and include any characters. |
| Ending point | Group label | |
| Time: | Spin box label | The location of the segment's ending point on the timeline in the Recording Editor window, in hours, minutes, and seconds (00:00:00.0). A user can edit the value in the Time spin box, by doing the following: typing a time in the proper format, [hh:mm:ss.s] - When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0. Clicking the up and down buttons - A user can select the number of hours, minutes, or seconds in the spin box, then click the up button to increase the number or click the down button to decrease the number. Once the spin box has the input focus, pressing Up Arrow or Down Arrow to increase or decrease the selected number, respectively. If a user tabs to the Time spin box, the number of hours is selected by default. Clicking the text box or the buttons also sets the input focus to the text box. Clicking a button selects the number of seconds by default. Once the text box has the input focus, the user can press Tab or Shift + Tab to select the next or previous number, respectively. If the selected ending point marker defines the end of an existing segment, the segment's properties appear in the dialog box and the user can edit them. |
| Marker name: | Text box label | The marker's name. By default, a marker's name is Untitled [#], unless a user has previously specified a name for the segment that the marker defines. In this case, the name of the segment is displayed in this text box by default. A marker name is an alphanumeric string that can consist of up to 64 characters and include any characters. |
| Duration | Text box label | The duration of the segment, in hours, minutes, and seconds (00:00:00.0). The value in this text box is static text, as indicated by the gray background of the text box. A user cannot edit this value. |

TABLE 22-continued

| Label or Name | User Interface Element | Function |
|---|---|---|
| Undefine | Button | Clicking Undefine makes the segment an unnamed range of recorded data; renumbers any subsequent segments on the timeline; closes the Segment Properties dialog box; and the Recording Editor window again becomes the active window. This command deletes neither the data that the segment contains nor the starting and ending point markers that define its boundaries. |
| OK | Button | Clicking OK sets any segment properties that a user has edited; closes the Segment Properties dialog box; and the Recording Editor again becomes the active window, with the edited segment, and its starting and ending point markers highlighted on the timeline. This is the default button. |
| Cancel | Button | Clicking Cancel closes the Segment Properties dialog box without setting any segment properties that a user has edited; and the Recording Editor again becomes the active window |

Figure 26:
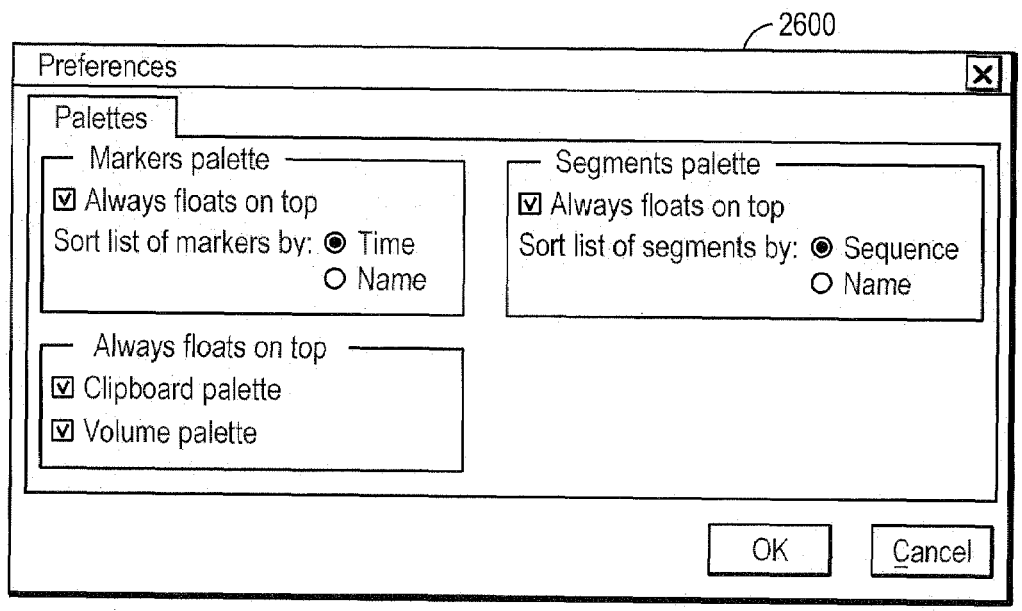
FIG. 26 illustrates a Preferences dialog box, in accordance with some embodiments of the invention.

In some embodiments, when a user chooses Preferences on the Edit menu, the Preferences dialog box is displayed, in which a user can define the preferences for Recording Editor. FIG. 26 illustrates a Preferences dialog box 2600, in accordance with some embodiments of the invention. In some embodiments, the Preferences dialog box contains one or more of the elements listed in Table 23 in some embodiments.

TABLE 23

| Label or Name | User Interface Element | Function |
|---|---|---|
| Preferences | Title in title bar | (None) |
| Close (This button has no label.) | Title bar button | Clicking the Close button closes the Preferences dialog box. |
| Palettes | Tab label | The P in Palettes is not underlined. |
| Markers palette | Group label | |
| Always floats on top | Check box label | When this check box is selected, the Markers palette always floats on top of the Recording Editor window and the Frame View window. This check box is selected by default. |
| Sort list of markers by: | Subgroup label | Sets the default sorting order for the list of markers on the Markers palette. |
| Time | Option button | Sorts the markers according to the time at which they occur. This option button is selected by default. Name Option button Sorts the markers by name. This option button is selected by default. |
| Segments palette | Group label | |
| Always floats on top | Check box label | When this check box is selected, the Segments palette always floats on top of the Recording Editor window. This check box is selected by default. |
| Sort list of segments by: | Subgroup label | Sets the default sorting order for the list of segments on the Segments palette. |
| Sequence | Option button | Sorts the segments according to the order in which they occur on the timeline. This option button is selected by default. |
| Name | Option button | Sorts the segments by name. This option button is selected by default. |
| Always floats on top | Group label | |
| Clipboard palette | Check box label | When this check box is selected, the Clipboard palette always floats on top of the Recording Editor, Sequence Editor, and Frame View windows. This check box is selected by default. |
| Volume palette | Check box label | When this check box is selected, the Clipboard palette always floats on top of the Recording Editor, Sequence Editor, and Frame View windows. This check box is selected by default. |
| OK | Button | Clicking OK sets any preferences that a user has edited; closes the Preferences dialog box; and the Recording Editor again becomes the active window. This is the default button. |
| Cancel | Button | Clicking Cancel closes the Preferences dialog box without setting any preferences that a user has edited; |

TABLE 23-continued

| Label or Name | User Interface Element | Function |
| --- | --- | --- |
| | | and the Recording Editor again becomes the active window. |

In some embodiments, when a user chooses Recording on the Insert menu, the Insert Recording dialog box is displayed, in which the user can select an existing recording (e.g., a recorded file or .wrf file) to be inserted either:

at the current location on a timeline; or before the selected segment, or if more than one segment is selected, the first selected segment, in the list of segments in the sequence editor window.

In some embodiments, the Insert Recording dialog box is an Open dialog box, with the title Insert Recording. When a recorded file is selected in the list, an Insert button replaces the Open button and is the default button. In some embodiments, when a user clicks Insert, the inserted recording is displayed either at the current location, or preceding any snapshot or range of time that is currently selected on the timeline. The current location indicator is displayed at the end of the inserted recording. If the original recording contained no segments, the inserted recording may constitute a new segment. If the inserted recording constitutes a new segment, the Segment Properties dialog box is displayed by editing software 202, allowing the user to specify the segment's properties. The file name of the inserted recording is displayed in the Name box, by default, however, the user can specify a different segment name.

If the inserted recording contains segments, the following message may be displayed in a message box:

The recording that the user inserted consists of one or more previously defined segments. To rename one of these segments, select the segment, then choose Properties on the Edit menu.

In some embodiments, when a user chooses Segments on the View menu or clicks the Segments Palette button on the toolbar, the Segments palette is displayed. FIG. 27 illustrates a Segments palette 2700, in accordance with some embodiments of the invention. In some embodiments, the Time and Number columns are logically one and sort together.

The Segments floating palette contains a list of the segments in a recording. Initially, no segment is selected in the list. When a user selects a segment in the list, the segment appears highlighted within a dotted rectangle.

To navigate to a segment (e.g., autolocate a segment's starting point marker) on the timeline in the editor window, a user can either Click a segment in the list to select the segment, then click Go To; or Double-click a segment in the list.

Doing so moves the current location indicator to the left of the first snapshot in the selected segment. Using the Segments palette to navigate to a segment is analogous to choosing an item on the Segment submenu, or to selecting a segment in the sequence editor window, then choosing Set Current Location on the Controls menu or clicking the Set Current Location button on the toolbar.

In some embodiments, the Segments palette contains one or more of the elements listed in Table 24.

TABLE 24

| Label or Name | User Interface Element | Function |
| --- | --- | --- |
| Segments | Title in title bar | (None) |
| Close (This button has no label.) | Title bar button | Clicking the Close button closes the Segments palette. |
| (None) | Scrolling list of segments | This list consists of three columns of information: Time, Number, and Name. A user can sort the list by the information in any column. All column heads are left aligned, leaving room for the sort triangle to the right. The list has a vertical scroll bar. |
| Time | Column head | This column indicates the starting time of each segment on the timeline, in hours, minutes, and seconds (00:00:00.0). The values in the Time column are centered. Sorts the segments in the list by time, according to the order in which they occur on the timeline. By default, the list is sorted by time in ascending order, and a downward-pointing triangle is displayed to the right of the column head. If the list is currently sorted by number or name, a user can click this column head to sort the segments by time. |
| Number | Column head | This column indicates the number of each segment on the timeline. The values in the Number column are centered. Sorts the segments in the list by number, according to the order in which they occur on the timeline, initially in ascending order. If the list is currently sorted by time or name, a user can click this column head to sort the segments by number. Then, a |

TABLE 24-continued

| Label or Name | User Interface Element | Function |
|---|---|---|
| | | downward-pointing triangle is displayed to the right of the column head. |
| Name | Column head | This column indicates the name of each segment in the recording. The values in the Name column are left aligned. Sorts the segments in the list by name, in alphabetical order, initially in ascending order. If the list is currently sorted by time or number, a user can click this column head to sort the segments by name. Then, a downward-pointing triangle is displayed to the right of the column head. If the Name column is not sufficiently wide to display an entire name, an ellipsis indicates that the name is truncated. A user can drag the size grip to see the entire name. |
| Go To | Button | Moves the Current Location indicator to the left of the first snapshot in the selected segment. The underlined letter G is the access key for this button. |
| Play | Button | Moves the Current Location indicator to the left of the first snapshot in the selected segment, then starts playback. The underlined letter P is the access key for this button. |
| (None) | Size grip | Allows a user to resize the Segments palette. Dragging the size grip affects the width of the Name column. |

In some embodiments, when a column in the segment list is currently sorted in ascending order and the column head has a downward-pointing arrow to its right, if a user clicks the column head, the downward-pointing arrow changes to an upward-pointing arrow and the column is sorted in descending order.

In some embodiments, if the Segments palette is already open and a user opens the frame view or sequence editor window, the palette becomes inactive and the current contents of the palette appears dimmed. Once the frame view or sequence editor windows are closed, if the user has edited the segment list, the list in the Segments palette is updated, then the contents of the palette again becomes available.

In some embodiments, when a user chooses Markers on the View menu or clicks the Markers Palette button on the toolbar, the Markers palette is displayed. FIG. 28 illustrates a Markers palette 2800, in accordance with some embodiments of the invention. The Markers floating palette contains a list of the markers on a timeline. Initially, no segment is selected in the list, but when a user selects a segment in the list, the segment appears highlighted within a dotted rectangle.

To navigate to a marker (e.g., autolocate a marker) on the timeline in the editor window, a user can either Click a marker in the list to select the segment, then click Go To; or double-click a marker in the list.

Navigating to the marker moves the current location indicator to the location of the marker on the timeline and selects the marker.

In some embodiments, the Markers palette contains one or more elements listed in Table 25.

TABLE 25

| Label or Name | User Interface Element | Function |
|---|---|---|
| Markers | Title in title bar | (None) |
| Close (This button has no label.) | Title bar button | Clicking the Close button closes the Markers palette. |
| (None) | Scrolling list of markers | This list consists of three columns of information: Type, Time, and Name. A user can sort the list by the information in any column. All column heads are left aligned, leaving room for the sort triangle to the right. The list has a vertical scroll bar. |
| Type | Column head | This column contains a marker symbol that indicates the type of each marker in the list. The starting point markers and cue point markers are left aligned; the ending point markers, right aligned. Sorts the markers in the list according to their type - initially, in the following order: starting point markers ending point markers cue point markers If the list is currently sorted by time or name, a user can click this column head to sort the markers by type. |

TABLE 25-continued

| Label or Name | User Interface Element | Function |
| --- | --- | --- |
| Time | Column head | Then, a downward-pointing triangle is displayed to the right of the column head. This column indicates the time at which each marker resides on the timeline, in hours, minutes, and seconds (00:00:00.0). The values in the Time column are centered. Sorts the markers in the list by time, according to the order in which they occur on the timeline. By default, the list is sorted by time in ascending order, and a downward-pointing triangle is displayed to the right of the column head. If the list is currently sorted by name or type, a user can click this column head to sort the segments by time. |
| Name | Column head | This column indicates the name of each marker on the timeline. The values in the Name column are left aligned. Sorts the markers in the list in alphabetical order, initially in ascending order. If the list is currently sorted by time or type, a user can click this column head to sort the markers by name. Then, a downward-pointing triangle is displayed to the right of the column head. If the Name column is not sufficiently wide to display an entire name, an ellipsis indicates that the name is truncated. A user can drag the size grip to see the entire name. |
| Go To | Button | Moves the Current Location indicator to the marker that is selected in the list and selects the marker on the timeline. The underlined letter G is the access key for this button. |
| (None) | Size grip | Allows a user to resize the Markers palette. Dragging the size grip affects the width of the Name column. |

In some embodiments, when a column in the marker list is currently sorted in ascending order and the column head has a downward-pointing triangle to its right, if a user clicks the column head, the downward-pointing triangle changes to an upward-pointing triangle and the column is sorted in descending order.

In some embodiments, pairs of markers (e.g., starting point and ending point markers) have the same number and name, but a different type; and when the list is sorted by name, the pairs of markers appear consecutively in the list.

In some embodiments, if the Markers palette is already open and a user opens the frame view or sequence editor window, the palette becomes inactive and the contents of the palette appears dimmed. Once the frame view or sequence editor windows are closed, the contents of the palette again becomes available.

In some embodiments, when a user chooses Clipboard on the View menu, the Clipboard palette is displayed, which is a floating palette and displays the current contents of the Clipboard, if any. FIG. 29 illustrates a Clipboard palette 2900, in accordance with some embodiments of the invention.

In some embodiments, the Clipboard palette contains one or more of the elements listed in Table 26.

TABLE 26

| Label or Name | User Interface Element | Function |
| --- | --- | --- |
| Clipboard | Title in title bar | (None) |
| Close (This button has no label.) | Title bar button | Clicking the Close button closes the Clipboard palette. |
| (None) | Toolbar | The toolbar on the Clipboard palette includes consists of the following three buttons. |
| Copy (ToolTip) | Button | Copies the current selection and places the selection on the Clipboard. This button appears dimmed when there is no current selection. |
| Paste (ToolTip) | Button | Inserts the contents of the Clipboard, as follows: if a range of recorded data, a segment, or an entire recording, it inserts the recorded data, segment, or recording either at the current location or preceding any recorded data that is currently selected on a timeline; or the segment or recording before the current selection in the segment list in the Sequence Editor window; if a marker, at the current location on the timeline or replaces any marker that is currently selected on the |

TABLE 26-continued

| Label or Name | User Interface Element | Function |
|---|---|---|
| | | timeline; or if text, at the insertion point that is currently selected or replaces any selected text. This button appears dimmed when either the Clipboard is empty, the type of data on the Clipboard cannot be pasted at the current location or preceding the current selection, or during playback or when playback is paused. |
| Clear Clipboard (ToolTip) | Button | Clears the current contents of the Clipboard. This button appears dimmed when the Clipboard is empty. |
| Clipboard Contents (ToolTip) (This text box consists of a symbol that represents the type of data may not have a label. The window title Clipboard may serve as its label. Because this text box has no label, the text box has no access key, but the text box has the input focus by default.) | Text box | The Clipboard Contents text box displays the current contents of the Clipboard. In most cases, the value in the Clipboard Contents text box on the Clipboard and one of the following: a label for a range of recorded data the name of a segment, recording, or marker an alphanumeric string followed by an ellipsis. |

In some embodiments, Table 27 shows how the various data types that may reside on the Clipboard may be represented in the Clipboard Contents text box. In some embodiments, the data type may be represented by a symbol.

TABLE 27

| Data Type | Label, Name, or Text |
|---|---|
| Range of recorded data | Range of recorded data: [##:##.##.#–##:##.##.#] |
| Segment | [Segment Name] |
| Recording, or recorded file | [File Name].wrf |
| Cue Point Marker | [Cue Point Marker Name] |
| Starting point marker | [Starting Point Marker Name] |
| Ending point marker | [Ending Point Marker Name] |
| Text | [Text on Clipboard...] |

Figure 30:
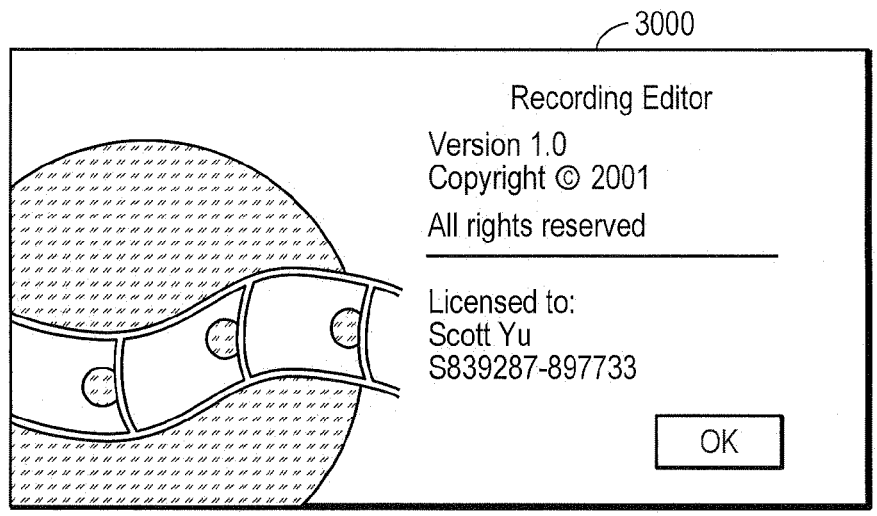
FIG. 30 illustrates a About Recording Editor box, in accordance with some embodiments of the invention.

In some embodiments, when a user chooses About Recording Editor on the Help menu, the About Recording Editor box is displayed and allows a user to view information about Recording Editor, including its version number and the user's serial number. FIG. 30 illustrates a About Recording Editor box 3000, in accordance with some embodiments of the invention. A splash screen may include all elements of the About Recording Editor box 3000, without the OK button. The About box and splash screen may not have a title bar and may have a white background.

In some embodiments, the About Recording Editor box and splash screen may contain one or more of the elements listed in Table 28.

TABLE 28

| Content or Label | User Interface Element | Function |
|---|---|---|
| Recording Editor 1.0 | Product name | In a large font size. Don't integrate the product name with the graphic. It may change. |
| Version 1.[#] | Version number | This indicates the actual "point" version number. In a small font size. |
| This product is licensed to: [User Name] [Company Name] Ser. No.: [Ser. No.] | Label and static text box | The static text box contains the user information and serial number. In a small font size. |
| Copyright © 2001 [owner name] All rights reserved. | Copyright information | In a small font size. |
| OK | Button | Clicking OK closes the About Recording Editor box. This button is present in the |

TABLE 28-continued

| Content or Label | User Interface Element | Function |
| --- | --- | --- |
| | | About box, not the splash screen, and is a default button. |

In some embodiments, if a user types a name that exceeds 64 characters in length in a Name, Marker name, or Segment name text box, then clicks outside or tabs out of the text box, the following message may be displayed:

The name can consist of a maximum of 64 characters. Please try again.

This message box has an OK button. Clicking OK returns the user to the dialog box. The contents of the Name text box appears highlighted, allowing the user to type a different name in the text box or edit the name.

In some embodiments, in a Time spin box, a user can type a number of hours between 00 and 99, a number of minutes between 00 and 60, and a number of seconds between 00.0 and 60.0. If a user tries to type a time that does not conform to the format in a Time spin box, the following message may be displayed in a message box:

You must specify the time in hours, minutes, and seconds, using this format: hh:mm:Ss The above message may appear in one or more of the following cases:

if a user types an invalid number of hours, then tabs to or clicks the number of minutes or seconds;

if a user types an invalid number of minutes, then tabs to or clicks the number of hours or seconds;

if a user types an invalid number of seconds, then tabs to or clicks the number of hours or minutes;

if a user types an invalid number of seconds, then tabs out of the Time spin box;

if a user types an invalid number of hours, then Shift-tabs out of the Time spin box; or if a user types an invalid number of hours, minutes, or seconds, then clicks outside the Time spin box.

The message box displaying the above message has an OK button. Clicking OK returns the user to the dialog box. The number that the user was editing appears highlighted, allowing the user to type a different number.

Figure 31:
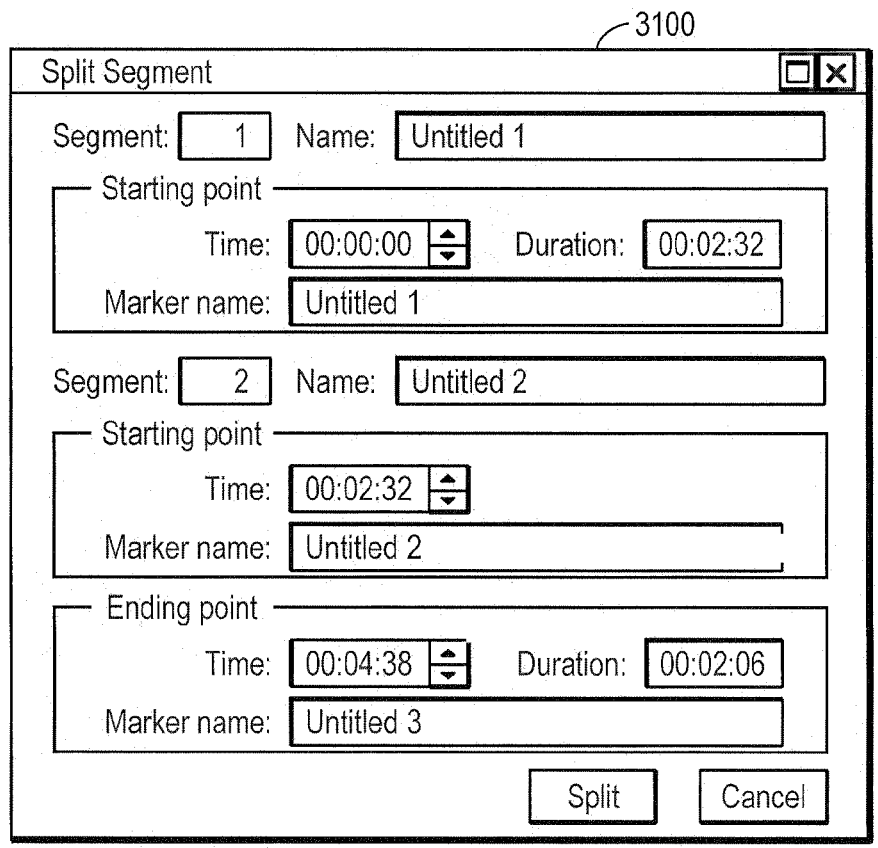
FIG. 31 illustrates a Split Segment dialog box, in accordance with some embodiments of the invention.

In some embodiments, when a user chooses Split Segment on the Edit menu, the Split Segment dialog box is displayed, in which a user can define a split point for a segment. FIG. 31 illustrates a Split Segment dialog box 3100, in accordance with some embodiments of the invention. The Split Segment dialog box 3100 may be a modeless dialog box.

When defining a split point, a user may do one or more of the following:

Insert and select a starting point marker, then choose Split Segment; or

Choose Split Segment without selecting a marker, and specify the starting point of the second segment by either typing its location in the Time spin box under Starting point; or while the Split Segment dialog box remains open, move the current location indicator to the split point on the timeline and insert a starting point marker.

In some embodiments, the Split Segment dialog box is a modeless dialog box and contains the elements listed in Table 29.

TABLE 29

| Label or Name | User Interface Element | Function |
| --- | --- | --- |
| Split Segment | Title in title bar | (None) |
| Minimize/ Restore (This button has no label.) | Title bar button | Clicking the Minimize button minimizes this dialog box and places it at the lower-left corner of the corresponding Recording Editor window, or to the immediate right of any other minimized window; toggles the button to the Restore button, disables the Minimize command on the window shortcut menu, and enables the Restore command on the window shortcut menu. Clicking the Restore button restores the dialog box to its former size and position, toggles the button to the Maximize button, and disables the Restore command and enables the Maximize command on the window shortcut menu. |
| Close (This button has no label.) | Title bar button | Clicking the Close button closes the Define Segment dialog box. |
| Segment: | Text box label | The number of the new segment that precedes the split point on the timeline. Segments are automatically numbered in sequential order. The number in this text box is right aligned and is static text, as indicated by the gray background of the text box. A user cannot edit this number. |
| Name: | Text box label | The name of the original segment is displayed in this text box by default - that is, [Name of Original Segment] 1. A user can type a new segment name in this text box. A segment name is an alphanumeric string that can consist of up to 64 characters and include any characters. |

TABLE 29-continued

| Label or Name | User Interface Element | Function |
| --- | --- | --- |
| Starting point Time: | Group label Spin box label | The location of the first segment's starting point on the timeline in the Recording Editor window, in hours, minutes, and seconds (00:00:00.0). A user can edit the value in the Time spin box, by doing the following: typing a time in the proper format, [hh:mm:ss.s] - When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0. clicking the up and down buttons - A user can select the number of hours, minutes, or seconds in the spin box, then click the up button to increase the number or click the down button to decrease the number. once the spin box has the input focus, pressing Up Arrow or Down Arrow to increase or decrease the selected number, respectively. If a user tabs to the Time spin box, the number of hours is selected by default. Clicking the text box or the buttons also sets the input focus to the text box. Clicking a button selects the number of seconds by default. Once the text box has the input focus, the user can press Tab or Shift+Tab to select the next or previous number, respectively. |
| Marker name: | Text box label | A user can type or edit a marker name in this text box. By default, a marker's name is Untitled [#], unless a user has previously specified a name for the segment that it defines. In this case, the name of the segment is displayed in this text box by default. A marker name is an alphanumeric string that can consist of up to 64 characters and include any characters. |
| Duration: | Text box label | The duration of the first segment, in hours, minutes, and seconds (00:00:00.0). The value in this text box is static text, as indicated by the gray background of the text box. A user cannot edit this value. |
| Segment: | Text box label | The number of the new segment that follows the split point on the timeline. Segments are automatically numbered in sequential order. The number in this text box is right aligned and is static text, as indicated by the gray background of the text box. A user cannot edit this number. |
| Name: | Text box label | The name of the original segment is displayed in this text box by default, followed by the number 2 - that is [Name of Original Segment] 2. A user can type a new segment name in this text box. A segment name is an alphanumeric string that can consist of up to 64 characters and include any characters. |
| Starting point Time: | Group label Spin box label | The location of the second segment's starting point on the timeline in the Recording Editor window, in hours, minutes, and seconds (00:00:00.0). A user can edit the value in the Time spin box, by doing the following: typing a time in the proper format, [hh:mm:ss.s] - When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0. clicking the up and down buttons - A user can select the number of hours, minutes, or seconds in the spin box, then click the up button to increase the number or click the down button to decrease the number. once the spin box has the input focus, pressing Up Arrow or Down Arrow to increase or decrease the selected number, respectively. If a user tabs to the Time spin box, the number of hours is selected by default. Clicking the text box or the buttons also sets the input focus to the text box. Clicking a button selects the number of seconds by default. Once the text box has the input focus, the user can |

TABLE 29-continued

| Label or Name | User Interface Element | Function |
| --- | --- | --- |
| | | press Tab or Shift+Tab to select the next or previous number, respectively.<br>If a user has inserted and selected a starting point marker on the timeline, then chosen Split Segment, the location of the starting point marker for the second segment is displayed in the Time spin box under Starting point by default.<br>If a user has chosen Split Segment with no starting point marker selected, the current location constitutes the starting point of the second segment and is displayed in the Time spin box under Starting point by default.<br>To specify the starting point for the second segment without inserting and selecting a starting point marker, a user can do one of the following:<br>Type its location in the Time spin box under Starting point.<br>While the Split Segment dialog box remains open with the insertion point in the Time spin box under Starting point, a user can move the Current Location indicator to the starting point of the second segment on the timeline, then insert a starting point marker. The location of the starting point marker is displayed in the Time spin box. |
| Marker name: | Text box label | A user can type or edit a marker name in this text box. By default, a marker's name is Untitled [#], unless a user has previously specified a name for it.<br>A marker name is an alphanumeric string that can consist of up to 64 characters and include any characters. |
| Ending point | Group label | |
| Time: | Spin box label | The location of the original segment's ending point becomes the second segment's ending point on the timeline in the Recording Editor window, in hours, minutes, and seconds (00:00:00.0). A user can edit the value in the Time spin box, by doing the following: typing a time in the proper format, [hh:mm:ss.s] - When a user clicks the number of hours, minutes, or seconds in the text box, that number is selected, not the entire contents of the text box. The colons are not selectable. A user can type a number of hours between 00 and 99, a number of minutes between 00 and 60, and a number of seconds between 00.0 and 60.0.<br>Clicking the up and down buttons - A user can select the number of hours, minutes, or seconds in the spin box, then click the up button to increase the number or click the down button to decrease the number.<br>Once the spin box has the input focus, pressing Up Arrow or Down Arrow to increase or decrease the selected number, respectively.<br>If a user tabs to the Time spin box, the number of hours is selected by default.<br>Clicking the text box or the buttons also sets the input focus to the text box. Clicking a button selects the number of seconds by default.<br>Once the text box has the input focus, the user can press Tab or Shift+Tab to select the next or previous number, respectively.<br>To specify a different ending point for the second segment, a user can do one of the following:<br>Type its location in the Time spin box under Ending point. |
| Marker name: | Text box label | A user can type or edit a marker name in this text box. By default, a marker's name is Untitled [#], unless a user has previously specified a name for it. A marker name is an alphanumeric string that can consist of up to 64 characters and include any characters. |
| Duration: | Text box label | The duration of the second segment, in hours, minutes, and seconds (00:00:00.0).<br>The value in this text box is static text, as indicated by the gray background of the text box. A user cannot edit this value. |
| Split | Button | Clicking Split defines the split point, and splits the original segment into two segments; closes the Split Segment dialog box; and the Recording Editor again becomes the active window, with the two new |

TABLE 29-continued

| Label or Name | User Interface Element | Function |
|---|---|---|
| | | segments, and their starting and ending point markers highlighted on the timeline. This button is the default button. |
| Cancel | Button | Clicking Cancel closes the Split Segment dialog box without splitting a segment; and the Recording Editor again becomes the active window. |

Figure 32:
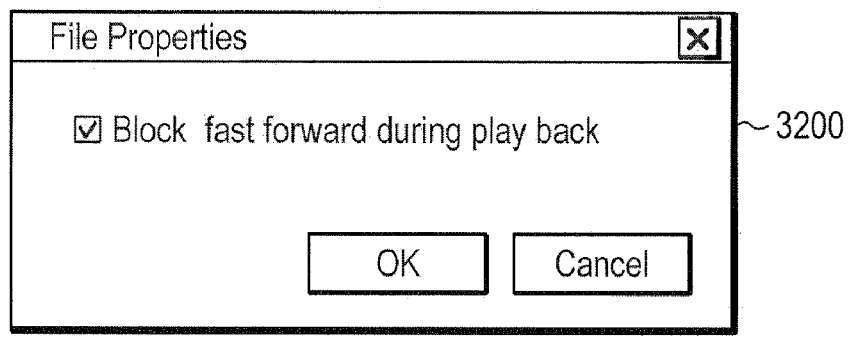
FIG. 32 illustrates a File Properties dialog box, in accordance with some embodiments of the invention.

In some embodiments, when a user inserts a starting point marker within an existing segment, then chooses Split Segment on the Edit menu, the marker constitutes a split point, which corresponds to the ending point for the first of two new segments and the starting point for the second segment. In the Split Segment dialog box that is displayed, the default values for the first segment may be as follows:
  The number of the original segment is displayed in the Segment box.
  The name of the original segment is displayed in the Name box, as follows: [Name of Original Segment] 1
  The location of the starting point marker for the original segment is displayed in the Time spin box under Starting point.
  The first segment's ending point corresponds to the starting point of the second segment.
In some embodiments, the default values in the Split Segment dialog box for the second segment may be as follows:
  The number of the original segment plus one is displayed in the Segment box, and the numbers of any subsequent segments increment by one.
  The following segment name is displayed in the Name box: [Name of Original Segment] 2
  The location of the new starting point marker is displayed in the Time spin box under Starting point.
  The location of the ending point marker for the original segment is displayed in the Time spin box under Ending point.
In some embodiments, when a user chooses File Properties on the Edit menu, the File Properties dialog box is displayed, allowing a user to specify the properties of a recorded file. FIG. 32 illustrates a File Properties dialog box 3200, in accordance with some embodiments of the invention. The File Properties dialog box 3200 may be a modal dialog box.

In some embodiments, the File Properties dialog box contains the elements listed in Table 30:

TABLE 30

| Label or Name | User Interface Element | Function |
|---|---|---|
| File Properties | Title in title bar | (None) |
| Close (This button has no label.) | Title bar button | Clicking the Close button closes the File Properties dialog box. |
| Block fast forward during playback | Check box label | Modifies the properties of a recorded file, preventing a user from fast forwarding during playback. This check box is deselected by default. |
| OK | Button | Clicking OK sets file properties that a user has modified; closes the File Properties dialog box; and the Recording Editor again becomes the active window. This is the default button. |
| Cancel | Button | Clicking Cancel closes the File Properties dialog box without setting any file properties that a user has modified; and the Recording Editor again becomes the active window. |

In some embodiments, to play back a recording, a user can do one or more of the following:
  Choose Start Playback on the Controls menu.
  Click Play on the toolbar.
  Choose Start Playback on a Timeline pop-up menu, the Marker pop-up menu, or the Segment List pop-up menu.
  Click Play on the Segments palette.
In some embodiments, when the Recording Editor or frame view window is the active window, playback starts at the-current location on the timeline. When the sequence editor window is active or the user clicks Play on the Segments palette, playback may start at the beginning of a selected segment or, if more than one segment is currently selected, at the beginning of the first selected segment.
In some embodiments, to pause playback, a user can do one or more of the following:
  Choose Pause Playback on the Controls menu.
  Click Pause on the toolbar.
  Choose Pause Playback on a Timeline pop-up menu, the Marker pop-up menu, or the Segment List pop-up menu.
  When either the Recording Editor, frame view, or sequence editor window is the active window, playback may pause at the current location on the timeline.
In some embodiments, to resume playback, a user can do one or more of the following:
  Choose Resume Playback on the Controls menu.
  Click Resume on the toolbar.
  Choose Resume Playback on a Timeline pop-up menu, the Marker pop-up menu, or the Segment List pop-up menu.
  When either the Recording Editor, frame view, or sequence editor window is the active window, playback resumes at the current location on the timeline.

In some embodiments, to stop playback, a user can do any of the following:
  Choose Stop Playback on the Controls menu.
  Click Stop on the toolbar.
  Choose Stop Playback on a Timeline pop-up menu, the Marker pop-up menu, or the Segment List pop-up menu.
  When either the Recording Editor, frame view, or sequence editor window is the active window, playback may stop at the current location on the timeline.

In some embodiments, to stop playback automatically, a user can do one or more of the following:
  Choose Start Playback when either
    a snapshot, range of recorded data, or segment is currently selected in the editor window;
    a frame or range of recorded data is currently selected in the frame view window; or
    one or more segments are currently selected in the sequence editor window.
  Playback may stop automatically once the entire selection plays back.
  Choose Start Playback in the frame view window.
  Playback may stop automatically when the end of the frames on the timeline is reached in the frame view window.

In some embodiments, to set the playback volume, a user can perform one or more of the following techniques:
  Technique 1:
    1. Choose Volume on the Controls menu or Click Volume on the toolbar. The Volume palette is displayed.
    2. Adjust volume slider 1108 or press Ctrl+Up Arrow to increase the volume or Ctrl+Down Arrow to reduce the volume.
  Technique 2:
    1. Click the downward-pointing arrow to the right of volume button 1104. Volume drop-down control panel 1106 is displayed.
    2. Adjust volume slider 1108 or press Ctrl+Up Arrow to increase the volume or Ctrl+Down Arrow to reduce the volume.

In some embodiments, to mute audio during playback, a user can do one or more of the following:
  Choose Mute on the Controls menu.
  Click Mute on the toolbar.

In some embodiments, to unmute audio during playback, a user can do one or more of the following:
  Choose Unmute on the Controls menu.
  Click Unmute on the toolbar.
  Drag the Volume slider 1108 to increase the volume.
  Press Ctrl+Up Arrow to increase the volume.

The user may perform various editing tasks, including:
  navigating and cueing a recording;
  defining markers;
  editing an existing recording;
  working with recorded segments; and
  working with titles.

In some embodiments, a user can use the timeline and current location indicator in either the editor window or the frame view window. To quickly navigate to another part of a recording's timeline, without changing the current location or selection, a user can use the scroll bar to do the following:
  Drag the timeline scroll box to the right or left.
  Click the scroll bar shaft to scroll a distance that is equivalent to the width of the content area of the window minus 0.25 inch. Pointing to the scroll bar shaft and holding down the mouse button causes scrolling to auto-repeat, resulting in continuous scrolling in the appropriate direction.
  Click to the right of the scroll box to scroll to the right.
  Click to the left of the scroll box to scroll to the left.
  Click a scroll arrow to scroll by a snapshot. Pointing to a scroll arrow and holding down the mouse button causes scrolling to auto-repeat, resulting in continuous scrolling in the direction of the arrow.
  Click the right-pointing scroll arrow to scroll to the right.
  Click the left-pointing scroll arrow to scroll to the left.

In some embodiments, to move the current location to a distant location on the timeline, a user can perform one or more of the following techniques:
  Technique 1: To move the current location to a selected frame, snapshot, or range of time:
    1. Scroll to a location on the timeline.
    2. Click a frame or snapshot to select the frame or snapshot or select a range of time.
    3. On the Controls menu, choose Set Current Location.
  The current location indicator automatically moves to the left boundary of the selected frame or snapshot, or range of time.
  Technique 2: To move the current location to a selected marker:
    1. Scroll to a marker on the timeline.
    2. Click the marker to select the marker.
    3. On the Controls menu, choose Set Current Location.
  The current location indicator automatically moves to the location of the selected marker.

In some embodiments, to navigate a recording's timeline and set a new current location, or to finely adjust the current location, a user can do one or more of the following:
  Drag the current location indicator forward or backward.
  If no marker is currently selected, press the Right Arrow or Left Arrow key to move the current location indicator continuously along the timeline.
  If no marker is currently selected, hold down the Ctrl key while pressing the Right Arrow or Left Arrow key to move the current location indicator by a distance that is equivalent to the width of the window.
  Press the Home key to move the current location indicator to the beginning of the timeline.
  Press the End key to move the current location indicator to the end of the timeline.

In some embodiments, to cue a recording during playback or when playback is paused, a user can do one or more of the following:
  During playback, when playback reaches the precise location on the timeline at which the user wants to cue the recording, on the Controls menu, choose Stop Playback (F3) or Pause Playback (F4).
  On the Controls menu, choose Reverse Cueing (F6) and/or Forward Cueing (F7), then at the precise location on the timeline at which the user wants to cue the recording, choose Stop Playback (F3) or Pause Playback (F4).
  In the frame view window:
    Drag the current location indicator.
    If no marker is currently selected, press the Right Arrow or Left Arrow key to move the current location indicator continuously along the timeline.
    If no marker is currently selected, hold down the Ctrl key while pressing the Right Arrow or Left Arrow key to move the current location indicator by a distance that is approximately equivalent to the width of the window.
    Press the Home key to move the current location indicator to the beginning of the timeline.
    Press the End key to move the current location indicator to the end of the timeline.

During playback or editing, the current location indicator shows the current location on the timeline. The Elapsed Time indicator tracks the movement of the current location indicator.

In some embodiments, when a user moves the current location indicator to the right or left boundary of the timeline (e.g., by dragging the current location indicator, or pressing Right Arrow, Left Arrow, Ctrl+Right Arrow, or Ctrl+Left Arrow) the timeline automatically scrolls in the direction in which the user is dragging.

In some embodiments, the transport controls on the toolbar allow a user to play, pause/resume, stop, rewind, go to the previous or next segment in, or fast forward a recording. The transport commands on the Controls menu allow a user to start, stop, pause, or resume playback; use reverse or forward cueing to find a specific location in a recording; go to the previous or next segment; or rewind to the beginning or fast forward to the end of a recording. The transport controls and commands affect the movement of the current location indicator. When a transport control or command continuously moves the current location indicator on the timeline, the current location indicator remains on screen, when moving forward on the timeline, near the right side of the window; when backward, near the left side of the window.

In some embodiments, when a user clicks Next Segment on the Controls menu or toolbar to autolocate the beginning of the next segment on the timeline, the current location indicator jumps directly to the starting point marker for that segment, which is displayed near the left side of the window.

In some embodiments, when a user clicks Previous Segment on the Controls menu or toolbar to autolocate the beginning of the next segment on the timeline, the current location indicator jumps directly to the starting point marker for that segment, which is displayed near the left side of the window.

In some embodiments, when a user clicks Rewind to Beginning on the Controls menu or toolbar, the current location indicator jumps directly to the beginning of the recording (00:00:00), which is displayed at the left side of the window.

In some embodiments, when a user clicks Fast Forward to End on the Controls menu or toolbar, the current location indicator jumps directly to the end of the recording, which is displayed at the right side of the window.

In some embodiments, to cue a recording, a user can perform one or more of the following techniques:

Technique 1: A user can do the following during playback:
1. On the Controls menu, choose Start Playback (F3), or on the toolbar, click Play.
2. Monitor playback for the precise location on the timeline at which the user wants to cue the recording.
3. On the Controls menu, choose Stop Playback (F3) or Pause Playback (F4), or on the toolbar, click Stop or Pause.

Technique 2: A user can use the Reverse Cueing (F6) and/or Forward Cueing (F7) commands on the Controls menu either during playback or when playback is paused. A user can do the following:
1. On the Controls menu, choose Start Playback (F3), or on the toolbar, click Play.
2. Monitor playback for the precise location on the timeline at which the user wants to begin cueing the recording or, on the Controls menu, choose Pause Playback (F4), or on the toolbar, click Pause, to pause playback at the precise location on the timeline at which the user wants to begin cueing the recording.
3. As playback continues or when playback is paused, on the Controls menu, choose Reverse Cueing (F6) or Forward Cueing (F7) to cue the recording.

By alternately pressing F6 and F7, the user can rock the current location back and forth to place the current location indicator at the precise location on the timeline at which the user wants to cue the recording.
4. On the Controls menu, choose Stop Playback (F3) or Pause Playback (F4), or on the toolbar, click Stop or Pause at the precise location at which the user wants to cue the recording.
5. On the Insert menu, point to Marker, then choose Cue Point to insert a cue point marker.

In some embodiments, on the Markers palette, a user can either click a marker in the list of markers to select the marker, then click Go To, or double-click a marker in the list to jump directly to, or autolocate, the corresponding marker on the timeline.

In some embodiments, when a user autolocates a cue point marker or starting point marker on the timeline, the current location indicator jumps directly to the marker, which is displayed near the left side of the window. [1281] In some embodiments, when a user autolocates an ending point marker on the timeline, the current location indicator jumps directly to the marker, which is displayed near the right side of the window.

In some embodiments, a user can jump directly to, or autolocate, a segment's starting point marker on the timeline, without starting playback, by doing one or more of the following:
on the Controls menu, pointing to Segment, then clicking the name of the segment on the submenu;
on the Controls menu or toolbar, clicking Previous Segment or Next Segment;
on the Segments palette, clicking a segment in the list of segments to select the segment, then clicking Go To, or double-clicking a segment in the list;
in the sequence editor window, selecting a segment in the list, then clicking Set Current Location on the Controls menu or toolbar; or
in the sequence editor window, selecting a segment in the list, then pointing to Go To on the Segment List pop-up menu, and choosing Set Current Location or Segment on the submenu.

When a user autolocates a specific segment on the timeline, the current location indicator may jump directly to the starting point marker for that segment, which is displayed near the left side of the window.

In some embodiments, in the sequence editor window, a user can autolocate a segment's starting point marker on the timeline in the editor window and start playback, by selecting a segment in the segment list, then choosing Start Playback on the Segment List pop-up menu.

In some embodiments, a user can insert a marker, adjust its position, or specify its properties, in either the editor window or the frame view window.

If a user inserts a marker during playback, playback may stop automatically. In some embodiments, to insert a marker on the timeline, a user can do the following:
1. Scroll to a location on the timeline.
2. Click a frame or snapshot to select the frame or snapshot or select a range of time on the timeline.
3. On the Insert menu, point to Marker, then choose Cue Point, Starting Point, or Ending Point on the submenu.

A marker is displayed at the left boundary of the selected frame or snapshot, or to the left of the selected range of time, then the Cue Point Marker Properties, Starting Point Marker Properties, or Ending Point Marker Properties dialog box is displayed, as appropriate.

4. Specify the properties of the marker.

In some embodiments, to insert a marker more precisely, a user can do the following:
1. Move the current location indicator to a location on the timeline.
2. On the Insert menu, point to Marker, then choose Cue Point, Starting Point, or Ending Point on the submenu.

A marker is displayed at the left boundary of the selected frame, snapshot, or range of time, then the Cue Point Marker Properties, Starting Point Marker Properties, or Ending Point Marker Properties dialog box is displayed, as appropriate.

3. Specify the properties of the marker.

Once a marker has been inserted, a user can then autolocate the marker.

In some embodiments, to adjust a marker's position, a user can do one or more of the following:

Drag the marker on the timeline.

Press the Right Arrow or Left Arrow key to move a selected marker continuously along the timeline.

Hold down the Ctrl key while pressing the Right Arrow or Left Arrow key to move a selected marker by a distance that is approximately equivalent to the width of the window.

In some embodiments, in the frame view window, when playback is paused, a user can adjust a marker's position while monitoring audio. Additionally, when a user moves a marker to the right or left boundary of the timeline (e.g., by dragging the marker, or pressing Right Arrow, Left Arrow, Ctrl+Right Arrow, or Ctrl+Left Arrow), the timeline may automatically scroll in the direction in which the user is dragging. Moreover, when a user moves a marker, the frame corresponding to the current location on the timeline may remain in the editor window viewer. When dragging a marker, a user can view snapshots representing recorded images on the timeline and hear audio, but recorded images do not appear in the editor window viewer until the user releases the marker being dragged. Then, the frame corresponding to the current location on the timeline is displayed, for example, after a slight delay of three to five seconds.

Also, a user can specify a different location on the timeline for a selected cue point marker, starting point marker, or ending point marker in the Cue Point Marker Properties, Starting Point Marker Properties, or Ending Point Marker Properties dialog box, respectively.

In some embodiments, when editing markers, a user can do one or more of the following:

Cut a selected marker to the Clipboard to move or delete the marker.

Copy a selected marker to the Clipboard.

Paste a marker that currently resides on the Clipboard at either the current location, or the left boundary of a selected frame or snapshot, or range of time, if any.

Clear a selected marker to delete the marker.

View a marker on the Clipboard.

In some embodiments, a user can cut, but not copy or paste a cue point marker.

In some embodiments, to paste a marker on the timeline, a user can perform one or more of the following techniques:

Technique 1: To paste a marker to the left of a selected frame, snapshot, or range of time on the timeline, a user can do the following:
1. Scroll to a location on the timeline.
2. Click a frame or snapshot to select the frame or snapshot or select a range of time on the timeline.
3. On the Edit menu, choose Paste.

The marker is displayed at the left boundary of the selected frame or snapshot, or to the left of the selected range of time.

Technique 2: To paste a marker more precisely, a user can do the following:
1. Move the current location indicator to a location on the timeline.
2. On the Edit menu, choose Paste.

The marker is displayed at the current location.

In some embodiments, to drag a marker to another location on the timeline, a user can do the following:
1. Scroll or go to the location of the marker on the timeline.
2. Click the marker to select the marker.
3. Drag the marker to its new location.

The image of the marker is displayed as an arrow pointer. An insertion point is displayed on the upper part of the timeline and follows the movement of the pointer, indicating that the user can insert the data.

4. Release the mouse button.

The marker is displayed at the left boundary of the selected frame or snapshot, or to the left of the selected range of time.

In some embodiments, to specify the properties of a new or existing cue point marker, a user can do the following:
1. If necessary, click the cue point marker to select the cue point marker.

The silver interior of the selected marker appears highlighted, in the user's highlight color.

2. On the Edit menu, choose Properties.

The Cue Point Marker Properties dialog box is displayed. Also, a user can double-click a cue point marker to display its Cue Point Marker Properties dialog box.

In some embodiments, to specify the properties of a new or existing starting point marker, a user can do the following:
1. If necessary, click the starting point marker to select it.

The silver interior of the selected marker appears highlighted, in the user's highlight color.

2. On the Edit menu, choose Properties.

The Starting Point Properties dialog box is displayed. Also, a user can double-click a starting point marker to display its Starting Point Properties dialog box.

In some embodiments, to specify the properties of a new or existing ending point marker, a user can do the following:
1. If necessary, click the ending point marker to select it.

The silver interior of the selected marker appears highlighted, in the user's highlight color.

2. On the Edit menu, choose Properties.

The Ending Point Properties dialog box is displayed. Also, a user can double-click an ending point marker to display its Ending Point Properties dialog box.

In some embodiments, in either the editor window or the frame view window, to set the current location at another location on the timeline, a user can perform one or more of the following techniques:

Technique 1: To move the current location to a selected frame, snapshot, or range of time:
1. Scroll to a location on the timeline.
2. Click a frame or snapshot to select the frame or snapshot or select a range of time.
3. On the Controls menu, choose Set Current Location.

The current location indicator automatically moves to the left boundary of the selected frame or snapshot, or range of time.

Technique 2: To move the current location to a selected marker:
1. Scroll to a marker on the timeline.
2. Click the marker to select the marker.
3. On the Controls menu, choose Set Current Location.

The current location indicator automatically moves to the location of the selected marker.

Also, a user can do the following to change the current location:

Drag the current location indicator forward or backward on the timeline, to either set a new current location or finely adjust the current location.

Press the Right Arrow or Left Arrow key to move the current location indicator continuously along the timeline.

Hold down the Ctrl key while pressing the Right Arrow or Left Arrow key to move the current location indicator by a distance that is equivalent to the width of the window.

Press the Home key to move the current location indicator to the beginning of the timeline.

Press the End key to move the current location indicator to the end of the timeline.

On the Controls menu, choose Start Playback, Resume Playback, Reverse Cueing, Forward Cueing, Rewind to Beginning, Previous Segment, Next Segment, or Fast Forward to End.

On the toolbar, click Play, Rewind to Beginning, Previous Segment, Next Segment, or Fast Forward to End.

On the Markers palette, autolocate a marker by clicking the marker in the list, then clicking Go To, or double-clicking a marker in the list.

Autolocate a segment's starting point marker by pointing to Segment on the Controls menu, then clicking the name of the segment on the submenu, choosing Next Segment or Previous Segment on the Controls menu or toolbar, clicking a segment in the list on the Segments palette, then clicking Go To, or double-clicking a segment in the list, in the sequence editor window, selecting a segment in the list, then clicking Set Current Location on the Controls menu or toolbar, or in the sequence editor window, selecting a segment in the list, then pointing to Go To on the Segment List pop-up menu, and choosing Set Current Location or Segment on the submenu.

In some embodiments, when a user chooses a command or otherwise initiates an action, and there is currently no selection on the timeline, the command affects the current location. In some embodiments, a user can click a frame or snapshot on the timeline to select the frame or snapshot, and the frame or snapshot appears highlighted.

In some embodiments, to select a range of time on the timeline, a user can do one or more of the following:

Press the mouse button to set an anchor point, drag the mouse over the timeline, then release the mouse button to set the active end point.

Click a frame or snapshot to set an anchor point, scroll to the end of the range, then hold down the Shift key and click a frame or snapshot to set the active end point.

Click a cue point marker to select the cue point marker, scroll to another cue point marker at the end of the range, then hold down the Shift key and click the second cue point marker.

Hold down the Ctrl key and click a starting point marker or ending point marker to select a predefined range of time or a segment.

When a user selects a range of time, the selected range may appear highlighted on the lower part of the timeline.

In some embodiments, to extend the range of a selection in either direction, a user can do the following:

1. Hold down the Shift key to reset the active end point of the original selection.
2. Drag the mouse over the timeline to extend the selection.
3. Release the mouse button to set the active end point.

The extended range appears highlighted.

When a user chooses a command or otherwise initiates an action, and there is currently a selection on the timeline, the command affects the current selection.

In some embodiments, when editing recorded data on the timeline, a user can do the following:

Cut selected data to the Clipboard to move or delete the selected data.

Copy selected data from the same or a different recorded file to the Clipboard.

Paste data that currently resides on the Clipboard at the current location on the timeline, at the left boundary of any selected frame, snapshot, range of recorded data, or segment on the timeline, or in the sequence editor window, before the current selection in the segment list Clear selected data to delete the selected data.

View the data on the Clipboard.

In some embodiments, a user can copy and paste selected data from one recorded file to another.

In some embodiments, to paste recorded data on the timeline, a user can perform one or more of the following techniques:

Technique 1: To paste recorded data to the left of a selected frame or snapshot on the timeline, a user can do the following:

1. Scroll to a location on the timeline.
2. Click a snapshot to select the snapshot.
3. On the Edit menu, choose Paste.

The data that resides on the Clipboard is displayed to the left of the selected snapshot.

Technique 2: To paste recorded data at a specific location on the timeline, a user can do the following:

1. Cue the recording.
2. On the Controls menu, choose Stop Playback (F3) or Pause Playback (F4).
3. On the Insert menu, point to Marker, then choose Cue Point to insert a cue point marker.
4. On the Edit menu, choose Paste.

The data that resides on the Clipboard is displayed at the current location.

In some embodiments, to paste recorded data into the segment list in the sequence editor window, a user can do the following:

1. Select the segment before which the user wants to insert the data on the Clipboard.

The name of the selected segment appears highlighted within a dotted rectangle.

2. On the Edit menu, choose Paste.

The data that resides on the Clipboard is displayed before the current selection in the segment list.

In some embodiments, a user can drag selected data either to another location on a timeline or from one recorded file to another. A user can drag an entire recording from or to either an editor window or a sequence editor window. In the editor window, a user can drag a selected snapshot, range of recorded data, or segment to another location on the timeline. In the frame view window, a user can drag a selected frame or range of recorded data to another location on the timeline.

In some embodiments, to move selected data to another location on a timeline, a user can do the following:

1. Select the data that the user wants to move to another location on the timeline.

The data appears highlighted.

2. Drag the selected data to the destination location on the timeline.

An arrow pointer with a content box follows the user's mouse movement. On the upper part of the timeline, a one-pixel-wide, red insertion point follows the pointer, indicating that the user can insert the data.

3. Once the pointer is over the destination location, release the mouse button.

The data is displayed at that location and remains highlighted.

In some embodiments, to copy selected data from one recording to another, a user can do the following:

1. Select the data that the user wants to copy to another recording.

The data appears highlighted.

2. Drag the selected data to the timeline for the other recording.

An arrow pointer with a content box follows the user's mouse movement. Once the pointer is over the destination timeline, the destination Recording Editor or frame view window becomes the active window; and a one-pixel-wide, red insertion point is displayed on the upper part of the timeline, indicating that the user can insert the data.

3. When the pointer is over the location on the destination timeline at which the user wants to insert the selected data, release the mouse button.

The data is displayed at the destination location and remains highlighted.

In some embodiments, in the sequence editor window, a user can drag one or more selected segments either to another location in the segment list or from another recorded file to the segment list.

In some embodiments, to move one or more selected segments to another location in the segment list in the sequence editor window, a user can do the following:

1. Select the segment or segments that the user wants to move.

The names of the selected segments appear highlighted within dotted rectangles in the list.

2. Drag the selected segments up or down in the segment list.

A 1-pixel-wide, horizontal black line, with a right-pointing arrow that is also in the user's highlight color, appears under and tracks the movement of a double-headed arrow pointer in the list. The line snaps to the gaps between the segment names, or immediately above the first segment name, or immediately below the last segment name in the list.

3. Once the pointer is over the destination location in the list, release the mouse button.

The line disappears, the segment name moves to the last location of the line in the list and remains highlighted, and the segments are renumbered as necessary to maintain their consecutive numbering.

In some embodiments, to copy selected segments from the sequence editor window for one recorded file to that for another recorded file, a user can do the following:

1. Select the segment or segments that the user wants to copy.

The names of the selected segments appear highlighted within dotted rectangles in the list.

2. Drag the selected segments to the segment list in the sequence editor window for the other recording.

Once the pointer is over the destination segment list, the destination sequence editor window becomes the active window; and a 1-pixel-wide, horizontal black line, with a right-pointing arrow that is also in the user's highlight color, appears under and tracks the movement of a double-headed arrow pointer in the list. The line snaps to the gaps between the segment names, or immediately above the first segment name, or immediately below the last segment name in the list.

3. When the pointer is over the location in the destination segment list at which the user wants to insert the selected segments, release the mouse button.

The line disappears, the segment name moves to the last location of the line in the list and remains highlighted, and the segments are renumbered as necessary to maintain their consecutive numbering.

In some embodiments, a user can truncate the beginning or ending of a recording. For example, to delete all data that precedes a specific location on the timeline, a user can do the following:

1. Start playback from the beginning of the recording, to find the location on the timeline at which the recording should begin.

Playback proceeds until the current location indicator reaches the location on the timeline at which the recording should begin.

2. On the Controls menu, choose Stop Playback, using the keyboard shortcut F3, or Pause Playback, using the keyboard shortcut F4, which allows cueing of the recording.

3. If necessary, adjust the current location indicator to ensure that the current location indicator is at precisely the correct location.

4. On the Edit menu, point to Truncate, then choose Beginning.

Completing the truncate operation will delete all recorded data from the beginning of the recording to the current location indicator, without placing the recorded data on the Clipboard. The Truncate Beginning message box is displayed, allowing the user to confirm the deletion.

5. Click Yes.

The Truncate Beginning message box closes and the Recording Editor or Sequence Editor again becomes the active window. The unwanted data preceding the current location indicator on the timeline is deleted, the previous location of the current location indicator becomes 00:00:00 on the timeline, and the current location indicator is displayed at 00:00:00 on the timeline at the left side of the window.

In some embodiments, to delete all data that follows a specific location on the timeline, a user can do the following:

1. Start playback near the end of the recording, to find the location on the timeline at which the recording should end.

Playback proceeds until the current location indicator reaches the location on the timeline at which the recording should end.

2. On the Controls menu, choose Stop Playback, using the keyboard shortcut F3, or Pause Playback, using the keyboard shortcut F4, which allows cueing of the recording.

3. If necessary, adjust the current location indicator to ensure that the current location indicator is at precisely the correct location.

4. On the Edit menu, point to Truncate, then choose Ending.

Completing this operation will delete all recorded data from the current location indicator to the end of the recording, without placing the recorded data on the Clipboard. The Truncate Ending message box is displayed, allowing the user to confirm the deletion.

5. Click Yes.

The Truncate Ending message box closes and the Recording Editor or Sequence Editor again becomes the active window. The unwanted data following the current location indicator on the timeline is deleted; the previous location of the current location indicator is displayed both at the extreme right, or end, of the timeline and in the Duration indicator and the current location indicator is displayed at the right side of the window.

In some embodiments, to insert another existing recording (e.g., an entire .wrf file) on the timeline, a user can perform one or more of the following techniques:

Technique 1: To insert a recording to the left of a selected snapshot or range of time on the timeline, a user can do the following:
1. Scroll to a location on the timeline.
2. Click a snapshot to select the snapshot or select a range of time on the timeline.
3. On the Insert menu, choose Recording.
The Insert Recording dialog box is displayed.
4. Select a recording in the list, then click Insert.

The inserted recording is displayed to the left of the selected snapshot or preceding the selected range of time, the current location indicator is at the end of the new segment, and the one of the following occurs:

If the original recording contained no segments, the inserted recording constitutes a new segment. Therefore, the Segment Properties dialog box is displayed, allowing the user to specify the segment's properties. The file name of the inserted recording is displayed in the Name box, by default. However, the user can specify a different segment name.

If the inserted recording contains segments, the following message may be displayed in a message box:
The recording that the user inserted consists of one or more previously defined segments. To rename one of these segments, select the segment, then choose Properties on the Edit menu.
5. Specify the segment's properties.

Technique 2: To insert a recording at a specific location on the timeline, a user can do the following:
1. Cue the recording.
2. On the Controls menu, choose Stop Playback (F3) or Pause Playback (F4).
3. On the Insert menu, point to Marker, then choose Cue Point to insert a cue point marker.
4. On the Insert menu, choose Recording.
The Insert Recording dialog box is displayed.
5. Select a recording in the list, then click Insert.

The inserted recording is displayed at the current location, the current location indicator is at the end of the new segment, and the one of the following occurs:

If the original recording contained no segments, the inserted recording constitutes a new segment. Therefore, the Segment Properties dialog box is displayed, allowing the user to specify the segment's properties. The file name of the inserted recording is displayed in the Name box, by default. However, the user can specify a different segment name.

If the inserted recording contains segments, the following message may be displayed in a message box:
The recording that the user inserted consists of one or more previously defined segments. To rename one of these segments, select the segment, then choose Properties on the Edit menu.
6. Specify the segment's properties.

In some embodiments, a user can build a recording by concatenating existing recordings (e.g., entire .wrf files) and segments. To build a recording by concatenating existing recordings, a user can do the following:
1. Open the recording that is to constitute the first segment in a sequence of segments.
2. Save the recording under a different name.
3. On the Controls menu, choose Fast Forward to End.
4. Insert the next recording.
5. Specify the segment's properties.
6. Repeat steps 4 and 5 as many times as necessary.

In some embodiments, to save an edited recording, a user does the following:
1. Chooses Save or Save As on the File menu.
If the user chose Save and has not previously saved the recording to the current location, or the user chose Save As, the Save As dialog box is displayed.
2. Optionally, selects a location to which to save the recorded file.
3. Optionally, types a different name in the File name box.
4. Clicks Save.

In some embodiments, a user may work with recorded segment to do or more of the following:
Define a segment.
Select a segment.
Edit a segment.
Specify a segment's properties.
Cut, copy, and paste segments.
Sequence segments.
Insert an existing segment.
Concatenate segments.
Merge contiguous segments.
Split a segment into two.
Rename a segment.
Undefine a segment.
Delete a segment.

In some embodiments, to define a segment, a user can perform one or more of the following techniques:

Technique 1: To insert a starting point marker for a segment, then define the segment:
1. Insert a starting point marker.
2. Select the starting point marker.
3. On the Edit menu, choose Define Segment.
The Define Segment dialog box is displayed. Under Starting point, the location of the selected starting point marker is displayed in the Time spin box.
4. Type a name for the segment in the Name text box.
5. Under Ending point, type the location of the segment's ending point in the Time spin box.
OR:
With the insertion point in the Time spin box under Ending point, move the current location indicator to the ending point, then insert an ending point marker on the timeline.
The ending point marker appears highlighted. The location of the selected ending point marker is displayed in the Time spin box.
OR:
With the insertion point in the Time spin box under Ending point, select the starting point marker for the subsequent segment.
The location of the selected starting point marker is displayed in the Time spin box.
6. Optionally: Define other properties of the segment.
7. Click Define.
The Define Segment dialog box closes, and the new segment, and its starting and ending point markers appear selected on the timeline.

Technique 2: To insert both starting and ending point markers for a segment, then define the segment:
1. Insert a starting point marker.
2. Insert an ending point marker.
3. Select the starting and ending point markers.
4. On the Edit menu, choose Define Segment.

The Define Segment dialog box is displayed. Under Starting point, the location of the selected starting point marker is displayed in the Time spin box. Under Ending point, the location of the selected ending point marker is displayed in the Time spin box.

5. Type a name for the segment in the Name text box.
6. Optionally: Define other properties of the segment.
7. Click Define.

The Define Segment dialog box closes, and the new segment, and its starting and ending point markers appear selected on the timeline.

Technique 3: To define a segment without first inserting starting and ending point markers:

1. On the Edit menu, choose Define Segment.

The Define Segment dialog box is displayed. Under Starting point, the current location is displayed in the Time spin box by default.

2. Type a name for the segment in the Name text box.
3. Optionally: To set the starting point at another location, type the location of the starting point in the Time spin box under Starting point.

OR:

With the insertion point in the Time spin box under Starting point, move the current location indicator to the starting point, then insert a starting point marker on the timeline.

The starting point marker appears highlighted. The location of the selected starting point marker is displayed in the Time spin box.

OR:

With the insertion point in the Time spin box under Starting point, select the ending point marker for the preceding segment.

The location of the selected ending point marker is displayed in the Time spin box.

4. Type the location of the ending point in the Time spin box.

OR:

With the insertion point in the Time spin box under Ending point, move the current location indicator to the ending point, then insert an ending point marker on the timeline.

The ending point marker appears highlighted. The location of the selected ending point marker is displayed in the Time spin box.

OR:

With the insertion point in the Time spin box under Ending point, select the starting point marker for the subsequent segment.

The location of the selected starting point marker is displayed in the Time spin box.

5. Optionally: Define other properties of the segment.
6. Click Define.

The Define Segment dialog box closes, and the new segment, and its starting and ending point markers appear selected on the timeline.

Technique 4: To define a segment using the ending point marker of a segment that immediately precedes the segment being defined and the starting point marker of a segment that immediately follows the segment, if any:

1. Select the ending point marker of a segment that immediately precedes the segment being defined.
2. On the Edit menu, choose Define Segment.

The Define Segment dialog box is displayed. The location of the selected ending point marker is displayed in the Time spin box under Starting point.

3. Type a name for the segment in the Name text box.
4. With the insertion point in the Time spin box under Ending point, select the starting point marker of a segment that immediately follows the segment being defined.

The location of the selected starting point marker is displayed in the Time spin box under Ending point.

OR:

Type the location of the ending point in the Time spin box under Ending point.

OR:

With the insertion point in the Time spin box under Ending point, move the current location indicator to the ending point, then insert an ending point marker on the timeline.

The ending point marker appears highlighted. The location of the selected ending point marker is displayed in the Time spin box.

5. Optionally: Define other properties of the segment.
6. Click Define.

The Define Segment dialog box closes, and the new segment, and its starting and ending point markers appear selected on the timeline.

Technique 5: To define a pasted range of recorded data as a segment, a user can do the following:

1. Drag to select a range of recorded data that has no starting and/or ending point markers.
2. Cut the selected range of recorded data.
3. Paste the range of recorded data at the current location on the timeline.

Starting and/or ending point markers for the range are inserted automatically, as necessary; the markers and the range of recorded data appear highlighted; and the Define Segment dialog box is displayed, allowing the user to define the selected range of recorded data as a segment.

4. Type a name for the segment in the Name text box.
5. Optionally: Define other properties of the segment.
6. Click Define.

The Define Segment dialog box closes, and the new segment, and its starting and ending point markers appear selected on the timeline.

Technique 6: To define a range of recorded data that has been dragged to another location on the timeline as a segment, a user can do the following:

1. Drag to select a range of recorded data that has no starting and/or ending point markers.
2. Drag the selected range of recorded data to another location on the timeline.

Starting and/or ending point markers for the range are inserted automatically, as necessary; the markers and the range of recorded data appear highlighted; and the Define Segment dialog box is displayed, allowing the user to define the selected range of recorded data as a segment.

3. Type a name for the segment in the Name text box.
4. Optionally: Define other properties of the segment.
5. Click Define.

The Define Segment dialog box closes, and the new segment, and its starting and ending point markers appear selected on the timeline.

Technique 7: To define a pasted recording as a segment, a user can do the following:

1. Select an entire recording.
2. Cut the recording.
3. Paste the recording at the current location on the timeline.

Starting and ending point markers for the recording are inserted automatically; the markers and the range of recorded data appear highlighted; and the Define Segment dialog box is displayed, allowing the user to define the pasted recording as a segment.

4. Type a name for the segment in the Name text box.
5. Optionally: Define other properties of the segment.
6. Click Define.

The Define Segment dialog box closes, and the new segment, and its starting and ending point markers appear selected on the timeline.

Technique 8: To define a recording that has been dragged into the timeline as a segment, a user can do the following:
1. Select an entire recording.
2. Drag the selected recording to a location on the timeline.

Starting and ending point markers for the recording are inserted automatically; the markers and the range of recorded data appear highlighted; and the Define Segment dialog box is displayed, allowing the user to define the recording that has been dragged as a segment.

3. Type a name for the segment in the Name text box.
4. Optionally: Define other properties of the segment.
5. Click Define.

The Define Segment dialog box closes, and the new segment, and its starting and ending point markers appear selected on the timeline.

In some embodiments, to select a segment on the timeline in the editor window, a user can do the following:
Click the colored portion of the upper part of the timeline that demarcates a segment; or
Hold down the Ctrl key and click either the segment's starting point marker or, if an ending point marker is visible, click the ending point marker.

In either case, the selection comprises the segment's starting and ending point markers, and the entire segment on the timeline. Both of the markers that define the segment appear highlighted and the entire segment appears highlighted on the lower part of the timeline.

In some embodiments, to select one or more segments in the segments list in the sequence editor window, a user can do the following:
Click a segment.
Shift-click contiguous segments.
Ctrl-click noncontiguous segments.

In some embodiments, to edit an existing segment, a user can do the following:
Move its starting point marker or ending point marker on a timeline.
Specify a different position for its starting point marker or ending point marker in the Define Segment or Segment Properties dialog box.

In some embodiments, to specify a new segment's properties or edit an existing segment's properties, a user can perform one or more of the following techniques:

Technique 1:
1. Select the entire segment.
2. Choose Define Segment or Properties on the Edit menu.

The Define Segment or Segment Properties dialog box for that segment is displayed, respectively.

Technique 2:
1. Select the segment's starting point marker,
2. Choose Define Segment on the Edit menu.

The Define Segment dialog box for that segment is displayed.

Technique 3:
Double-click the colored portion of the upper part of the timeline that demarcates a segment.

The Segment Properties dialog box for that segment is displayed.

In some embodiments, when editing segments on the timeline or in the sequence editor window, a user can do one or more of the following:
Cut a selected segment to the Clipboard to move or delete the segment.
Copy a selected segment from the same or a different recorded file to the Clipboard.
Paste a segment that currently resides on the Clipboard at either the current location, or the left boundary of a selected snapshot or range of time, if any.
Clear a selected segment to delete the segment.
View a segment on the Clipboard.

A user can either drag, or copy and paste a segment from one recorded file to another.

In some embodiments, to paste a segment on the timeline, a user can perform one or more of the following techniques:

Technique 1: To paste a segment to the left of a selected snapshot or range of time on the timeline, a user can do the following:
1. Scroll to a location on the timeline.
2. Click a snapshot to select the snapshot or select a range of time on the timeline.
3. On the Edit menu, choose Paste.

The segment is displayed to the left of the selected snapshot or range of time.

Technique 2: To paste a segment more precisely, a user can do the following:
1. Move the current location indicator to a location on the timeline.
2. On the Edit menu, choose Paste.

The segment is displayed at the current location.

In some embodiments, a user can reorder segments in the sequence editor window. To change the sequence of the segments in a recording, a user can do one or more of the following:
Drag segments up or down in the segment list.
Drag segments from another recording to the segment list.
Cut one or more segments from the segment list, then paste the segments at another location in the list.
Copy or cut segments from another recording, then paste them into the segment list.
Select one or more segments in the segment list, then click the Move Up or Move Down button above the list.

In some embodiments, to insert one or more existing segments from other recordings, a user can do one or more of the following:
Drag segments from the Sequence Editor or editor window for another recording, then drop them at the appropriate location in the segment list. This operation copies the segments.
Copy or cut segments from the Sequence Editor or editor window for another recording, then paste them at the appropriate location in the segment list, using the commands on the Edit menu.

In some embodiments, a user can build a recording by concatenating either existing segments from various recordings or entire recordings (e.g., .wrf files). To build a recording by concatenating segments, a user can do one or more of the following:
Select, then drag another entire recording from either the timeline in the editor window or the sequence editor window for that recording, then drop the recording at the appropriate location in the segment list for the recording being built.

Drag a recording's icon from Microsoft's Windows® Explorer or the desktop, then drop the recording at the appropriate location in the segment list.

Select, then drag segments from either the timeline in the editor window or the sequence editor window for another recording, then drop them at the appropriate location in the segment list.

Select, then copy or cut another entire recording from either the timeline in the editor window or the sequence editor window for that recording, then paste the recording at the appropriate location in the segment list, using the commands on the Edit menu.

Select, then copy or cut segments from either the timeline in the editor window or the sequence editor window for another recording, then paste them at the appropriate location in the segment list, using the commands on the Edit menu.

Insert another entire recording by choosing either
  Recording on the Insert menu; or
  Insert Recording on the Segment List pop-up menu.

In some embodiments, a user can create a single segment from two or more contiguous segments that are currently selected in the sequence editor window. To merge two or more selected segments, a user can do the following:
1. Select two or more contiguous segments in the segment list in the sequence editor window.
2. Click Merge.

In some embodiments, a user may also unmerge merged segments.

In some embodiments, to split an existing segment into two segments, a user can do the following:
1. Set the current location indicator at the point at which the user wants to split the segment.
2. Point to Marker on the Insert menu, then choose Starting Point.

The split point that this marker establishes corresponds to the new ending point for the original segment and the starting point for the new segment being defined. The ending point of the original segment automatically becomes the ending point of the new segment.

3. Choose Split Segment on the Edit menu.
The Split Segment dialog box is displayed.
4. Type names for the new segments in their Name text boxes.
5. Optionally: Define other properties of the segments.
6. Click Split.

The Split Segment dialog box closes, and the new segments, and their starting and ending point markers appear highlighted on the timeline.

In some embodiments, to rename an existing segment of a recording, a user can perform one or more of the following techniques:

Technique 1:
1. Select a segment to rename.
2. Choose Define Segment or Properties on the Edit menu.
The Define Segment or Segment Properties dialog box is displayed, respectively.
3. Type a new name in the Name box.
4. Click Define.

Technique 2:
1. In the sequence editor window, select a segment, then click Rename.
A box surrounds the highlighted segment name.
2. Type a new name or select an insertion point in the name to edit the name. 3. Press Return or click outside the box to deselect the name.

Technique 3:
1. In the sequence editor window, select a segment.
2. Click the segment's name again to edit the name.
A box surrounds the highlighted segment name.
3. Type a new name or select an insertion point in the name to edit the name.
4. Press Return or click outside the box to deselect the name.

In some embodiments, to undefine an existing segment of a recording, a user can perform one or more of the following techniques:

Technique 1:
1. Select a segment to undefine.
2. Choose Properties on the Edit menu.
The Segment Properties window is displayed.
3. Click Undefine.
The starting and ending point markers no longer define a segment.

Technique 2:
1. Select a segment's starting point marker.
2. Cut or delete the selected starting point marker.
A message box is displayed, containing the following message:
Once you remove a segment's starting point marker, the segment definition no longer exists, but the recorded data remains. You can either remove or edit the segment's ending point marker.
To remove the ending point marker, click Remove.
To edit the ending point marker's properties (e.g., rename the marker or change its type), click Edit.
3. Click Remove.
The ending point marker is deleted.

Technique 3:
1. Select a segment's starting point marker.
2. Choose Properties on the Edit menu.
The Marker Properties dialog box is displayed.
3. Choose a marker type other than Starting point in the drop-down list box.
4. Click OK.
A message box is displayed, containing the following message:
If you change the type of a segment's starting point marker, the segment definition will no longer exist.
If the user tries to change the marker's type, the following message may be displayed.
Do you want to change the marker's type?
3. Click Yes.
The marker type changes.

In some embodiments, to delete an existing segment of a recording, and the recorded data that the segment contains, a user can perform one or more of the following techniques:

Technique 1:
1. In the sequence editor window, select a segment, then click Delete.
The Delete Segment message box is displayed, allowing the user to confirm the deletion.
2. Click Yes.
The entire segment is deleted, including the recorded data that the segment contains.

Technique 2:
1. In the editor window, select a segment on the timeline.
2. Choose Clear on the Edit menu or press Delete.

In some embodiments, to specify user preferences for Recording Editor, a user can do the following:
1. Choose Preferences on the Edit menu.
The Preferences dialog box is displayed.

2. Specify preferences.

3. Click OK.

Moreover, in some embodiments, it is possible to insert data into an existing recording (e.g., beginning recording at a specific location in an existing recording, pushing all subsequent data in the recording forward in time).

In some embodiments, a user may replay a recorded meeting (e.g., play back a previously recorded meeting). The term "recorded meeting" refers to the content in a .wrf file that a user has created, and the content consists of both audio and images of user interactions with interface elements on a computer screen.

C. Sharing Meeting Recording File

Figure 33:
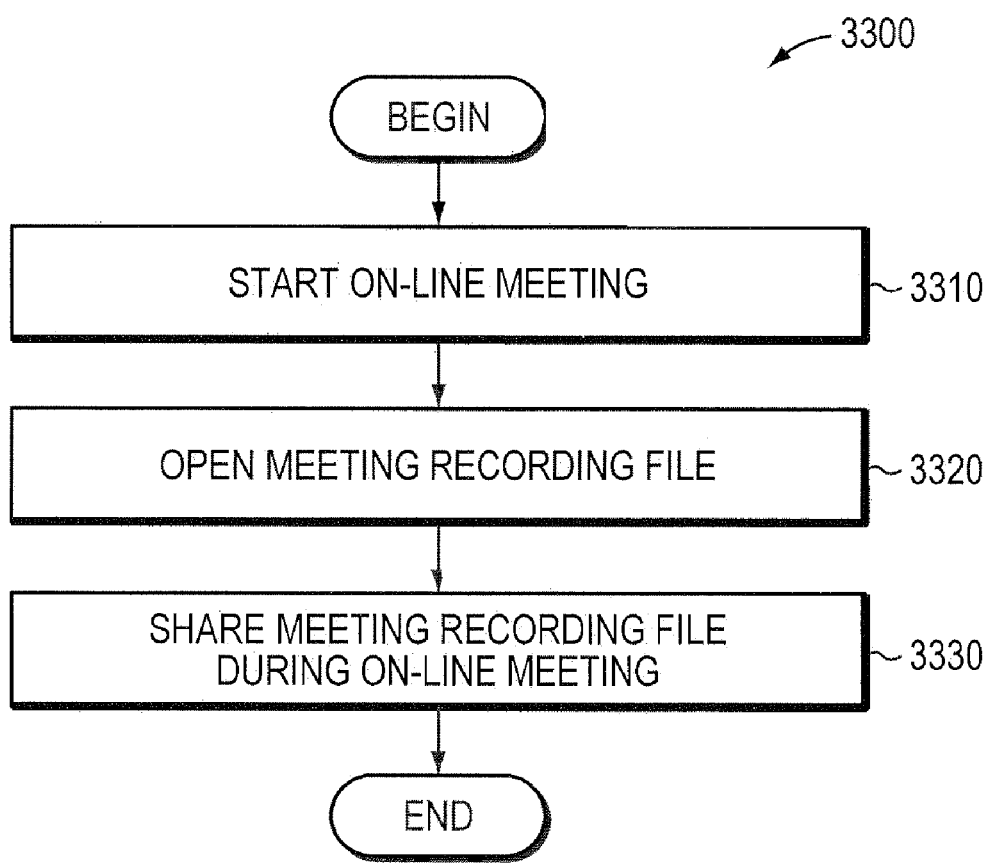
FIG. 33 is a flow diagram of an operation for sharing a meeting recording file during an on-line meeting in a distributed collaborative computing system, in accordance with some embodiments of the invention.

FIG. 33 is a flow diagram of an operation 3300 for sharing a meeting recording file during an on-line meeting in a distributed collaborative computing system, in accordance with some embodiments of the invention. In stage 3310 an on-line meeting is started. In stage 3320, a meeting recording file is opened. In stage 3330, the meeting recording file is shared during the on-line meeting.

Figure 34:
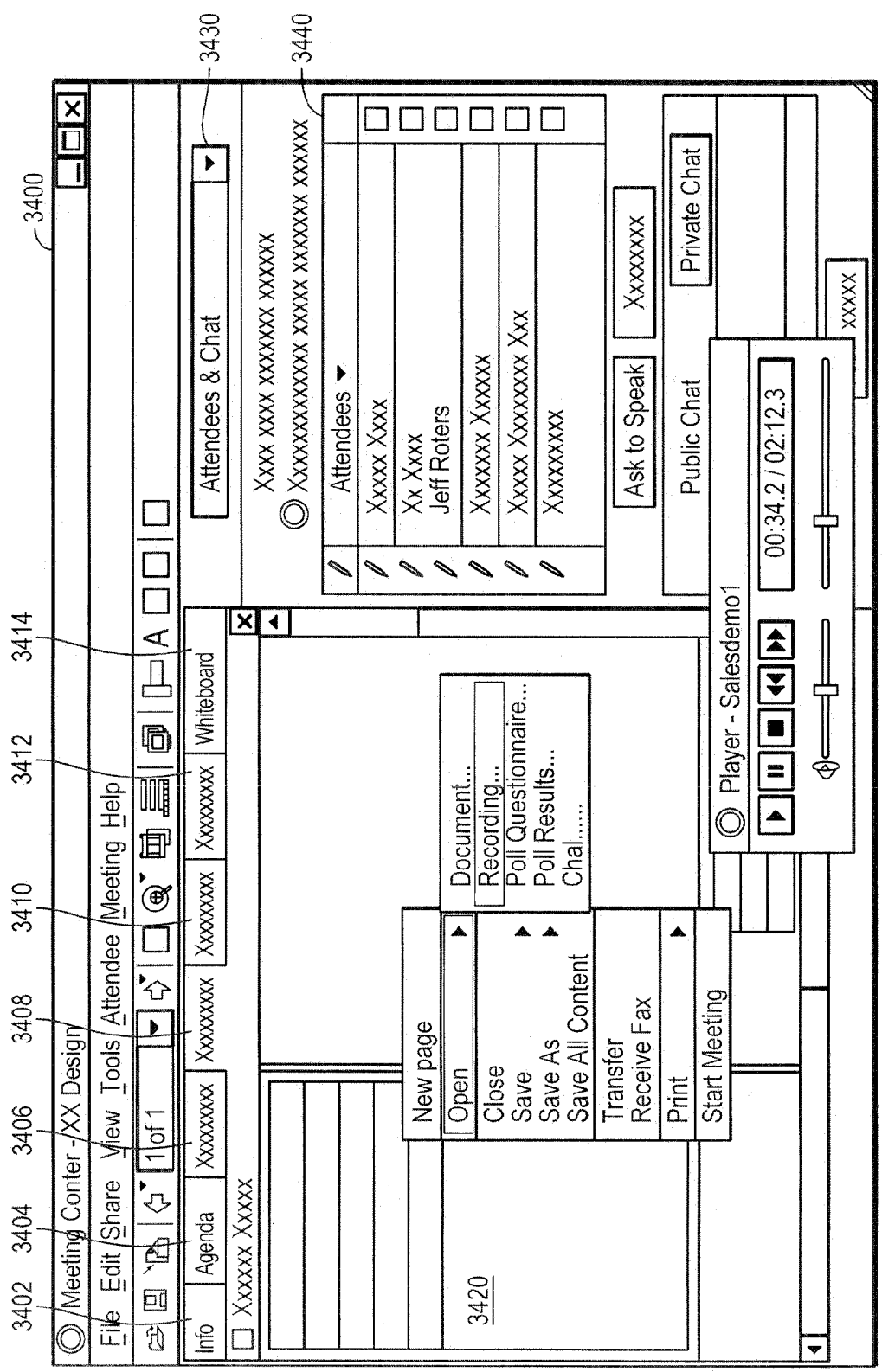
FIG. 34 illustrates a user interface for a Meeting Center window, in accordance with some embodiments of the invention.

In some embodiments, a user interface is provided in which different information are illustrated as if they were on separate tabs. FIG. 34 illustrates a user interface for a Meeting Center window 3400, in accordance with some embodiments of the invention. For example, an Info tab 3402 displays information about a meeting. An Agenda tab 3404 is displayed if a host provides an agenda when scheduling a meeting, and the Agenda tab contains the agenda for the meeting. One or more Shared Content tabs 3406, 3408, 3410, and 3412 appear for each document, presentation, or other type of content that a presenter shares. A Whiteboard tab 3414 is displayed if a presenter shares a whiteboard. A Fax tab is displayed if a host or presenter receives or opens a fax. One or more of these tabs may be optional (e.g., the agenda, whiteboard, and fax tabs).

A Next Tab button may be provided that is displayed to the right of the Shared Content tabs (e.g., if there are more tabs than can appear in the window at one time), and selecting this button causes the next tab to scroll into view. A Previous Tab button contains a left-pointing arrow and is displayed to the left of the Shared Content tabs (e.g., if there are more tabs than can appear on the screen at one time). If a user has previously clicked the Next Tab button, clicking the Previous Tab button causes the previous tab to scroll into view. In full-screen view, the Meeting Center window 3400 and task bar disappear, and the shared content is visible.

In some embodiments, a host schedules a meeting to be presented by a presenter. When scheduling a meeting, a host can designate the primary presenter for the meeting. The host may also start and end a meeting, control attendee privileges and access to a meeting and teleconference, and designate a primary and/or current presenter (i.e., there may be multiple hosts and/or presenters during a single meeting).

A presenter provides information to other meeting attendees; can share documents, presentations, applications, web browsers, the computer's desktop, or information on a whiteboard with other attendees; and can take a poll. Initially, the meeting host is also the presenter. The host can designate any user attending the meeting (e.g., the host, the presenter at presenter client computer 110, or a user at attendee client computer 120n) as the current presenter. A presenter may or may not be an authorized user, and a primary presenter may or may not be an authorized user. An authorized user is one who has an account at the conferencing server 140 and uses his or her user name and password to log in to a Meeting Center at the conferencing server 140.

In advance of the meeting, the primary presenter may prepare content for viewing in the Meeting Center 3400 window by creating a new document or by editing an existing one. The presenter may share the document by opening existing content that has already been converted to Rich Multi-Media format or by sharing new content. The content is displayed on the Shared Content tabs in the content viewer. When a presenter shares a document, presentation, or whiteboard, it is displayed in the content viewer 3420 (e.g., a content area on the left side of the Meeting Center window 3400).

The primary presenter for a meeting can click a Prepare button to view and work in the Meeting Center window 3400 without starting the meeting. Thus, in advance of a meeting, a presenter can open or share all of the documents or other content to be presented during the meeting.

An attendee is a user who views the information that a presenter shares, including documents, presentations, applications, web browsers, the presenter's desktop, and information on a whiteboard. An attendee can annotate shared information, and participate in a chat or poll. An attendee may or may not be an authorized user.

The panels are groups of controls that reside in the area of the Meeting Center window 3400. A Panel drop-down list box 3430 is used to select a panel. Selecting a panel in the Panel drop-down list box 3430 displays the panel in the area on the right of the Meeting Center window 3400. The panels include, for example: an Attendees & Chat panel 3440 (which is selected in FIG. 34), a Polling panel, and a Video panel.

In some embodiments, the Meeting Center window 3400 is in conformance with Microsoft® user interface standards. For example, the window is in a standard gray, the toolbar is displayed at a standard location, below the menu bar, the behaviors of the toolbar buttons and palettes are consistent and conform to standards, and the appearance of the tabs is consistent with standards. Additionally, to achieve greater visual consistency, wherever possible, the layout of user interface elements conforms to a grid.

In the Meeting Center window 3400, illustrated in FIG. 34, a control bar with a handle separates the panels and the content viewer. Dragging the panel size control lets a user resize these areas of the window, and control the relative proportions of the panels and the content viewer. Also, the window may be resized using, for example, a standard size grip that is displayed when a user places a mouse at a corner of the Meeting Center window 3400.

The Meeting Center window 3400 includes commands on a toolbar. In some embodiments, a Close command is available for hosts and presenters. Choosing this command closes the document on the tab that is currently visible in the content viewer. A Save All Content command allows the host or primary presenter for a meeting to prepare the information that is to be presented in advance of the meeting and save the content on server 140. In some embodiments, this command is available for hosts and the primary presenter for a meeting. Choosing this command saves all of the content that a presenter has opened or shared when preparing for a meeting. When the meeting starts, all of the saved content automatically is displayed in the content viewer.

A Start Meeting command toggles with an End Meeting command. This command is available for hosts in some embodiments of the invention. The Start Meeting command allows a host to start a meeting, for example:

1. If the primary presenter is currently preparing content for viewing in the meeting; or 2. If one or more attendees join a meeting before the presenter has started the meeting.

In some embodiments, the meeting starts automatically when the first attendee joins the meeting.

In either circumstance, when the Meeting Center window 3400 for a meeting is already open, the host needs a mechanism for easily assuming control of the meeting, without disrupting the activities of the primary presenter or those attendees who are already in the meeting. The host can assume control of the meeting by choosing the Start Meeting command.

A Reorder Viewer Tabs . . . command is available for hosts and presenters in some embodiments. Choosing this command displays the Reorder Viewer Tabs dialog box, in which a host or presenter may modify the order in which documents or other content appear on the Shared Content tabs.

A Thumbnails command is a toggle command that is available to the host and presenter in some embodiments, and the attendee privilege settings determine whether this command is available to attendees. Choosing this command displays the thumbnail viewer to the left of the content viewer, which allows a user to navigate the slides of a presentation or the pages of a document. A thumbnail viewer is an area that a user can display on the left side of the Meeting Center window 3400 and that contains miniature images ("thumbnails") of each page in a shared document.

A Panels toggle command is available to all users. By default the Panels command is selected, and the panels appear in the Meeting Center window 3400. Choosing the Panels command closes the panels, and choosing this command again displays the panels to the right of the content viewer 3420.

A Synchronize My Display command is available to hosts and presenters, and the attendee privilege settings determine whether this command is available to attendees in some embodiments. If a user (e.g., host or attendee) is viewing a slide or page in the content viewer 3420 other than that which the presenter is currently displaying, choosing this command synchronizes the user's display with that of the presenter.

In some embodiments, any user (e.g., host, presenter, or attendee) can annotate, save, open, or print an entire document. Other users may include, for example, system administrators.

Figure 35:
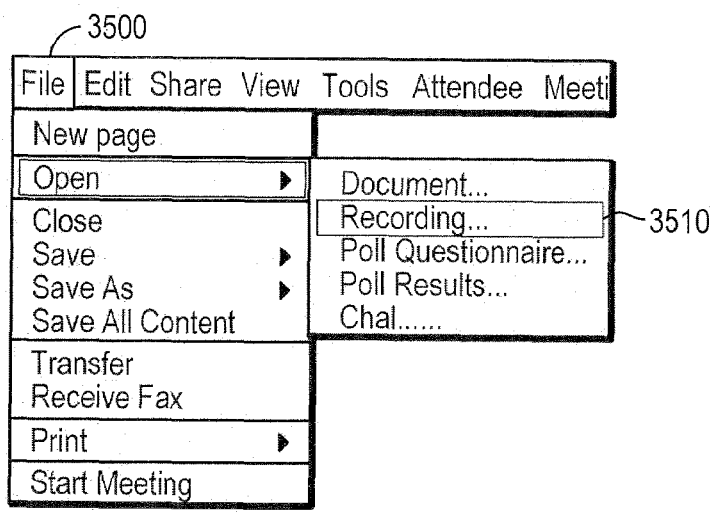
FIG. 35 illustrates a File menu with the Open>Recording command selected, in accordance with some embodiments of the invention.

FIG. 35 illustrates a File menu 3500 with the Open>Recording command 3510 selected, in accordance with some embodiments of the invention. The File menu 3500 includes an Open>Recording . . . command to 3510 to allow a presenter to open a meeting recording file directly from within a meeting.

The Open dialog box that results from clicking the Open>Recording . . . command may follow the user interface designs specified below:
  The dialog box contains the window title Open Recording.
  The files of type: pull-down menu contains a recording file type (*.wrf).

Figure 36:
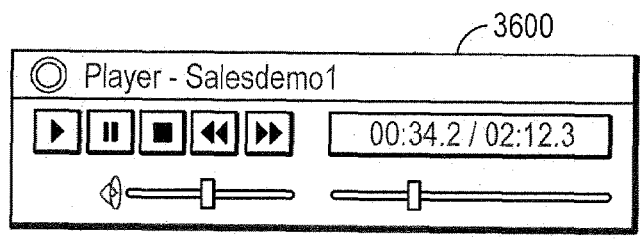
FIG. 36 illustrates a floating, modeless player control panel, in accordance with some embodiments of the invention.

When a user opens a recording file, the recorded file is displayed in the content viewer. On the presenter's side, an accompanying floating, modeless player is displayed. FIG. 36 illustrates a floating, modeless player control panel 3600, in accordance with some embodiments of the invention. In some embodiments, player software 203 displays the player control panel 3600. The player control panel 3600 is similar to the normal recording playback panel, except that clicking the Mute button causes the audio portion of the playback to mute on all meeting participants' machines and the player control panel 3600 does not have the following:
  Close button
  Menu bar
  Open File button On the attendee's side, an accompanying floating, modeless player control panel is displayed. The attendee's player control panel does not include a menu bar, and all control elements are dimmed except for the volume slide bar and the close window button. For the attendee's player control panel:
  the player timeline numeric indicator is visible;
  the progress indicator is visible, but the handle is removed; and
  all playing controls are dimmed.

A presenter can share a meeting recording file with attendees by opening a recording file from the File menu. When the presenter opens a meeting recording file, the recording is displayed within the content viewer window. A new tab will be created for the recording file, with the label Recording: [File name], and brought to front, as illustrated in FIG. 34. If the presenter chooses to, the tab may be brought to full screen so the entire recording may be viewed without scrolling. The player control panel will also appear when a recording file is open. The player control panel may stay on top of the Meeting Center window 3400 until another tab is selected.

Figure 37:
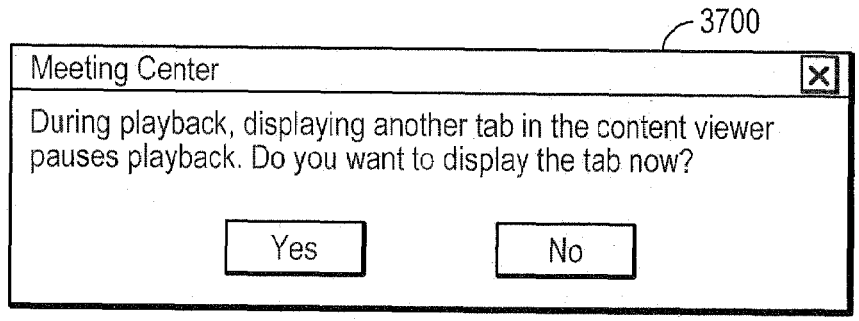
FIG. 37 illustrates a message box, in accordance with some embodiments of the invention.

If the presenter selects another tab during playback, a message box 3700, such as the one illustrated in FIG. 37 is displayed. The message indicates that tab switching will cause the playback to pause. If the presenter chooses to select another tab, the recording will be paused. The recording will stay in the paused state until the presenter switches back to the tab containing the recorded file and clicks the resume button.
  The message box 3700 may have the following properties:
  Width=300 pixels, Height=125 pixels
  The No button is selected by default
  Clicking the No button closes the message box and the recording tab remains the active tab
  Clicking the Yes button closes the message box, the playback of the recording pauses, the player control panel is hidden, and the selected tab becomes the active tab.
  Clicking the Close button has the same effect as clicking the No button.
  If the presenter switches back to the tab containing the recorded file, the player control panel again is displayed the active tab, and the panel shows the recording in the paused state (the pause button will be highlighted)

During playback, displaying another tab in the content viewer pauses the playback and the following message may be displayed: Do you want to display the tab now?

The presenter can control playback of a recording in the same manner as controlling playback of a recording with a stand-alone player. All control buttons (Play, Pause, Stop, Rewind, Fast Forward, Mute button, Volume slider 1108, and Location slider 1208) work the same way as they do in the stand-alone player. Additionally, the following may be true:
  Clicking the Mute button will Mute all attendee's audio playback, in the addition to the presenter's.
  The presenter can display playback in full-screen mode in the same manner as in all other shared documents, by clicking the Full-Screen View button or menu command. The player control panel will remain on top to allow the presenter to control the playback.

When the playback is paused on the presenter's side, the recording will also pause on the attendees' side. The floating player control panel will be visible when the tab containing a recording file is active.

When a presenter opens a recorded file, attendees will be brought to the tab containing the recorded file. The player control panel is displayed, and attendees may use the playback volume control to adjust volume. The recording playback will pause for all attendees if the presenter selects another tab. If the attendee is given the privilege to switch tabs, the user experience will be similar to that of the presenter. The streaming of the recording will be paused. In some embodiments, attendees have no control of the playback, and the effect of attendees switching tables will be noticeable on the audio side. When the attendee switches back to the recording file tab, the streaming will resume and synch up to the same playback timeline as the presenter's side.

As with the presenter's user experience, the player control panel will be visible when the tab controlling the recording tab is active. This is true regardless of who selected the tab (presenter leading the attendee to this tab, or the attendee selecting the tab if given tab selecting privilege).

Microsoft and Windows are trademarks of Microsoft, Inc. MAC OSX is a trademark of Apple Computer, Inc. DB2 is a trademark of International Business Machines, Inc. Oracle is a trademark of Oracle, Corp. Intel and Pentium are trademarks of Intel, Corp. UltraSparc is a trademark of Sun Microsystems, Inc.

Although the invention has been described with reference to particular embodiments, the description is only an example of the invention's application and should not be taken as a limitation.

The order in which the steps of the present technique are performed is purely illustrative in nature. In fact, the stages in the flow diagrams described herein may be performed in any order or in parallel, unless otherwise indicated by the present disclosure.

The technique of the present invention may be performed in either hardware, software, or any combination thereof. In particular, the invention may be carried out by software, firmware, microcode operating on a computer or computers of any type.

Additionally, software embodying the invention comprise computer instructions in any form (e.g., source code, object code, interpreted code) stored in any computer-readable medium (e.g., ROM, RAM, magnetic media, punched tape or card, compact disc (CD), DVD). Thus, the invention may be tangibly embodied as software in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media.

Furthermore, such software may also be in the form of a computer data signal embodied in a carrier wave, such as that found within the well-known Web pages transferred among computers connected to the Internet. Accordingly the present invention is not limited to any particular platform unless specifically stated otherwise in the present disclosure. Using the present specification, the invention may be implemented as a machine, process, or article of manufacture by using programming and/or engineering techniques to produce software, firmware, hardware, or any combination thereof.

While particular embodiments of the present invention have been shown and described, it will be apparent to those skilled in the art that changes and modifications may be made without departing from this invention in its broader aspect, and, therefore, the appended claims are to encompass within their scope all such changes and modifications as fall within the true spirit of this invention.

What is claimed is:

1. A computer system for recording an on-line meeting in a distributed collaborative environment, the computer system comprising:

a first computer;
a second computer connected to the first computer via a computer network;
a computer program executable by the first computer, wherein the computer program comprises computer instructions for capturing user input and application output during an on-line meeting at the first computer; and
a computer program executable by the second computer, wherein the computer program comprises computer instructions for capturing user input and application output during the on-line meeting at the second computer, storing the captured user input and application output in a meeting recording file comprising segments, and editing the meeting recording file comprising reordering segments of the meeting recording file or inserting one of the segments of the meeting recording file into another meeting recording file.

2. The computer system of claim 1, wherein the computer program executable by the first computer further comprises computer instructions for:

sharing the stored meeting recording file during another on-line meeting.

3. The computer system of claim 2, wherein the computer program executable by the second computer further comprises computer instructions for:

pausing playback of the shared meeting recording file at the second computer;
resuming playback of the shared meeting recording file at the second computer; and
synching up playback of the shared meeting recording file at the second computer with playback of the shared meeting recording file at the first computer.

4. The computer system of claim 1, wherein the computer program executable by the first computer further comprises computer instructions for:

merging two or more of the segments into a single segment.

5. The computer system of claim 1, wherein the computer program executable by the first computer further comprises computer instructions for:

splitting one of the segments into two or more segments.

6. The computer system of claim 1, wherein the computer program executable by the first computer further comprises computer instructions for:

displaying a timeline representing time within a recording in the meeting recording file.

7. The computer system of claim 6, wherein the computer program executable by the first computer further comprises computer instructions for:

placing one or more markers on the timeline of the recording, wherein each marker indicates a position on the timeline.

8. The computer system of claim 7, wherein the computer program executable by the first computer further comprises computer instructions for:

inserting a new segment in the recoding at a position indicated by one of the markers.

9. The computer system of claim 7, wherein the computer program executable by the first computer further comprises computer instructions for:

defining a segment between two of the markers, wherein one of the markers indicates a starting position of the defined segment and the other marker indicates an ending position of the defines segment.

10. The computer system of claim 7, wherein the computer program executable by the first computer further comprises computer instructions for:

spliffing one of the segments into two segments at a position indicated by one of the markers.

11. The computer system of claim 7, wherein the computer program executable by the first computer further comprises computer instructions for:
displaying a list of the markers;
selecting one of the markers from the list; and
jumping to the selected marker on the timeline.

12. The computer system of claim 6, wherein the computer program executable by the first computer further comprises computer instructions for:
displaying a list of the segments in the recording;
selecting one of the segments from the list; and
jumping to the selected segment on the timeline.

13. The computer system of claim 6, wherein the computer program executable by the first computer further comprises computer instructions for:
generating snapshots of images taken during the recording; and
placing the snapshots on the timeline in an order in which the corresponding images were taken.

14. The computer system of claim 6, wherein the computer program executable by the first computer further comprises computer instructions for:
displaying a shuttle wheel that allows a user of the first computer to advance or backtrack through the recording.

15. The computer system of claim 1, wherein the computer program executable by the second computer further comprises computer instructions for:
storing the captured user input and application output in a meeting recording file; and
editing the meeting recording file.

16. The computer system of claim 15, wherein the computer program executable by the second computer further comprises computer instructions for:
sharing the stored meeting recording file during another on-line meeting.

17. A method for recording an on-line meeting in a distributed collaborative environment, the method comprising:
coupling a first computer to a second computer via a computer network;
at the first computer, capturing user input and application output during an on-line meeting at the first computer; and
at the second computer, capturing user input and application output during the on-line meeting at the second computer, storing the captured user input and application out-put in a meeting recording file comprising segments, and editing the meeting recording file comprising reordering segments of the meeting recording file or inserting one of the segments of the meeting recording file into another meeting recording file.

18. The method of claim 17, further comprising:
at the first computer,
storing the captured user input and application output in a meeting recording file; and
editing the meeting recording file.

19. The method of claim 18, further comprising:
sharing the stored meeting recording file during another on-line meeting.

20. The method of claim 17, further comprising:
sharing the stored meeting recording file during another on-line meeting.

21. An apparatus for recording an on-line meeting in a distributed collaborative environment, the apparatus comprising:
means for coupling a second computer to a first computer;
means for capturing, at the second computer, user input and application output during the on-line meeting;
means for storing the captured user input and application output in a meeting recording file comprising segments; and
means for editing the meeting recording file, at least in part by, reordering segments of the meeting recording file or inserting one of the segments of the meeting recording file into another meeting recording file.

22. The apparatus of claim 21, further comprising:
means for sharing the stored meeting recording file during another on-line meeting.

* * * * *

UNITED STATES PATENT AND TRADEMARK OFFICE
CERTIFICATE OF CORRECTION

PATENT NO. : 7,464,137 B2  Page 1 of 1
APPLICATION NO. : 11/450939
DATED : December 9, 2008
INVENTOR(S) : Min Zhu et al.

It is certified that error appears in the above-identified patent and that said Letters Patent is hereby corrected as shown below:

Title page:

item (75) Inventors should read as follows:

Delete "Altred Lian Fui Pong" substitute --Alfred Lian Fui Pong--

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,464,137 B2 | Page 1 of 1 |
| APPLICATION NO. | : 11/450939 | |
| DATED | : December 9, 2008 | |
| INVENTOR(S) | : Min Zhu et al. | |

It is certified that error appears in the above-identified patent and that said Letters Patent is hereby corrected as shown below:

Col. 141, Line 1, delete "spliffing" subtitute --splitting--

Signed and Sealed this

Twenty-sixth Day of April, 2011

David J. Kappos
*Director of the United States Patent and Trademark Office*